(12) United States Patent
Yushin et al.

(10) Patent No.: US 11,581,569 B2
(45) Date of Patent: Feb. 14, 2023

(54) LIQUID-INFILTRATED SOLID-STATE ELECTROLYTE AND RECHARGEABLE BATTERIES COMPRISING SAME

(71) Applicant: Sila Nanotechnologies Inc., Alameda, CA (US)

(72) Inventors: Gleb Yushin, Atlanta, GA (US); Naoki Nitta, Alameda, CA (US); John Roudebush, San Francisco, CA (US); Austin Sendek, San Mateo, CA (US); Samik Jhulki, Atlanta, GA (US)

(73) Assignee: Sila Nanotechnologies, Inc., Alameda, CA (US)

(*) Notice: Subject to any disclaimer, the term of this patent is extended or adjusted under 35 U.S.C. 154(b) by 276 days.

(21) Appl. No.: 16/856,299

(22) Filed: Apr. 23, 2020

(65) Prior Publication Data

US 2020/0343580 A1 Oct. 29, 2020

Related U.S. Application Data

(60) Provisional application No. 62/856,706, filed on Jun. 3, 2019, provisional application No. 62/837,682, filed on Apr. 23, 2019.

(51) Int. Cl.
| | |
|---|---|
| *H01M 10/0525* | (2010.01) |
| *H01M 10/617* | (2014.01) |
| *H01M 4/134* | (2010.01) |
| *H01M 10/0562* | (2010.01) |
| *H01M 10/0565* | (2010.01) |

(Continued)

(52) U.S. Cl.
CPC ....... *H01M 10/0525* (2013.01); *H01M 4/134* (2013.01); *H01M 10/0562* (2013.01); *H01M 10/0565* (2013.01); *H01M 10/44* (2013.01); *H01M 10/617* (2015.04); *H01M 50/46* (2021.01); *H01M 2004/021* (2013.01)

(58) Field of Classification Search
CPC ............ A61K 2300/00; A61K 31/4155; A61K 31/427; A61K 31/428; A61K 31/4427; A61K 39/395; A61K 45/06; A61K 47/6869; A61P 35/02; C07D 405/06; C07D 407/06; C07D 491/08; C07D 493/08; H01M 10/052; H01M 10/0525; H01M 10/056; H01M 10/0562; H01M 10/0565; H01M 10/44; H01M 10/617; H01M 2004/021; H01M 2004/027; H01M 4/134; H01M 4/382; H01M 4/386; H01M 4/387; H01M 4/405; H01M 50/46; Y02E 60/10

See application file for complete search history.

(56) References Cited

U.S. PATENT DOCUMENTS

| | | |
|---|---|---|
| 2014/0170503 A1 | 6/2014 | Yushin et al. |
| 2016/0190640 A1 | 6/2016 | Visco et al. |

(Continued)

*Primary Examiner* — Victoria H Lynch

(74) *Attorney, Agent, or Firm* — Muncy, Geissler, Olds & Lowe, P.C.; Daniel Podhajny

(57) ABSTRACT

An embodiment is directed to a solid state electrolyte-comprising Li or Li-ion battery cell, comprising an anode electrode, a cathode electrode with an areal capacity loading that exceeds around 3.5 mAh/cm², an ionically conductive separator layer that electrically separates the anode and cathode electrodes, and one or more solid electrolytes ionically coupling the anode and the cathode, wherein at least one of the one or more solid electrolytes or at least one solid electrolyte precursor of the one or more solid electrolytes is infiltrated into the solid state Li or Li-ion battery cell as a liquid.

20 Claims, 17 Drawing Sheets

(51) Int. Cl.
    *H01M 10/44*     (2006.01)
    *H01M 50/46*     (2021.01)
    *H01M 4/02*     (2006.01)

(56) References Cited

U.S. PATENT DOCUMENTS

2017/0170515 A1    6/2017    Yushin et al.
2018/0205111 A1    7/2018    Yushin et al.

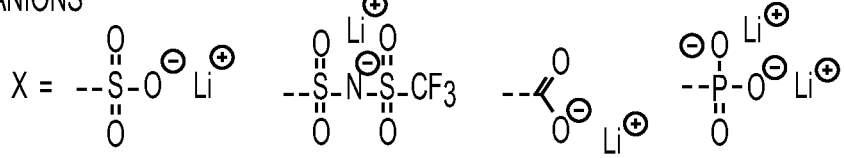
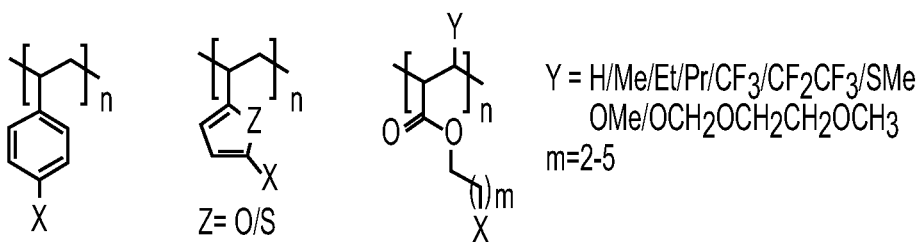
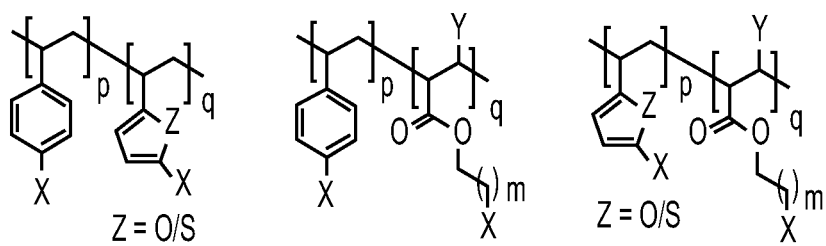
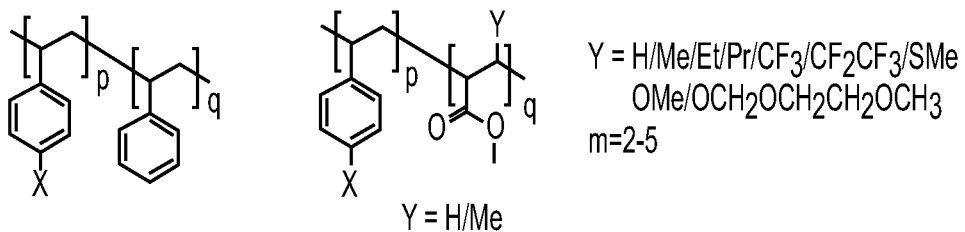
FIG. 2

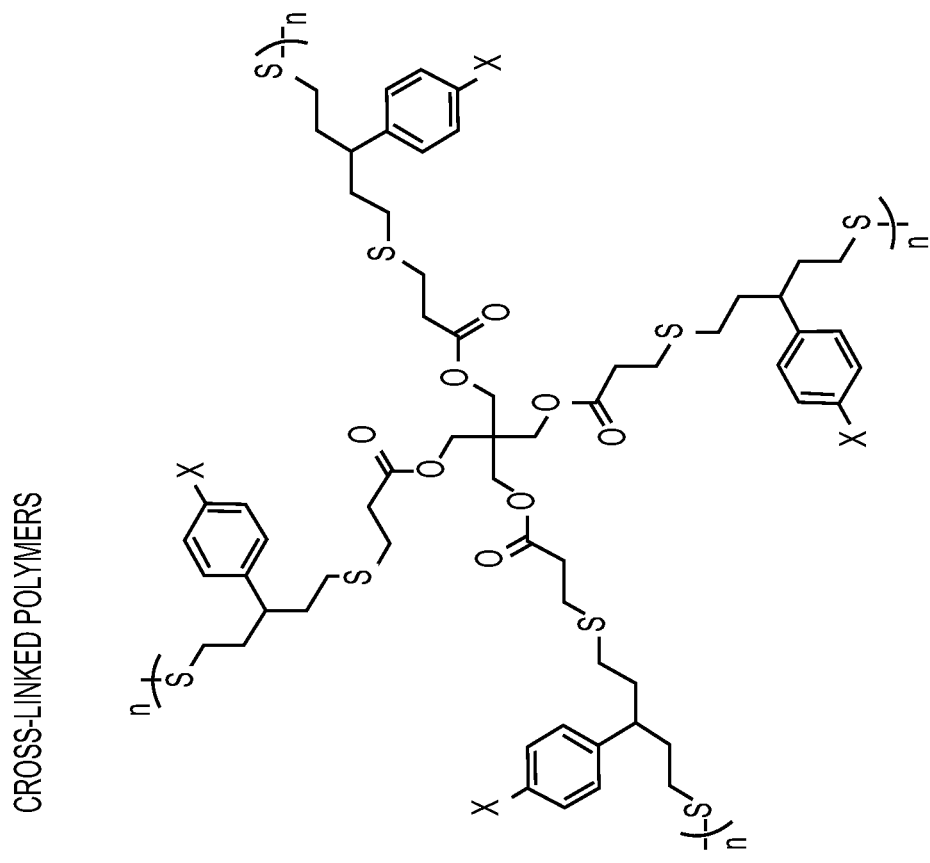
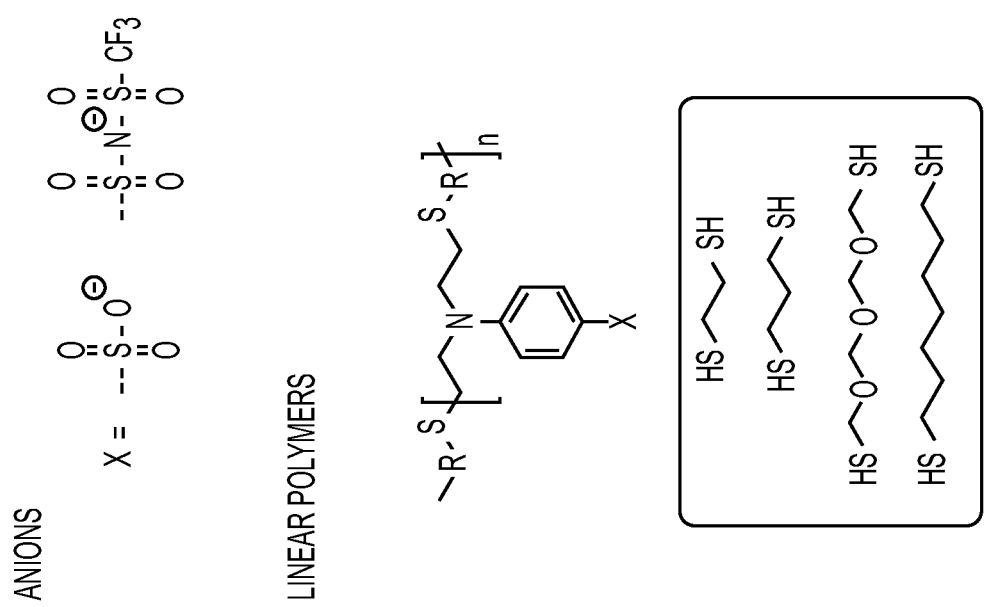
FIG. 3

SIMPLE THERMOPLASTIC POLYMERS
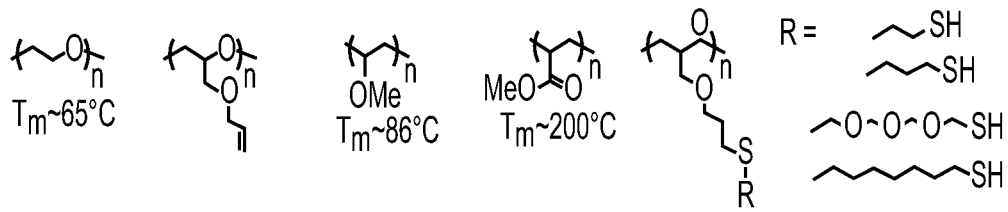
THIOL-ENE LINEAR POLYMER
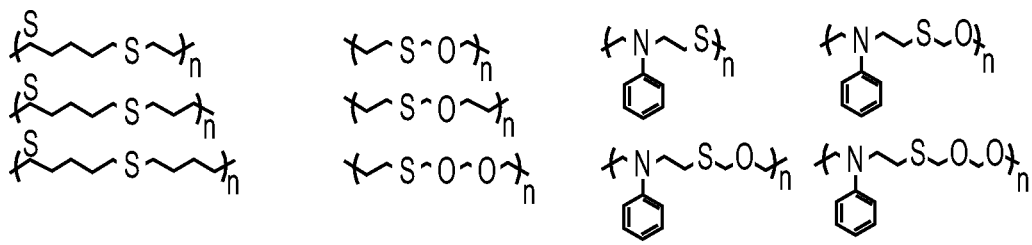
THIOL-ENE CROSS-LIKED POLYMER
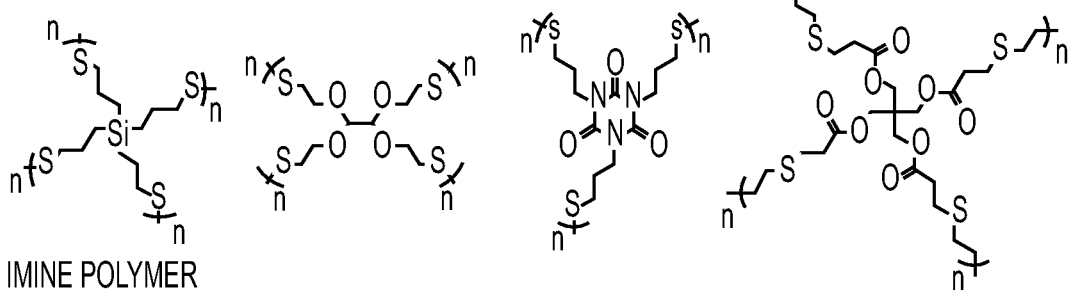
IMINE POLYMER
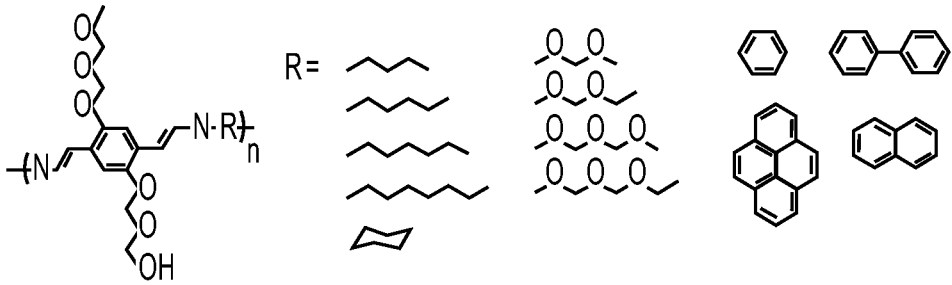
CARBONATE POLYMER
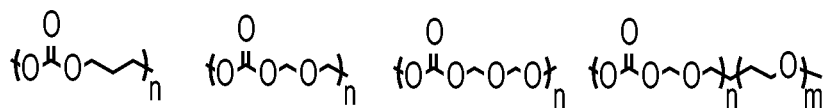
*FIG. 5*

HOMOPOLYMERS
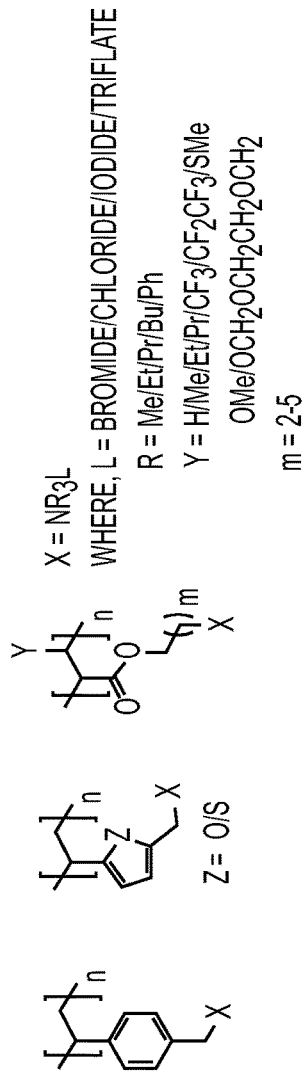
BLOCK COPOLYMERS
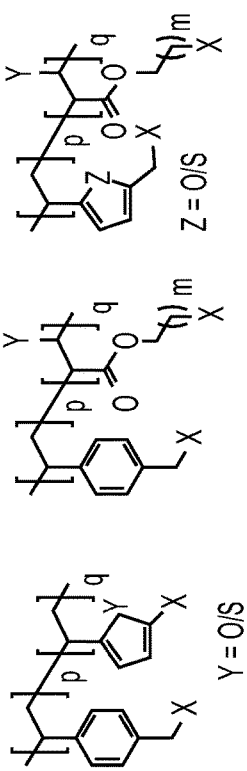
BLOCK COPOLYMERS WITH SPACER GROUPS
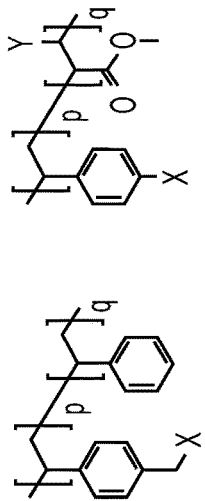
FIG. 6

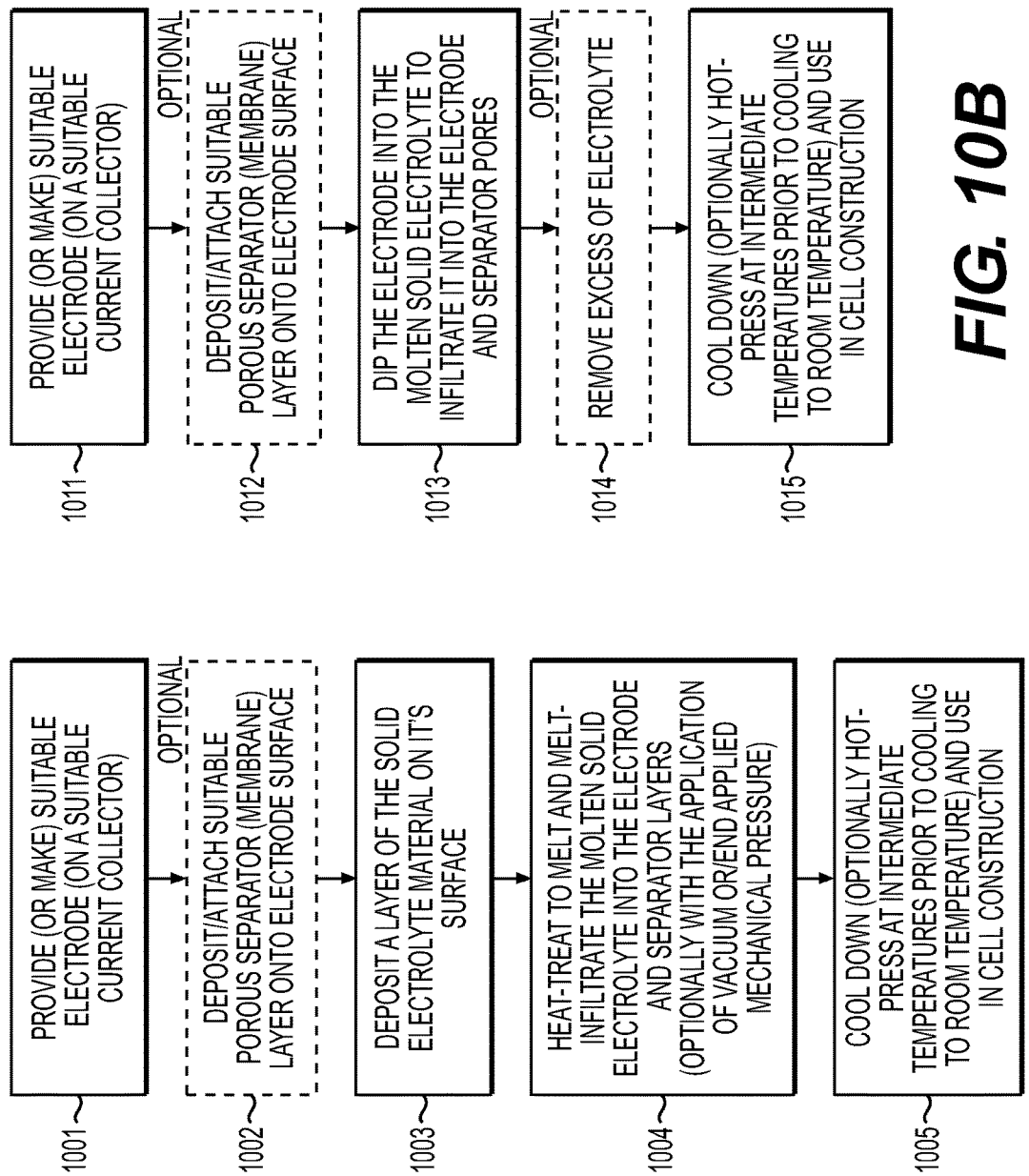

LIQUID-INFILTRATED SOLID-STATE ELECTROLYTE AND RECHARGEABLE BATTERIES COMPRISING SAME

CROSS-REFERENCE TO RELATED APPLICATIONS

The present application for patent claims the benefit of U.S. Provisional Application No. 62/837,682, entitled "MELT-INFILTRATED SOLID-STATE ELECTROLYTE AND RECHARGEABLE BATTERIES COMPRISING SAME," filed Apr. 23, 2019, and further claims the benefit of U.S. Provisional Application No. 62/856,706, entitled "MELT-INFILTRATED SOLID-STATE ELECTROLYTE AND RECHARGEABLE BATTERIES COMPRISING SAME," filed Jun. 3, 2019, which are expressly incorporated herein by reference in its entirety.

BACKGROUND

Field

Embodiments of the present disclosure relates generally to energy storage devices, and more particularly to metal and metal-ion battery technology and the like.

Background

Owing in part to their relatively high energy densities, relatively high specific energy, light weight, and potential for long lifetimes, advanced rechargeable metal batteries, and rechargeable metal-ion batteries, such as lithium-ion (Li-ion) batteries, are desirable for a wide range of consumer electronics, electric vehicle, grid storage and other important applications. Similarly, primary metal and metal-ion batteries, such as primary Li batteries, are desired for a range of applications, where high energy density and/or high specific energy of batteries is needed, even if the batteries may be disposed of after a single use.

However, despite the increasing commercial prevalence of Li-ion batteries and some of the Li primary batteries, further development of these batteries is needed, particularly for potential applications in low- or zero-emission, hybrid-electrical or fully-electrical vehicles, consumer electronics, energy-efficient cargo ships and locomotives, aerospace applications, and power grids.

One desired feature of metal and metal-ion batteries for some applications is enhanced safety. It is desirable that batteries do not induce fire, even under extreme cases such as a nail penetration test. Solid electrolytes may, in principle, provide such enhanced safety. Unfortunately, the practical applications of solid-state batteries with solid electrolytes are often limited by lower energy density, lower power density (particularly at low temperatures), and higher costs.

Another desired feature of metal and metal-ion batteries is enhanced energy density. Furthermore, it is typically desirable for higher energy density to not lead to a substantial reduction in cycle stability of the cell or a reduction in rate performance, which is very challenging to achieve.

Accordingly, there remains a need for improved metal and metal-ion batteries, components, and other related materials and manufacturing processes.

SUMMARY

Embodiments disclosed herein address the above stated needs by providing improved battery components, improved batteries made therefrom, and methods of making and using the same.

An embodiment is directed to a solid state electrolyte-comprising Li or Li-ion battery cell, comprising an anode electrode, a cathode electrode with an areal capacity loading that exceeds around 3.5 mAh/cm$^2$, an ionically conductive separator layer that electrically separates the anode and cathode electrodes, and one or more solid electrolytes ionically coupling the anode and the cathode, wherein at least one of the one or more solid electrolytes or at least one solid electrolyte precursor of the one or more solid electrolytes is infiltrated into the solid state Li or Li-ion battery cell as a liquid.

BRIEF DESCRIPTION OF THE DRAWINGS

The accompanying drawings are presented to aid in the description of embodiments of the disclosure and are provided solely for illustration of the embodiments and not limitation thereof. Unless otherwise stated or implied by context, different hatchings, shadings, and/or fill patterns in the drawings are meant only to draw contrast between different components, elements, features, etc., and are not meant to convey the use of particular materials, colors, or other properties that may be defined outside of the present disclosure for the specific pattern employed.

FIGS. 2-6 illustrate examples of the suitable components of the solid polymer electrolytes, which may be used according to various embodiments.

FIGS. 10A-10B illustrate example processes for manufacturing electrodes infiltrated with solid electrolyte in accordance with an embodiment of the disclosure.

FIGS. 12A-11F illustrate example microstructures of the particles that may be utilized in the electrodes in accordance with an embodiment of the disclosure.

DETAILED DESCRIPTION

Figure 1:
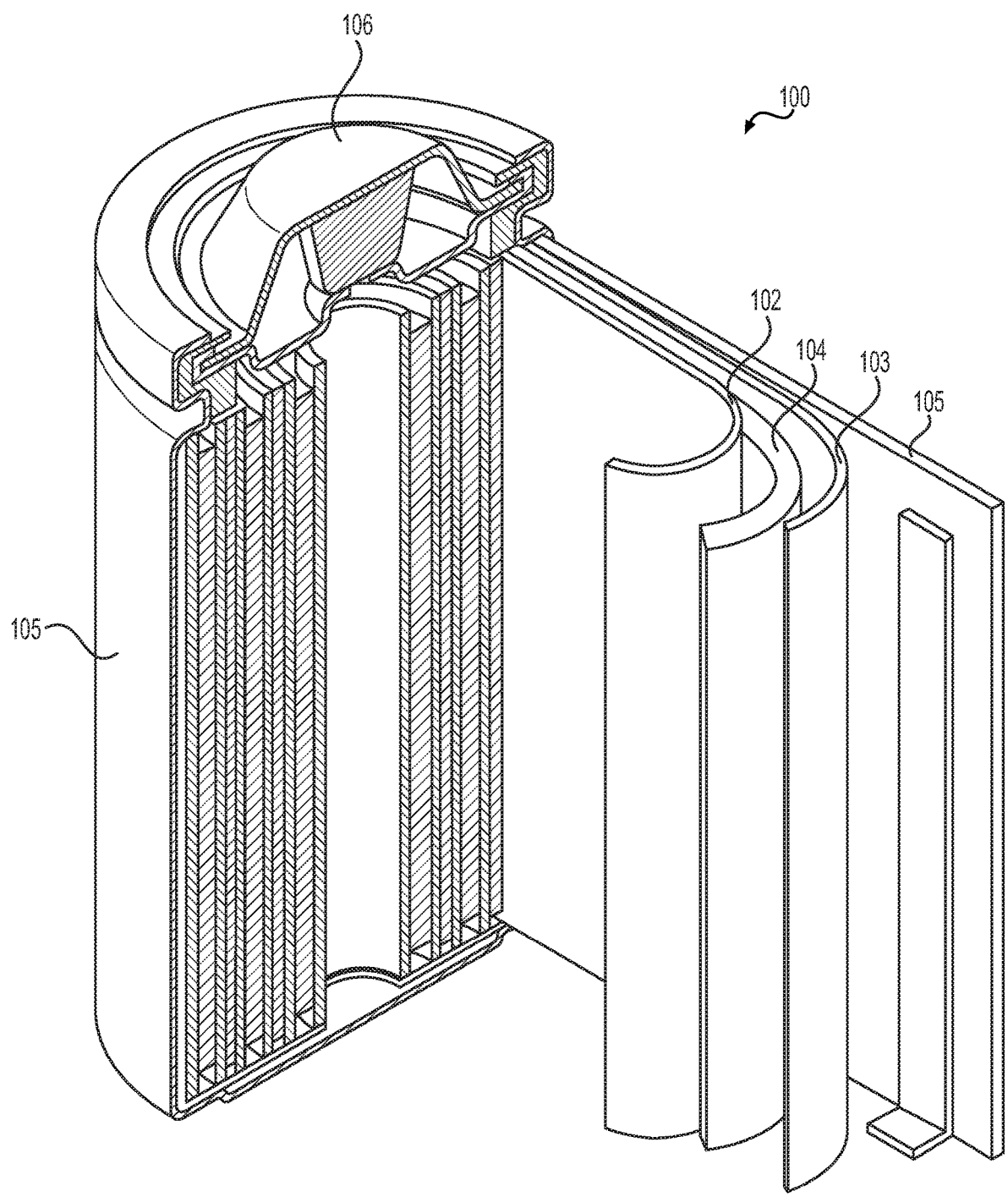
FIG. 1 illustrates an example metal-ion (e.g., Li-ion) battery in which the components, materials, methods, and other techniques described herein, or combinations thereof, may be applied according to various embodiments.

Aspects of the present invention are disclosed in the following description and related drawings directed to specific embodiments of the invention. The term "embodiments of the invention" does not require that all embodiments of the invention include the discussed feature, advantage, process, or mode of operation, and alternate embodiments may be devised without departing from the scope of the invention. Additionally, well-known elements of the invention may not be described in detail or may be omitted so as not to obscure other, more relevant details.

While the description below may describe certain examples in the context of rechargeable (often called "secondary") Li metal and Li-ion batteries (for brevity and convenience, and because of the current popularity of Li technology), it will be appreciated that various aspects may be applicable to other rechargeable as well as co-called "primary" (non-rechargeable) batteries, such as secondary and primary metal and metal-ion batteries (such as Na and Na-ion, Mg and Mg-ion, Al and Al-ion, K and K-ion, Cs and Cs-ion, Ca and Ca-ion, Zn and Zn-ion, Fe and Fe-ion and others).

While the description below may describe certain examples of the solid electrolytes in the context of cation-based (such as metal-ion, including Li-ion cation-based) electrolytes where cations (such as Li$^+$ cations and others) contribute to the vast majority (e.g., up to around 90-100%) of the total electrolyte ionic conductivity, it will be appreciated that various aspects may be applicable to solid electrolytes that either primarily (e.g., by around 90-100%) rely on anion conduction (such as F$^-$ or Cl$^-$ or OH$^-$ or other anion conduction) or exhibit mixed cationic and anionic conductivities, where each type of ions contribute to more than around 10% and less than around 90% of the total ionic conductivity.

While the description below may describe certain examples in the context of single phase (including a solid solution) electrolyte compositions, it will be appreciated that various aspects may be applicable to composition comprising two or three or even four distinct phases. Each phase may exhibit a different melting point, mechanical properties, microstructure, density, chemical composition and/or ionic conductivity.

While the description below may describe certain examples in the context of one type or composition of the electrolyte in cells, it will be appreciated that various aspects may be applicable to cells comprising two or three or more electrolyte compositions. Each electrolyte composition may exhibit a different melting point, mechanical properties, microstructure, density, chemical composition and/or ionic conductivity. In some designs, an anode may comprise a different electrolyte composition or different electrolyte mixture than a cathode or a separator membrane layer. Similarly, in some designs, a cathode may comprise a different electrolyte composition or different electrolyte mixture than an anode or a separator membrane layer.

While the description below may describe certain examples of cathode or anode materials in the context of conversion-type electrode chemistries or certain types of intercalation-type electrode chemistries, it will be appreciated that various aspects may be applicable to various other types of conversion-type or intercalation-type cathode or anode chemistries (including, but not limited to lithium nickel oxide (LNO), lithium nickel cobalt aluminum oxide (NCA), lithium cobalt oxide (LCO), lithium nickel cobalt manganese oxide (NCM), nickel cobalt aluminum manganese oxide (NCAM) and lithium iron phosphate (LFP) cathode among other suitable intercalation-type cathode compositions, as well as natural graphite, synthetic graphite, soft carbon, hard carbon, lithium titanate (LTO) and other suitable intercalation-type anode compositions, to name a few).

While the description below may also describe certain examples of the cathode material formulations (for use in combination with melt-infiltrated and other suitable solid electrolytes) either in a Li-free (e.g., charged) state or in a fully lithiated (e.g., discharged) state (e.g., as LiF-metal (nano)composites), it will be appreciated that various aspects may be applicable to various Li-containing electrodes (e.g., in either a partially or fully discharged state) or to essentially Li-free electrodes (e.g., in either a partially or fully charged state). Furthermore, while the description below may also describe certain examples of Li presence in cathodes in the form of LiF, it will be appreciated that various aspects may be applicable when Li may be contained in oxides, oxyfluorides, hydroxyfluorides and/or other components of the active (or inactive) cathode material formulations.

While the description below may describe certain cathode examples (for use in combination with melt-infiltrated and other suitable solid electrolytes) in the context of "pure" fluoride-based chemistry of active conversion-type cathode materials (e.g., LiF and Cu, LiF and Fe, LiF and Fe—Cu, FeF$_3$, CuF$_2$, NiF$_2$, MnF$_3$, BiF$_3$, BiF$_5$, Cu—Fe—F (note that "A-B-C- . . . " refers to the general composition comprising A, B, C, etc. without specifying the relative content of the A, B, C and possibly other elements), Cu—Fe—Mn—F, Cu—Fe—Ni—F, Fe—Ni—F and many other "pure" metal fluoride-based chemistries based on one, two, three or more metals), it will be appreciated that various aspects may be applicable to cathodes comprising metal oxyfluorides/oxyfluorides (e.g., Cu—O—F, Fe—O—F, Fe—Cu—O—F, Bi—O—F, Bi—Fe—O—F, Bi—Fe—Cu—F, Fe—Al—O—F, Cu—Al—O—F, Fe—Ni—O—F, Cu—Ni—O—F, Fe—Cu—Al—O—F, Fe—Ni—Al—O—F, Fe—Ni—La—O—F, Fe—La—O—F, Cu—La—O—F, Fe—Cu—La—O—F, Cu—Li—O—F, Fe—Li—O—F, Fe—Cu—Li—O—F, Fe—Cu—La—Li—O—F, Fe—Cu—Al—Li—O—F, Fe—Cu—Mn—Li—O—F, Fe—Cu—Ni—Li—O—F, and other compositions comprising various metal cations and mixed F and O anions), metal chloro-fluorides (e.g., Cu—Cl—F, Fe—Cl—F, Fe—Cu—Cl—F, Fe—Cu—Ni—Cl—F, Fe—Cu—Al—Cl—F, Cu—Li—Cl—F, Fe—Li—Cl—F, Fe—Cu—Li—Cl—F, Fe—Cu—Mn—Li—Cl—F, Fe—Cu—Ni—Li—Cl—F, and various other compositions comprising mixed F and Cl anions), metal bromo-fluorides (various compositions comprising metal(s) and mixed F and Br anions), metal hydro-fluorides (various compositions comprising metal(s) and hydrogen cations and F anions), metal hydroxy-fluorides (various compositions comprising metal(s) and hydrogen cations and mixed F and O anions), metal oxy-chloro-fluorides (various compositions comprising mixed F, Cl and O anions), metal oxy-bromo-fluorides (various compositions comprising mixed F, Br and O anions), metal sulfo-fluorides (various compositions comprising mixed F and S anions), metal sulfo-oxy-fluorides (various compositions comprising mixed F, O and S anions), their various mixtures, alloys and other combinations and other mixed anions' comprising conversion-type cathode compositions (including those that may comprise Li, H, none-Li alkali metals, alkali earth metals, yttrium, lanthanum, lanthanoid metals and transition metals as well F, Cl, Br, O, S and/or Se nonmetals). In some designs, the atomic ratio of all the present nonmetals (e.g., O, S, Cl, Se and/or others) to F in the cathode material composition (e.g., the atomic ratio of O:F or the atomic ratio of (O and Cl and S and Se):F, etc.) may range from around $10^{-20}$:1 to around 0.7:1. In some designs, the ratio of all the present non-Li metal atoms except for Cu, Ni and Fe (e.g., Mn, La, Al, H, Mg, Zr, Cr, Bi, etc.) to the sum of the Li, Cu, Ni and Fe atoms in the cathode material composition may range from around $10^{-20}$:1 to around 0.3:1.

While the description below may describe certain cathode examples (for use in combination with melt-infiltrated and other suitable solid electrolytes) in the context of Li storage in the cathodes based on the transition metal (such as Cu, Fe, Mn, Ni, Bi, Co, etc.) reduction-oxidation (redox) reactions, it will be appreciated that various aspects may be applicable to materials where a portion of Li storage relies on the anion (such as oxygen, O, etc.) redox reactions in the cathodes. Examples of such materials may include various conversion-type or intercalation-type or mixed type cathode active materials that comprise both fluorine and at least one non-fluorine electronegative element that may exhibit multiple oxidation states, such as oxygen. In some designs, other (more rare) illustrative examples of such materials include those that in addition to metal(s) and fluorine also comprise sulfur or chlorine or other multivalent anions and their various combinations, etc.

While the description below may describe certain cathode examples (for use in combination with melt-infiltrated and other suitable solid electrolytes) in the context of "pure" conversion-type chemistry or "pure" intercalation-type chemistry of active cathode materials, it will be appreciated that various aspects may be applicable to mixed intercalation/conversion type active materials where both intercalation and conversion mechanisms of Li ion storage may take place during battery cell operation. Furthermore, in some designs, primarily (e.g., around 50-100%) intercalation-type mechanism(s) of Li ion storage may take place during some range of the cell charge or discharge (as an illustrative but not limited example, from around 0.0% to around 40.0% of the full discharge capacity). Similarly, in some designs, primarily (e.g., around 50-100%) conversion-type mechanism(s) of Li ion storage may take place during some range of the cell charge or discharge (as an illustrative but not limited example, from around 0.5% to around 100.0% of the full discharge capacity).

While the description below may describe certain examples (for use in combination with melt-infiltrated and other suitable solid electrolytes) in the context of fluoride-based chemistry of active conversion-type cathode materials (e.g., LiF and Cu, LiF and Fe, LiF and Fe—Cu, $FeF_3$, $CuF_2$, Cu—Fe—$F_{2-3}$ and other fluoride-based chemistries), it will be appreciated that various aspects may be applicable to lithium chalcogenide (e.g., $Li_2S$ or $Li_2Se$ or $Li_2$—S—Se, etc.) based and other types of chemistries of conversion-type active cathode (or anode) materials.

While the description below may describe certain anode examples (for use in combination with melt-infiltrated and other suitable solid electrolytes) in the context of "pure" conversion-type chemistry or "pure" intercalation-type chemistry or "pure" metal (e.g., Li) deposition chemistry or "pure" Li alloy chemistry of active anode materials, it will be appreciated that various aspects may be applicable to mixed type active materials where two or more mechanism types of Li ion storage (e.g., (a) intercalation-type, (b) conversion-type, (c) metal (e.g., Li) deposition and (d) metal (e.g., Li) alloying) in the anode may take place during battery cell operation. Furthermore, in some designs, primarily (e.g., around 50-100%) one mechanism type of Li ion storage (e.g., intercalation-type or conversion-type or alloying-type) may take place during some range of the cell charge or discharge (as an illustrative but non-limiting example, from around 0.0% to around 40.0% of the full discharge capacity). Similarly, in some designs, primarily (e.g., around 50-100%) another mechanism type (e.g., conversion-type or alloying-type or metal (e.g., Li) deposition) of Li ion storage may take place during some range of the cell charge or discharge (as an illustrative but not limited example, from around 0.5% to around 100.0% of the full discharge capacity).

While the description below may describe certain examples of Li-ion batteries with LiF-comprising cathodes and Si-comprising anodes (for use in combination with melt-infiltrated and other suitable solid electrolytes), it will be appreciated that various aspects may be applicable to battery cells comprising no Si in the anodes or no LiF in the cathodes. Furthermore, while the description below may describe certain cathode examples in the context of metal fluoride—based electrode chemistry, it will be appreciated that various aspects may be applicable to other types of cathodes as well as various types of anodes (e.g., Si-comprising or Sn-comprising or carbon-comprising or various other chemistries of anodes such as Li metal or Li alloy anodes), including various alloying-type, conversion-type, intercalation-type and mixed type cathodes and anodes.

While the description below may describe certain examples in the context of a particular electrode or electrode particle chemistry, composition, architecture and morphology, certain examples in the context of particular electrode synthesis steps or particular electrode particle(s) synthesis steps, certain examples in the context of a particular electrode porosity or a particular porosity of particles (within the electrode), certain examples in the context of a particular shape or a particular size of particles (within the electrode), certain examples in the context of a particular electrode surface chemistry or surface morphology, certain examples in the context of particular electrolyte composition, certain examples in the context of particular electrolyte incorporation into an electrode or a battery cell, it will be appreciated that various aspects may be applicable to battery cells that advantageously incorporate various combinations of some of the described electrode chemistries, compositions, architectures, sizes, porosities and shapes as well as electrolyte compositions and electrode or cell manufacturing techniques.

While the description below may describe certain examples of separators in the context of a particular thermally-stable porous separator chemistry (e.g., $Al_2O_3$, AlO(OH), $Al(OH)_3$, $LiAlO_2$, $LiAl_5O_8$, MgO, etc.) or morphology (e.g., fibers, nanofibers, nanowires, nanoflakes, nanoplatelets, platelets, nanoparticles of irregular shape, nonwoven, etc.) for use in combination melt-infiltrated electrolyte compositions, it will be appreciated that various aspects may be applicable to other types or chemistries or morphologies of thermally stable separators and also to the lack of standalone separators.

While the description below may describe certain examples of the electrolyte composition and properties for melt-infiltration into a separator or a cathode or an anode or their various combinations (including melt-infiltration into a battery stack or roll, etc.), it will be appreciated that various aspects (e.g., the use of porous particles or porous films for Li plating or Li alloying within the pores, among many others) may be applicable to the electrolytes of the described compositions or properties that are incorporated into cells by other (not melt-infiltration) techniques (e.g., as standalone or electrode-coated membranes, as current collector-deposited/coated layer, by solution infiltration, by slurry casting, by sputtering, by spraying, by electrodeposition, by electroless deposition, by layer-by-layer deposition, by various vapor deposition means (such as chemical vapor deposition CVD, physical vapor deposition PVD, atomic layer deposition ALD, etc.), among others). Furthermore, once the solid electrolyte is incorporated into an anode or cathode or separator or their various combinations by various mechanisms, in some designs it may be advantageous to calendar (pressurized by pressure-rolling or other mechanism) these compositions in order to reduce or eliminate the pore volume or improve the contact between the solid electrolyte and other materials or to attain other benefits. In some designs, the value of suitable densification pressure may advantageously range from around 2 MPa to around 2,000 MPa (in some designs, from around 20 MPa to around 200 MPa). Furthermore, in some designs, it may be advantageous to apply such a pressure at elevated temperatures (e.g., from around 50° C. to around 350° C.).

While the description below may describe certain examples in the context of melt-infiltration electrolyte filling methodologies for cell fabrication, it will be appreciated that various aspects (e.g., the use of porous particles or porous films for Li plating or Li alloying within the pores, depositing protective surface coatings, certain electrolyte compositions, favorable combinations of electrolyte and anode or cathode chemistries, among many others) may be applicable to other methodologies of electrolyte filling (or, more generally, electrolyte incorporation) for cell fabrication.

While the description below may describe certain examples of electrolyte composition(s) that may be used to attain certain suitable electrolyte properties for effective cell (e.g., Li or Li-ion cell) design, it will be appreciated that in some designs other electrolyte compositions may be selected in order to achieve suitable electrolyte properties for cell design and manufacturing.

While the description below may describe certain examples of cells (e.g., Li or Li-ion cells) comprising a single electrolyte, it will be appreciated that two or more distinct electrolyte compositions may be used within an individual cell.

While the description below may describe certain examples of cells (e.g., Li or Li-ion cells) comprising only a solid (e.g., at room temperature) electrolyte, it will be appreciated that various aspects may be applicable to cells comprising both solid and liquid electrolyte(s) (e.g., at room temperature).

While the description below may describe certain examples of cells (e.g., Li or Li-ion cells) comprising only inorganic solid (at room temperature) electrolyte, it will be appreciated that various aspects may be applicable to cells comprising organic (e.g., solid polymer or polymer gel or other types of organic) or mixed (organic-inorganic) electrolyte(s).

While the description below may describe certain examples of cells (e.g., Li or Li-ion cells) that comprise electrolyte that is solid at room temperature and is solid at operating temperatures, it will be appreciated that various aspects may be applicable to cells comprising electrolyte that is solid at room temperature, but may become viscous glass or liquid at least at some operating temperatures.

Any numerical range described herein with respect to any embodiment of the present invention is intended not only to define the upper and lower bounds of the associated numerical range, but also as an implicit disclosure of each discrete value within that range in units or increments that are consistent with the level of precision by which the upper and lower bounds are characterized. For example, a numerical distance range from 7 nm to 20 nm (i.e., a level of precision in units or increments of ones) encompasses (in nm) a set of [7, 8, 9, 10, . . . , 19, 20], as if the intervening numbers 8 through 19 in units or increments of ones were expressly disclosed. In another example, a numerical percentage range from 30.92% to 47.44% (i.e., a level of precision in units or increments of hundredths) encompasses (in %) a set of [30.92, 30.93, 30.94, . . . , 47.43, 47.44], as if the intervening numbers between 30.92 and 47.44 in units or increments of hundredths were expressly disclosed. Hence, any of the intervening numbers encompassed by any disclosed numerical range are intended to be interpreted as if those intervening numbers had been disclosed expressly, and any such intervening number may thereby constitute its own upper and/or lower bound of a sub-range that falls inside of the broader range. Each sub-range (e.g., each range that includes at least one intervening number from the broader range as an upper and/or lower bound) is thereby intended to be interpreted as being implicitly disclosed by virtue of the express disclosure of the broader range.

As used herein, reference to some material or device (e.g., a battery) or part of the device (e.g., electrolyte or separator or anode or cathode or current collector or packaging, etc.) "comprise" some elements (or compositions or components, etc.) these referenced elements (or compositions or components, etc.) are present in some meaningful amounts (e.g., in the range from around 0.001 vol. % to around 100 vol. %), while other elements or compositions or components may also be part of the same material (or device or parts of the device, etc.).

FIG. 1 illustrates an example metal-ion (e.g., Li-ion) battery 100 in which the components, materials, methods, and other techniques described herein, or combinations thereof, may be applied according to various embodiments. A cylindrical battery is shown here for illustration purposes, but other types of arrangements, including prismatic or pouch (laminate-type) batteries, may also be used as desired. The example battery 100 includes a negative anode 102, a positive cathode 103, an ionically conductive separator 104 interposed between and electrically isolating the anode 102 and the cathode 103, an electrolyte (not labeled separately) impregnating the separator 104, a battery case 105, and a sealing member 106 sealing the battery case 105.

The use of high-capacity anodes that exhibit volumetric capacity in the range from around 500 mAh/cc to around 2200 mAh/cc (in some designs, from around 650 mAh/cc to around 1400 mAh/cc) in a fully lithiated (charged) state (as capacity per volume of the electrode coating, not counting the volume of the current collectors or volume of the separator layer) and/or gravimetric capacity in the range from around 400 mAh/g to around 4000 mAh/g (in some designs, from around 700 mAh/g to around 2400 mAh/g) in a fully discharged (lithium-free) state (as capacity per mass of the anode coating, not counting the weight of electrolyte or current collectors or the separator layer) may be particularly attractive for Li and Li-ion cells (including cells with solid electrolytes), but such anodes typically suffer from rapid degradation in conventional cell fabrications or cell designs. In case of cells with solid electrolytes, fabrication and the use of lightweight anodes that (considering the total weight of both the anode coating and the weight of the solid electrolyte and half of the weight of the separation membrane layer, but not counting the weight of the current collector) exhibit gravimetric capacity in the range from around 270-300 mAh/g to around 3000 mAh/g (in some designs, from around 450 mAh/g to around 2000 mAh/g) in a fully discharged (lithium-free) state may be particularly attractive for Li and Li-ion cells, but is extremely challenging to achieve in conventional designs. Similarly, attaining acceptable performance characteristics (sufficient safety, sufficient rate performance, sufficient areal loading, stability, etc. for a given application) in Li or Li-ion cells that comprise anodes with gravimetric capacity (at the individual particle/active (composite) material level) in the range from around 500 mAh/g to around 3600 mAh/g (in some designs from around 700 mAh/g to around 2600 mAh/g; in some other designs from around 900 mAh/g to around 2200 mAh/g) is challenging. One or more embodiments of the present disclosure are directed to overcoming one or all of such limitations.

The use of high-capacity cathodes that exhibit volumetric capacity in the range from around 600 mAh/cc to around 2200 mAh/cc (in some designs, from around 650 mAh/cc to around 1400 mAh/cc) in a fully lithiated (discharged) state (as capacity per volume of the electrode coating, not counting the volume of the current collectors or volume of the separator layer) and/or gravimetric capacity in the range from around 200 mAh/g to around 1200 mAh/g (in some designs, from around 250 mAh/g to around 1000 mAh/g) in a fully discharged (fully lithiated) state (as capacity per mass of the cathode coating, not counting the weight of electrolyte or current collectors or the separator layer) may be particularly attractive for Li and Li-ion cells (including cells with solid electrolytes), but such anodes typically suffer from rapid degradation in conventional cell fabrications or cell designs. In case of cells with solid electrolytes, fabrication and the use of lightweight cathodes that (considering the total weight of both the cathode coating and the weight of the solid electrolyte and half of the weight of the separation membrane layer, but not counting the weight of the current collector) exhibit gravimetric capacity in the range from around 140-200 mAh/g to around 1000 mAh/g (in some designs, from around 220 mAh/g to around 850 mAh/g) in a fully discharged (lithiated, lithium-full) state may be particularly attractive for Li and Li-ion cells, but is extremely challenging to achieve in conventional designs. Similarly, attaining acceptable performance characteristics (sufficient safety, sufficient rate performance, sufficient areal loading, stability, etc. for a given application) in Li or Li-ion cells that comprise cathodes with gravimetric capacity (at the individual particle/active (composite) material level) in the range from around 240 mAh/g to around 1200 mAh/g (in some designs from around 280 mAh/g to around 1000 mAh/g) is challenging. One or more embodiments of the present disclosure are directed to overcoming one or all of such limitations.

Solid electrolytes may provide some advantages for Li and Li-ion cells, such as stability against oxidation at high cathode potentials, reduced undesirable side reactions between the cathode and electrolyte, reduced undesirable side reactions between the anode and electrolyte, and enhanced safety. Examples of known solid ceramic electrolytes include, but are not limited to, sulfide-based electrolytes (such as $Li_2S$—$P_2S_5$, $Li_2S$—$Ga_2S_3$—$GeS_2$, $Li_2S$—$SiS_2$, etc.), various phosphate-based electrolytes (such as $Li_{1+x}Al_xTi_{2-x}(PO_4)_3$, etc.), various halide-based electrolytes, oxide-based electrolytes (such as Li—La—Ti—O garnet, Li—La—Ta—O garnet, $Li_4SiO_4$, Li—Si—O glass, Li—Ge—O glass, $Li_9SiAlO_8$, $Li_{3.2}P_{0.8}Si_{0.2}O_4$, $Li_{3.53}(Ge_{0.75}P_{0.25})_{0.75}V_{0.3}O_4$, etc.), mixed sulfide-oxide, sulfide-halide and sulfide-oxide-halide electrolytes (such as $Li_6PS_5Cl$, $Li_{9.5}Si_{1.74}P_{1.44}S_{11.7}Cl_{0.3}$, $Li_{6.6}P_{0.4}Ge_{0.6}S_5I$, $Li_2S$—$SiS_2$—$Li_4SiO_4$, $Li_2S$—$SiS_2$—$Li_4SiO_4$—LiCl, LiI—$La_2O_2S$—$La_2O_2S_2$, etc.), oxy-chloride and oxy-hydro-chloride electrolytes (such as $Li_3OCl$ electrolyte, $Li_2OHCl$ electrolyte, $Li_3(OH)_2Cl$ electrolyte, etc.) and others.

Fabrication of solid state Li or Li-ion cells that exhibit moderately high gravimetric energy density (e.g., in the range from around 200-250 to around 300-350 Wh/kg when normalized by the total weight of all the cell components) or high gravimetric energy density (e.g., in the range from around 350 to around 800 Wh/kg, when normalized by the total weight of all the cell) is extremely challenging by using conventionally known materials and fabrication techniques. Fabrication of solid state Li or Li-ion cells that exhibit moderately high volumetric energy density (e.g., in excess of around 500-600 Wh/L, such as in the range from around 600 to around 750 Wh/L when normalized by the total volume of the cell) or high volumetric energy density (e.g., in excess of around 750 Wh/L, such as in the range from around 750 to around 1300 Wh/L, when normalized by the total weight of all the cell components) is extremely challenging by using conventionally known materials and fabrication techniques. One or more embodiments of the present disclosure are directed to overcoming one or all of such limitations.

Fabrication of solid-state Li or Li-ion cells that exhibit large total energy density (per cell) and large total capacity (per cell) while retaining desired energy and power storage characteristics is similarly challenging. In particular, fabrication of solid state cells with total energy density in the range from around 1 Wh to around 10,000 Wh or more (in some designs from around 5-10 Wh to around 1,000-2,000 Wh) is extremely challenging by using conventionally known materials and fabrication techniques. Similarly, fabrication of solid state cells with total capacity in the range from around 0.4 Ah to around 4,000 Ah or more (in some designs from around 1-3 Ah to around 500-1,000 Ah) is extremely challenging by using conventionally known materials and fabrication techniques. One or more embodiments of the present disclosure are directed to overcoming one or all of such limitations.

Conventional solid electrolytes and solid state Li or Li-ion cells (batteries) typically suffer from various limitations, such as (i) low ionic conductivity (and thus low rate performance of solid cells), particularly at low temperatures (e.g., below around 0° C.); (ii) low practically-achievable energy density (e.g., due to the typically used milling procedure for the fabrication of electrodes with solid electrolytes, which requires excessive content of conductive additives and electrolyte for achieving reasonable rate performance and high capacity utilization); (iii) large thickness (e.g., typically above 50 microns) of the electrolyte (separator) membranes (e.g., due to the typical formation of such solid membranes by sintering solid electrolyte powders), which increases the volume occupied by the inactive material, thus increasing cell cost and reducing cell energy density; (iv) the brittle nature of the ceramic solid electrolytes and solid-state batteries, which limits their fabrication, applications and life; (v) the lack of flexibility in typical solid-state batteries with solid ceramic electrolytes, which limits their applications and life; (vi) typically rather high interface resistance between the solid electrolyte and the electrode materials (e.g., anode or cathode, or both), which limits their rate performance and temperature of efficient operation; (vii) often high reactivity of the solid electrolytes with many typically used electrode materials and current collectors (particularly for sulfide and chloride-comprising electrolytes), which may induce corrosion and other undesirable reactions during heating of the cell during fabrication or even during use at elevated temperatures (e.g., typically above around 50° C.); (viii) often high reactivity of many solid electrolytes with air and moisture, which often requires electrodes comprising solid state electrolyte to be produced in dry-rooms or gloveboxes (which may be prohibitively expensive for many applications and not practical); (ix) penetration of solid electrolytes by metal dendrites (e.g., Li dendrites in the case of Li metal batteries or Na dendrites in case of Na metal batteries) during cycling, which may induce self-discharge, battery failure and safety hazards; (x) cracks and defects forming at the interface between the solid electrolyte and electrode materials (e.g., due to substantial volume changes (e.g., above 2%) in many electrode materials during cycling, which most solid electrolytes fail to accommodate) leading to capacity fading, resistance growing and failures; (xi) various mechanical and electrochemical instabilities due to difficulty of the solid electrolytes to accommodate volume or shape changes in the electrode materials during cycling or electrochemical or chemical instabilities of the solid electrolyte in contact with metal anodes (e.g., Li or Na anodes), particularly in case of metal anode plating; (xii) in some cases high toxicity of the products of the reaction of the solid electrolyte with moisture (e.g., during cell stack assembling or handling the solid electrolyte membranes in air); among others. In addition, conventional solid-state Li or Li-ion batteries cannot typically be used with conversion-type (including alloying-type) active electrode materials (due to the undesirable interactions with such materials and due to the dramatic volume changes in such active materials (e.g., around 15-400%), which cannot be accommodated by solid electrolytes in typical cells). Furthermore, some conventional solid-state Li-ion batteries cannot utilize graphite (or, more generally, carbon-based) anodes due to the poor interface (high resistance). Similarly, conventional solid-state Li or Li-ion batteries often cannot be used with high voltage (greater than around 4 V vs. Li/Li+) cathode materials (e.g., with high voltage polyanion cathodes). In addition, conventional solid-state are often incorporated into cells as stand-alone membranes, which are extremely expensive to produce with sufficiently (for most applications) low areal density/concentration of defects (e.g., small cracks, small holes or pores, grain boundaries, excessive roughness on the surface, among others), which may lead to low cell fabrication yield and low cycle life. Finally, many conventional designs of the solid-state Li batteries require the use of liquid electrolyte in the cathode. Such designs often suffer from liquid electrolyte flammability, relatively low oxidation stability of the liquid electrolyte (particularly at high voltages), often undesired reactivity with the cathode material, often gassing, often leakage and/or other limitations. One or more embodiments of the present disclosure are directed to routes (e.g., materials, cell designs and/or cell fabrication methodologies) to overcome (or at least reduce reduce) some or all of the above-noted limitations of conventional solid-state cells and solid-state electrolyte compositions.

One aspect of the present disclosure includes advanced electrolyte compositions, which provide favorable performance of solid-state metal and metal-ion (such as Li and Li-ion) battery cells. Examples are provided below for advanced electrolyte compositions for Li and Li-ion batteries. However, similar compositions for Na and Na-ion batteries, K and K-ion batteries, Cs and Cs-ion batteries are disclosed, where Li in the compositions below is substituted with the corresponding metal (K, Cs, or Na). In case of Ca, Ca-ion, Mg, Mg-ion, Al, Al-ion and other metal and metal-ion batteries the composition may be adjusted considering different valence of the alkaline earth or other metals (e.g., 0.5 Ca or 0.5 Mg may replace 1 Li in some corresponding formulas because the valence of Ca and Mg is +2, while the valence of Li is +1).

A conventional way to producing solid-state batteries (batteries comprising solid electrolyte) or batteries comprising mixed solid and liquid electrolytes comprise formation of a standalone solid state electrolyte (SSE) membrane that separates anode and the cathode by preventing electrons from moving between them while allowing active ions (e.g., Li ions) to pass through. A conventional way to producing all solid-state batteries also comprises mixing active materials with solid electrolyte powders and conductive additives, casting the slurry onto the current collector and sintering these. Both of these conventional approaches are complex, expensive, and often suffer from low yield and limitations in terms of the attainable energy and power densities. For example, the volume fraction of active material in the conventionally produced solid state electrodes is often limited to around 25-60 vol. % to achieve a satisfactory conductivity and rate performance. However, this is significantly lower than the around 65-90 vol. % of active material found in certain electrodes for use with liquid electrolytes. Similarly, the SSE separator membrane is conventionally prepared by sintering or pressing the SSE into the solid membrane material, typically around 50-150 microns in thickness, which is higher than the around 6-20 micron membranes used in conjunction with liquid electrolytes. These limitations may significantly increase the volume needed to store energy and thus reduce the energy density of the solid-state cells with SSE. In many cases, lower energy density also leads to a higher price, which is also undesirable. Furthermore, conventionally produced solid state batteries often require the use of stainless steel or nickel current collector foils for Li-ion or Li metal batteries. Due to lower conductivity of such foils (compared to Cu, for example), only small size solid cells could typically be used unless solid cells operate at very low power (small current density) or use undesirably thick metal foils, which reduces energy density. Finally, conventionally produced solid state batteries with Li metal and other anodes often require that very large pressure be applied or maintained during charging in order to maintain reasonable cycle stability. This increases design complexity, reduce energy density characteristics and is typically highly undesirable. One or more aspects of the present disclosure describes aspects to overcome (or significantly mitigate) one or more or all of such limitations.

One aspect of the present disclosure involves melt-infiltration (as opposed to mixing) of the SSE(s) into sufficiently thermally stable electrodes (or into the electrode/separator stacks or rolls) at elevated temperatures when the SSE is in a liquid (e.g., molten) phase. In this case a high volume fraction (e.g., around 65-90 vol. %) of the active material in the electrodes with SSE may be achieved. Another advantage is the high flexibility and processability of electrodes and membranes without electrolytes, which allows their inexpensive, high-yield, rapid assembling and densification into cylindrical or rolled pouch or hard case rolled prismatic cells prior to the SSE infiltration. This contrasts with conventional solid electrolyte cell fabrication that typically produces brittle electrodes and separators that often cannot be rolled (cannot withstand high bending radius without formation of cracks and defects). The use of melt-infiltration may enable full infiltration of the pores within the electrode or separator without additionally applied pressure and thus can be introduced after the cell assembling. Furthermore, since good wetting of the electrode material by an electrolyte generally leads to superior electrochemical performance due to faster interfacial charge transfer kinetics, liquid-like behavior of the SSE during electrode processing (melt-infiltration) may advantageously lead to a more homogenous coating of the electrode particles with solid electrolytes, thereby forming an intimate contact between the electrode particles and the solid electrolyte compositions in some applications. in some designs, such contact may advantageously result in superior stability and rate performance of the solid-state battery electrodes. Similarly, a thin SSE membrane (or SSE-based composite membranes comprising separators) may be fabricated (e.g., from around 0.5 to around 30 microns) either as a surface layer on the top of the electrode or as a composite produced by melt-infiltrating a sufficiently thermally stable porous layer (porous membrane). In some designs, such a sufficiently thermally stable porous layer may be deposited on the electrode surface prior to electrolyte infiltration.

In some designs, it may be advantageous for the electrolyte (melt) infiltration to proceed in the range from around 25.0-50.0° C. to around 700.0° C. (e.g., from around from 50.0° C. to around 700.0° C., including from around 50.0° C. to around 100.0° C. or from around 100.0° C. to around 150.0° C. or from around 150.0° C. to around 250.0° C. or from around 250.0° C. to around 350.0° C. or from around 350.0° C. to around 700.0° C.). In some designs, it may be further advantageous for the electrolyte (melt) infiltration (impregnation) to be in a more narrow range—for example, from around 25.0° C. to around 500.0° C. (in some designs, from around 50.0° C. to around 450.0° C.; in other designs, from around 60.0° C. to around 400.0° C.; in yet other designs, from around 70.0° C. to around 350.0° C.; in yet other designs, from around 80.0° C. to around 300.0° C., in yet other designs, from around 80.0° C. to around 250.0° C.

In some designs, the porous membrane may comprise more than one layer. In some designs, at least one layer of such a membrane may be electrically insulative to reduce or prevent electron conduction through the composite SSE (e.g., produced by infiltration into the membrane) in order to prevent or significantly reduce self-discharge of a cell. In some designs, different layers of the porous membrane may comprise (interconnected) particles of different size, different shape, exhibiting different porosity, having different composition, etc. In some designs, it may be advantageous for the center of the membrane to comprise larger particles (including larger elongated particles, larger (nano)fibers or larger (nano)wires or larger (nano)flakes, etc.) and/or larger pores in order to provide enhanced mechanical stability and improved performance.

In some designs, the advantageous use of melt-infiltration or melt-impregnation of the suitable SSE electrolyte(s) at elevated temperatures (when electrolyte is liquid and exhibit sufficiently low viscosity) into a sufficiently thermally stable (e.g., to avoid/reduce possibly undesirable degradation during the infiltration/impregnation procedure) separator and/or sufficiently thermally stable (to avoid/reduce possibly undesirable degradation during the infiltration/impregnation procedure) electrode(s) or both may benefit from suitable composition and properties of both the SSE and other solid state battery components (which may depend on the selected SSE) and suitable means of cell assembling and cell architecture. In other words, certain properties of the electrode and SSE electrolyte as well as certain composition and microstructure of the electrode and electrolyte may be important for such cells comprising melt-infiltration technology to perform particularly well. One or more aspects of the present disclosure provides an explanation of at least some of such properties, composition and microstructures as well as synthesis and processing routes to achieve higher performance via an intelligent pairing of electrode/SSE/electrolyte compositions and fabrication techniques for melt-infiltration solutions. In some designs, it may be particularly advantageous to attain a combination of such properties, composition and microstructures in a single cell design for optimal performance.

A desirable characteristic of solid electrolytes in some designs in accordance with one or more embodiments of the present disclosure is a low melting temperature. Such a property is commonly ignored in traditional solid electrolytes and solid-state cell designs. For example, the melting point of common oxide-based solid electrolytes (e.g., very popular garnet electrolytes) may exceed 1100° C. However, higher processing temperatures may make solid electrolyte cells too expensive or even impractical for most applications. In some designs, it may be advantageous for the electrolyte melting point to be in the range from around 50.0° C. to around 700.0° C. (e.g., from around 50.0° C. to around 100.0° C. or from around 100.0° C. to around 150.0° C. or from around 150.0° C. to around 250.0° C. or from around 250.0° C. to around 350.0° C. or from around 350.0° C. to around 700.0° C.). In some designs, it may be further advantageous for the electrolyte melting point to be in a more narrow range—for example, from around 60.0° C. to around 500.0° C. (in some designs, from around 60.0° C. to around 450.0° C.; in other designs, from around 70.0° C. to around 400.0° C.; in yet other designs, from around 70.0° C. to around 350.0° C.; in yet other designs, from around 80.0° C. to around 300.0° C., in yet other designs, from around 90.0° C. to around 250.0° C., depending on the cell composition, cell operation conditions, electrode loading, mismatch between the thermal expansion coefficient of various electrode/cell components including that of the solid electrolyte, ionic conductivity of the electrolyte at cell operating temperatures, current collectors composition, surface properties and their reactivity with the solid electrolyte as a function of temperature, binder composition and surface properties, among other factors).

Another important property of solid electrolytes in some designs in accordance with one or more embodiments of the present disclosure is viscosity above the glass transition temperature and above the melting temperature. In some designs, it may be advantageous for the electrolyte viscosity during the melt infiltration (melt-impregnation) procedure to range from around 1.0 cP (centipoise) to around 100,000 cP (in some designs, from around 100 cP to around 10,000 cP). In some designs (depending on the cell configuration, relative reactivity of components, relative thermal expansion coefficient of components, electrolyte wetting properties and/or other factors), it may be advantageous for the electrolyte viscosity at around 150° C. above the melting point (or liquidus temperature) to range from around 1 cP to around 20,000 cP. In other designs, it may be advantageous for the electrolyte viscosity at around 100° C. above the melting point (or liquidus temperature) to range from around 10 cP to around 50,000 cP. In yet other designs, it may be advantageous for the electrolyte viscosity at around 50° C. above the melting point (or liquidus temperature) to range from around 1000 cP to around 100,000 cP. In yet other designs, it may be advantageous for the electrolyte viscosity at around 5° C. above the melting point (or liquidus temperature) to range from around 2,000 cP to around 200,000 cP. In some designs, too high viscosity of the molten solid electrolyte may make the cell and electrode fabrication process inefficient, imperfect, expensive and/or result in poor cell performance.

Other desired properties of solid electrolytes in some designs in accordance with embodiments of the present disclosure are thermal stability and compositional uniformity near its melting point (or solidus and liquidus temperatures). In some designs, it may be advantageous for the solid electrolyte composition to remain a single phase (solution) in a liquid state (e.g., above the so-called liquidus temperature when all components of the solid electrolyte are liquid or above the melting point, depending on a phase diagram for a particular solid electrolyte) above at least around 25° C. of the liquidus temperature (or melting point if liquid-solid mixed region does not exist for a particular electrolyte composition) (in some designs, above at least around 100° C.; in some designs, above at least around 200° C.). So, during temperature changes of at least around 25° C. (or at least around 100° C. or at least around 200° C. or more) the molten (liquid) solid electrolyte may remain in a single phase. In some designs, decomposition of the single-phase liquid electrolyte to two or more phases during cell or cell component(s)' impregnation/infiltration with the molten electrolyte may undesirably result in poor uniformity and poor cell performance characteristics.

In some designs, it may be advantageous for solid electrolyte compositions in accordance with embodiments of the present disclosure to remain a single phase (solid solution) in a solid state (when all components of the solid electrolyte are solid) below at least around 25° C. of the so-called solidus temperature (temperature below which all components are solid) or melting point (e.g., if liquid-solid mixed region does not exist for a particular electrolyte composition). In some designs, below at least around 100° C. of the solidus temperature (in some designs, below at least around 200° C. of the solidus temperature). In some designs, decomposition of the single-phase solid electrolyte to two or more phases during cooling of the cell or cell component(s)' impregnation/infiltration with the molten electrolyte may undesirably result in poor uniformity and poor cell performance characteristics.

In some designs, it may be advantageous (although not always practically feasible) for solid electrolytes in accordance with embodiments of the present disclosure to exhibit congruent melting, where the composition of the solid (e.g., below the melting point or more generally below the solidus temperature or temperature where only solid phases exist for the solid electrolyte material composition) remains substantially the same as the composition of the liquid (e.g., above the melting point or, more generally, above the so-called liquidus temperature or temperature where only liquid phases exist for the solid electrolyte material composition). In some designs, formation of multiple distinct phases right below the electrolyte melting point may result in undesirable electrolyte nonuniformities within a cell and undesirably reduce various cell performance characteristics (stability, capacity utilization, resistance, rate, etc.).

In some designs (e.g., when the solid electrolyte comprises two or more phases and when at least one of the phases has substantially better interfacial properties with the active electrode particle surfaces), it may be advantageous for solid electrolytes in accordance with embodiments of the present disclosure to exhibit compositions that do not coincide with the congruent melting. Alternatively, it may be advantageous for the solid electrolyte near the operational temperature to comprise two or more phases, where one phase exhibits substantially better interfacial properties with the active electrode particle surfaces (e.g., better wetting, lower charge-transfer resistance, better long-term stability, etc.). It may be advantageous for this one (more favorable phase) of the solid phases formed upon cooling below the melting point (or solidus temperature) to nucleate heterogeneously on the surface of the active electrode particles to achieve lower interfacial and cell-level resistances and better stabilities.

In some designs, it may be further important that components of solid electrolytes to not have the tendency to preferentially evaporate during melting (e.g., do not exhibit partial vapor pressure above 0.05 atm at or near the melt-infiltration temperature).

In some designs, solid electrolytes in accordance with embodiments of the present disclosure may exhibit a moderate density in the range from around 0.65 g/cm$^3$ to around 3.25 g/cm$^3$ (in some designs, from around 1.00 to around 2.70 g/cm$^3$). In some designs, too high density may lead to undesirably low specific energy and undesirably low specific power at the cell level. In addition, in some designs, too high density may also correlate with the presence of substantial content of heavy elements in the composition that may also lead to undesirable performance characteristics or undesirable other factors for the solid electrolyte composing cells, such as higher toxicity, cost, production yield, etc. Too high (e.g., above around 3.5-4 g/cm3) solid electrolyte densities (too high or even too low) may also be associated with the formation of the undesirable properties of the interface or interphase between active electrode material and the solid electrolyte.

In some designs, solid electrolytes in accordance with embodiments of the present disclosure may exhibit moderate values of the thermal expansion coefficient in order to produce cells with high yield and robust microstructure. Stresses induced in the electrodes or the cells during cooling from melt-infiltration temperatures may induce cell failure during the battery operation, particularly if cells may be subjected to additional stresses (e.g., if the cells are dropped or hit or subjected to additional stresses during cycling or handling, etc.). In some designs, the optimal value of the thermal expansion coefficient may depend on multiple factors, including electrode density, electrode thickness, melt-infiltration temperature, cell operation, composition of the active material and the electrodes, among others. However, suitable values for the volumetric thermal expansion coefficient (at atmospheric pressure and room temperature) a may generally be in the range from around $8 \cdot 10^{-7}$ K$^{-1}$ to around $8 \cdot 10^{-4}$ K$^{-1}$ in some designs. In some designs, total thermal shrinkage of the electrolyte from the highest temperatures electrodes and cells are exposed to (e.g., during melt infiltration) to the lowest temperature (e.g., during operation or storage in cold climates or cold storage room) may preferably be in the range from around 0.01 vol. % to around 20.00 vol. % (in some designs, from around 0.1 vol. % to around 10.0 vol. %).

In some designs, solid electrolytes in accordance with embodiments of the present disclosure may exhibit moderate ductility at the operational temperatures (or storage temperatures, in some design). In some designs, the minimum value of the sustainable strain or ductility depends on multiple factors, such as electrode and cell composition and thickness, stresses during operation, thermally-induced stresses and strain, cycling-induced stresses, porosity, distribution of the pores within the electrodes or other cell components, distribution of the pore sizes and strain among other factors. However, in some designs, a suitable range of the maximum compressive strain (at around 60° C.) may generally be from around 0.1% to around 500.0% (in some designs, from around 1.0% to around 100.0%) and a suitable range of the maximum tensile strain (at around 60° C.) may generally be from around 0.1% to around 500% (in some designs, from around 1.0% to around 50.0%).

In some designs, solid electrolytes in accordance with embodiments of the present disclosure may exhibit moderate values of Young's modulus (at room temperature) in the range from around 0.1 GPa to around 100.0 GPa (in some designs, from around 5 GPa to around 60 GPa). In some designs, solid electrolytes in accordance with embodiments of the present disclosure may exhibit moderate values of Shear modulus (at room temperature) in the range from around 0.03 GPa to around 25.0 GPa (in some designs, from around 1 GPa to around 20 GPa). In some designs, some or all solid electrolytes used in a cell in accordance with embodiments of the present disclosure may exhibit moderate average values of Vickers hardness (at room temperature) in the range from around 0.01 GPa to around 5.0 GPa (in some designs, from around 0.1 GPa to around 3.0 GPa). In some designs, too high or too low values for the modulus or hardness may lead to reduced stability or performance characteristics of solid electrolyte-based cells in accordance with embodiments of the present disclosure.

In some designs, solid electrolytes in accordance with embodiments of the present disclosure may exhibit small or moderate grain size at operational temperatures, particularly when melt-infiltrated into electrodes (or separators). In some designs, small grain size in solid electrolyte may improve cell stability and performance and may reduce a probability of lithium dendrites penetrating through the solid electrolyte. While the optimal grain size range may depend on the solid electrolyte composition, cell construction and many other features, suitable average grain size for some designs may range from around 0.0 nm (fully amorphous composition) to around 5000 nm (in some designs, from around 0.0 nm to around 500.0 nm; in yet other designs, from around 0.0 nm to around 200.0 nm). In some designs, it may also be important for the solid electrolyte not to exhibit macroscopic defects (e.g., such as voids, cracks, etc.) in excess of around 10,000 $nm^3$ in volume per defect.

In some designs, solid electrolytes in accordance with embodiments of the present disclosure may exhibit relatively high conductivity at 25 and 60° C. In particular, some designs, the total ionic conductivity may range from around $5 \cdot 10^{-6}$ S/cm to around $10^{-1}$ S/cm at 60° C. (in some designs, Li+ transport-related portion of the ionic conductivity may range from around $5 \cdot 10^{-4}$ S/cm to around $5 \cdot 10^{-2}$ S/cm at around 60° C. for some or all of the solid electrolyte in the cell). In some designs, the ionic conductivity may preferably range from around $3 \cdot 10^{-6}$ S/cm to around $5 \cdot 10^{-2}$ S/cm at 25° C. (in some designs, Li+ transport-related portion of the total ionic conductivity may range from around $10^{-5}$ S/cm to around $10^{-2}$ S/cm at around 25° C.). In some designs, the Li+ transfer number of the solid electrolytes in accordance with embodiments of the present disclosure may preferably range from around 0.5 to around 1.0 in the temperature range where the solid electrolytes and cells comprising said solid electrolytes are operating.

In some designs, solid electrolytes in accordance with embodiments of the present disclosure may exhibit relatively low conductivity for non-Li (e.g., transition) metal ions. In some designs, the conductivity of Li cations in such electrolytes exceed the conductivity of the non-Li metal cations that may be present in the cathode or the SSE compositions of the SSE-comprising cell (e.g., Fe cations, Cu cations, Co cations, Ni cations, Mn cations, Al cations, Bi cations, Mg cations, In cations, Y cations, H cations, etc.) by at least 100 times (more preferably by 1000 times or more; in some designs, by 10,000 times or more).

In some designs, suitable solid electrolytes in accordance with embodiments of the present disclosure may comprise various polymer-salt mixtures, wherein the salt comprises Li cations. In some designs, salt anions may be chemically attached to the polymer in order to maximize Li transfer number and overall cell performance. As used herein, such polymer-based SSE may be termed "organic". As an example, organic SSEs can immensely benefit from the cheap and virtually endless source of organic compounds and richness of organic synthesis. As a further example, organic SSEs can be either simple small molecules (SMEs) or polymers (SPEs). Both SMEs and SPEs could be single-ion conducting SSEs or may serve as hosts for a dual ion-conducting salt (e.g., LiFSI, LiTFSI, other Li imide salts, among many others). in an example, because of the long chains, the SPEs are largely non-mobile. Furthermore, in an example, their low glass transition temperatures and amorphous nature may advantageously reduce or minimize their tendency towards grain formation and promote lower crystallinity, higher conductivity and higher Li-ion transference number (fraction of the total ionic conductivity contributed by Li ions).

Many thermoplastic polymers can be melted. However, many of those polymers are not ideal to be used as SPEs for some applications because of their inferior Li-ion conducting properties as well as undesirable mechanical, thermal, chemical and/or physical properties. There are also some polymers whose structures may potentially be very attractive for fast Li-ion transport, but such polymers may be difficult to melt-infiltrate for some applications, as heating may undesirably lead to direct decomposition of those SPEs.

In some designs, amorphous SPEs at the operational temperature may offer superior performance characteristics. While amorphous compounds typically do not melt, such amorphous compounds may change their phase at higher temperatures, subsequently becoming more crystalline and then melt.

In some designs, instead of direct melt-infiltration of the SPEs, it may be advantageous to utilize polymerizable monomer units that may be infiltrated directly in a liquid state (in some cases at elevated temperatures and in some cases at near the room temperature or even below). Either melt-infiltration or solution infiltration techniques may be used for infiltrating solid monomers. In some designs, solvent-free infiltration (e.g., melt infiltration in a liquid state) may be preferable as it may not require substantial electrode densification after the SPE precursor incorporation and does not require solvent handling and solvent-associated degradations. Once such monomers are infiltrated into the electrodes(s) or the separator or both, the respective monomers may be subsequently polymerized to obtain a homogeneous solid composition.

Polymers for use in SPEs for Li metal and Li-ion batteries may be divided into two types based on whether they have Li-ion in their structure or not. In some applications, polymers with Li-ion in their structures may be directly used as single-Li ion conducting SPE in neat form, provided they have good Li-ion conducting properties, suitable mechanical, chemical and physical properties. In some designs, the polymers that do not contain Li-ions in their structure may serve as SPE hosts for a small molecule (e.g., a polymer containing Li-ions). Examples of suitable small molecular Li-ion containing salts include, but are not limited to, $LiPF_6$, while less common salts include lithium tetrafluoroborate ($LiBF_4$), lithium perchlorate ($LiClO_4$), lithium bis(oxalato) borate ($LiB(C_2O_4)_2$), lithium difluoro(oxalate)borate ($LiBF_2(C_2O_4)$), various lithium imides (such as $SO_2FN$—(Li+)$SO_2F$, $CF_3SO_2N$—(Li+)$SO_2CF_3$, $CF_3CF_2SO_2N$—(Li+)$SO_2CF_3$, $CF_3CF_2SO_2N$—(Li+)$SO_2CF_2CF_3$, $CF_3SO_2N$—(Li+)$SO_2CF_2OCF_3$, $CF_3OCF_2SO_2N$—(Li+)$SO_2CF_2OCF_3$, $C_6F_5SO_2N$—(Li+)$SO_2CF_3$, $C_6F_5SO_2N$—(Li+)$SO_2C_6F_5$ or $CF_3SO_2N$—(Li+)$SO_2PhCF_3$, and others), and others. In some designs, a polymeric Li-ion source may advantageously be used within a host SPE. in some designs, the infiltration in this case may be governed by melting properties of the polymer or that of the monomer which may be subsequently polymerized.

In some designs, thermal polymerization may be advantageously utilized to form single Li-ion conducting SPEs.

FIG. 2 shows illustrating examples of suitable polymer structures which may be synthesized by thermal polymerization reaction in the presence of a small amount of one or more radical initiators (e.g., azobisisobutyronitrile (AIBN) and/or others) in accordance with embodiments of the disclosure. Note that Me is a methyl group in FIG. 2. In other designs, this methyl group may be substituted with other suitable groups, such as ethyl (Et), propyl (Pr), butyl (Bu), phenyl (Ph), among others. Some of such groups may be fluorinated in some designs. The synthesis procedures for such polymers are well-known but have been largely overlooked for use in SPE applications. Furthermore, there is a general industry-wide lack of understanding and/or interest with regard to the importance to utilize such polymers for (melt) infiltration. In some designs, Li-ion containing homopolymers, block copolymers and/or block copolymers with some spacer groups that allow further tuning of thermal and mechanical properties may be synthesized by this technique and utilized in suitable SPE compositions.

In some designs, photochemical polymerization may be advantageously utilized to produce single Li-ion conducting SPEs.

FIG. 3 shows illustrating examples of suitable polymer structures which may be synthesized by photochemical polymerization in accordance with embodiments of the disclosure. Such structures may be applicable to monomers as well as polymers (e.g., the chemistry is typically compatible with both approaches). in some designs, thiol-end polymerization may afford single Li-ion conducting SPEs, by reaction between alkene monomers and thiols. In some designs, an advantage of using such polymers is that the thiol groups are mildly coordinating, which may be beneficial for Li-ion transport.

Figure 4:
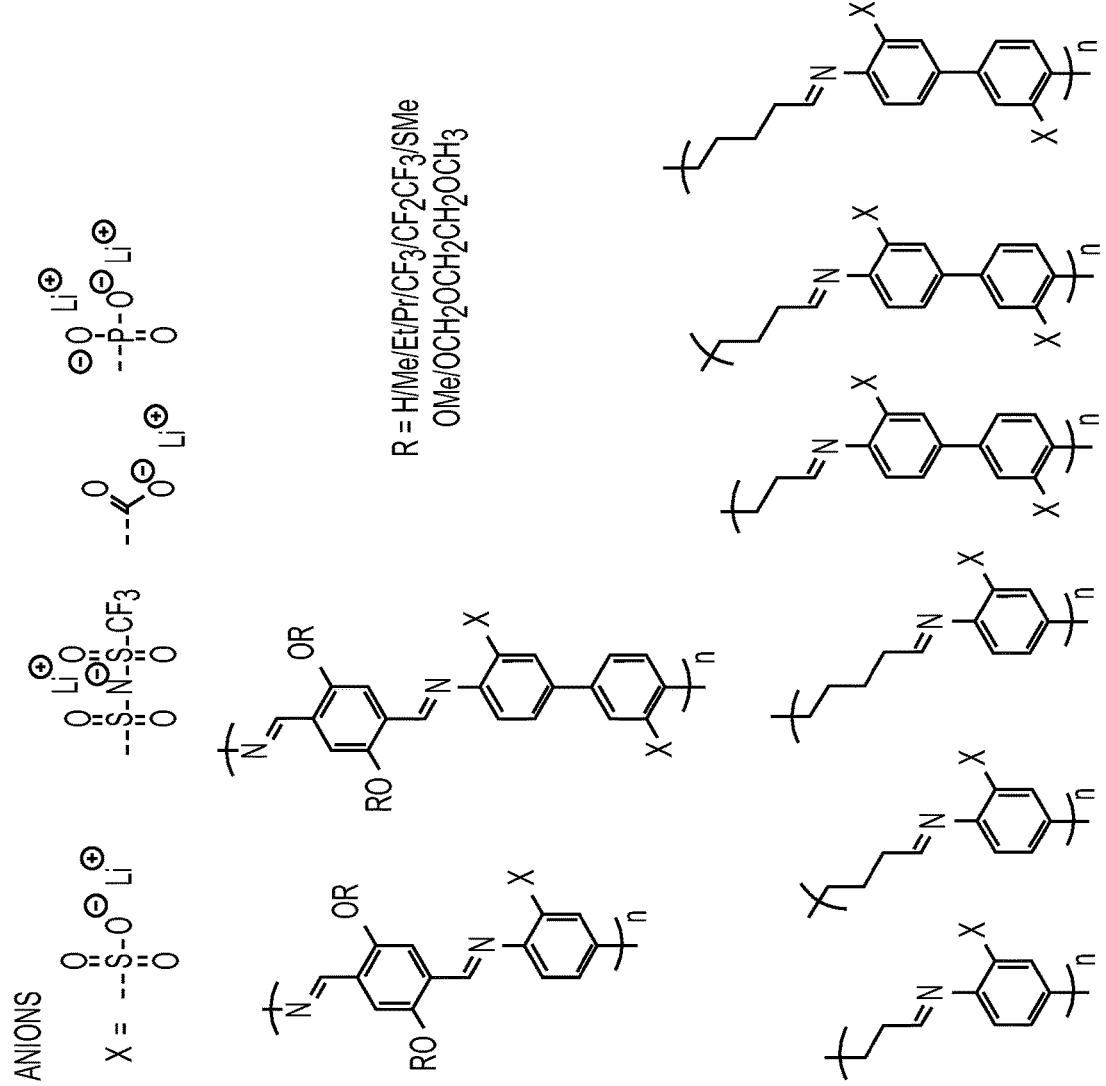

Both thermal and photochemical means may allow polymerization of the melt-infiltrated monomers for some applications. In some designs, the stimulus for such types of polymerization is heat or light or both. In some designs, other reagent chemistries may be advantageously utilized even though they may require the use of suitable solvents for polymerization reactions to proceed and may not be compatible with monomer infiltration and subsequent monomer polymerizations. In such cases, polymer may be synthesized ex-situ (before melt-infiltration) and subsequently used for direct melt infiltration in some applications. FIG. 4 shows illustrating examples of suitable polymer structures which may be used in such an approach polymerization in accordance with embodiments of the disclosure.

As previously described, in some designs, non-lithiated polymers may be used in SPEs as hosts for inorganic or organimetallic Li-ion containing small molecules. As noted above for single Li-ion conducting polymers, melt-infiltration of monomers (along with the corresponding Li salt or salt mixture) may be used only if polymerization involves thermal and photochemical procedures for some applications. In other cases, in some applications, a certain ratio of a solid homogeneous mixture of polymer and Li-salt may be infiltrated together. In some designs, undesired mobility of the anions may be mitigated by having certain functionalities which can favorably interact with the anion (e.g., via H-bonding and ion-ion interactions), meaningfully reducing its mobility and increasing Li-ion transference number.

FIG. 5 shows illustrating examples of suitable polymer structures which may be used as SPE components together with inorganic or organimetallic Li-ion containing small molecules in accordance with embodiments of the disclosure. Note that Me is a methyl group in FIG. 5. in other designs, this methyl group may be substituted with other suitable groups, such as ethyl (Et), propyl (Pr), butyl (Bu), phenyl (Ph), among others. Some of such groups may be fluorinated in some designs.

In some designs, a fraction of under-reacted or un-reacted monomers (e.g., from around 0.01% to around 10 vol. %) may remain within the SPEs and the electrodes that comprise these SPEs. In some designs, their presence may enhance rate performance of batteries, particularly at lower temperatures, or improve other cell characteristics.

In some designs, polymerized ionic liquids (ILs) may be advantageously utilized in the SPE designs according to one or more embodiments of the present disclosure (together with inorganic or organimetallic Li-ion containing small molecules). Such SSEs may offer enhanced chemical and electrochemical stability in some designs.

FIG. 6 shows illustrating examples of the suitable L structures which may be used as SPE components together with inorganic or organometallic Li-ion containing small molecules in accordance with embodiments of the disclosure. Note that Me is a methyl group in FIG. 6. In other designs, this methyl group may be substituted with other suitable groups, such as ethyl (Et), propyl (Pr), butyl (Bu), phenyl (Ph), among others. Some of such groups may be fluorinated in some designs.

In some designs, instead of "pure" SPEs, one may advantageously use small ceramic particles (e.g., with average characteristic minimal dimensions (e.g., diameter or thickness) in the range from around 1 nm to around 100 nm) as additives (e.g., added, for example, in the range from around 0.01 vol. % to around 20 vol. %; in some designs, from around 0.5 vol. % to around 10 vol. % to SPEs) to form inorganic-organic SSEs. In some designs, it may be preferable for such ceramic particles to be electronical insulators (e.g., having electronic bandgap in the range from around 1 eV to around 10 eV). In some designs, such ceramic particles may be in the form of nanoflakes or nanowires or nanofibers or nanotubes or nanoribbons or near-spherical (e.g., potato-shaped) particles. In some designs, suitable small ceramic particles may advantageously comprise oxygen (e.g., comprise oxides). In some designs, small ceramic particles may comprise one, two or more of the following metals: Li, Na, Mg, K, Ca, Al, Ti, Fe, Cu, Ni, La, Y, Ce, B, Sc, Zn, Ga, Sr, Y, Zr, Nb, Mo, Cd, In, Sn, Sb, Si, Ge, Cs, Ba, La, Ce (or other lanthanoids), Hf, Ta or Bi. In some designs, suitable small ceramic particles may advantageously comprise inorganic SSEs with conductivities in the range from around $10^{-5}$ to around $10^{-1}$ S cm$^{-1}$ at 60° C. In some designs, the presence of inorganic particles may reduce ability of polymers to crystallize, enhance the SPE conductivity and long-term cycle stability. In some designs, small polymer particles (of distinctly different composition or mechanical properties or glass transition temperature or microstructure from the "matrix" SPE) may be used instead of (or in addition to) small ceramic particles. In some designs, such polymer particles may exhibit ionic conductivity in the range from around $10^{-7}$ to around $10^{-1}$ S cm$^{-1}$ at 60° C.

In some applications, Li-ion based inorganic solid electrolytes of suitable conductivity, melting point, elastic modulus, density and other factors may be fabricated using various elements of the periodic table.

In some designs, suitable solid electrolytes in accordance with embodiments of the present disclosure may comprise inorganic Li-containing and halide-containing salts. In some designs, such solid electrolytes may comprise lithium metal halides, where at least one, but often preferably two, three, four or more different non-Li metals and one, two or more different halides (Cl, F, Br, etc.) may be advantageously utilized, and wherein all such elements (Li, two or more non-Li metal(s), one or more halides) are present in the excess of around 0.05 at. %. Examples of suitable non-Li metals for the solid electrolyte compositions may include, but are not limited to: H, B, Na, K, Sc, Mg, Be, Ca, Al, Zn, Ga, Sr, Y, Zr, Nb, Mo, Cd, In, Sn, Sb, Si, Ge, Cs, Ba, La, Ce (or other lanthanoids), Hf, Ta and Bi. In some designs, the fraction of Li may range from around 5.0 at. % to around 40.0 at. % (as % of all elements in the electrolyte composition). In some designs, the fraction of K may range from around 1 at. % to around 20 at. % (as % of all elements in the electrolyte composition). In some designs, the fraction of Zn may range from around 1 at. % to around 20 at. % (as % of all elements in the electrolyte composition). In some designs, the fraction of Al may range from around 1.0 at. % to around 20.0 at. % (as % of all elements in the electrolyte composition). In some designs, the fraction of Y may range from around 1.0 at. % to around 20.0 at. % (as % of all the elements in the solid electrolyte composition). In some designs, the fraction of In may range from around 1.0 at. % to around 20.0 at. % (as % of all the elements in the solid electrolyte composition). In some designs, the fraction of Sn may range from around 1.0 at. % to around 20.0 at. % (as % of all the elements in the solid electrolyte composition). In some designs, the fraction of Sb may range from around 1.0 at. % to around 20.0 at. % (as % of all the elements in the solid electrolyte composition). In some designs, both Y and Zn may be advantageously present in the electrolyte. In some designs, both Y and Al may be advantageously present in the electrolyte. In some designs, both Zn and Al may be advantageously present in the electrolyte. In some designs, both K and Al may be advantageously present in the electrolyte. In some designs, both K and Zn may be advantageously present in the electrolyte. In some designs, the fraction of Cl may range from around 10.0 at. % to around 70.0 at. % (as % of all elements in the electrolyte composition). In some designs, the fraction of Br may range from around 10 at. % to around 70 at. % (as % of all elements in the electrolyte composition). In some designs, both Br and Cl may be advantageously present in the electrolyte. In some designs, the fraction of Mg may range from around 0.2 at. % to around 20.0 at. % (as % of all elements in the electrolyte composition). In some designs, both Mg and Zn may be advantageously present in the electrolyte. In some designs (e.g., when cathodes exhibiting substantial capacity in the potential range above around 2.6 V vs. Li/Li$^+$), it may be advantageous for such solid electrolyte composition not to comprise I (iodine).

Illustrative examples of suitable approximate solid electrolyte compositions may include, but in no way limited to: $Li_2Zn_{0.5}AlCl_6$, $Li_2Zn_{0.5}AlBr_6$, $Li_2KAlBr_6$, $Li_2KAlF_{0.25}Br_{5.75}$, $Li_2KAlCl_4Br_2$, $LiZnAlBr_6$, $Li_{0.6}Zn_{1.2}AlBr_6$, $Li_2Zn_{0.5}AlCl_3Br_3$, $Li_3Zn_{0.5}Al_{0.67}Cl_6$, $Li_3Zn_{0.5}Al_{0.67}Br_6$, $Li_2KZn_{0.5}Al_{0.67}Br_6$, $Li_3Zn_{0.5}Al_{0.67}Cl_3Br_3$, $Li_3Sc_{0.5}Y_{0.5}Br_6$, $Li_3Sc_{0.5}Y_{0.5}Cl_3Br_3$, $Li_3Sc_{0.5}Y_{0.5}Cl_4Br_2$, $Li_3KY_{0.66}Br_6$, $Li_3KY_{0.66}Cl_4Br_2$, $Li_2KY_{0.1}Al_{0.9}Br_6$, $Li_2KY_{0.1}Zn_{0.1}Al_{0.83}Br_6$, $Li_2KY_{0.1}Zn_{0.1}Al_{0.83}Cl_2Br_4$, $Li_3BaY_{0.33}Cl_4Br_2$, $Li_3MgY_{0.33}Br_6$, $Li_3MgY_{0.33}Cl_4Br_2$, $Li_2Mg_{0.5}Al_{0.33}Y_{0.66}Br_6$, $Li_2Mg_{0.5}Al_{0.33}Y_{0.66}Cl_4Br_2$, $Li_2NaInBr_6$, $Li_2KInBr_6$, $Li_2CsInBr_6$, $LiMgInBr_6$, $LiBeInBr_6$, $Li_2NaInCl_6$, $Li_2KInCl_6$, $Li_2CsInCl_6$, $LiMgInCl_6$, $LiBeInCl_6$, $Li_2NaInBr_3C_3$, $Li_2KInBr_3C_3$, $Li_2CsInBr_3C_3$, $LiMgIn Br_3Cl_3$, $LiBeInCl_4Br_2$, $Li_2NaInCl_4Br_2$, $Li_2KInCl_4Br_2$, $Li_2CsInCl_4Br_2$, $LiMgInCl_4Br_2$, $LiBeInCl_4Br_2$, $Li_3Al_{0.5}In_{0.5}Br_6$, $Li_2KAl_{0.6}In_{0.4}Br_6$, $Li_3Al_{0.5}In_{0.5}Cl_5Br$, $Li_2KAl_{0.9}In_{0.1}Br_6$, $Li_3Sc_{0.5}In_{0.5}Br_6$, $Li_3Sc_{0.5}In_{0.5}Cl_3Br_3$, $Li_3Sc_{0.5}In_{0.5}Cl_4Br_2$, $Li_3KIn_{0.66}Br_6$, $Li_3KIn_{0.66}Cl_4Br_2$, $Li_2KIn_{0.1}Al_{0.9}Br_6$, $Li_2KIn_{0.1}Zn_{0.1}Al_{0.83}Br_6$, $Li_2KIn_{0.1}Zn_{0.1}Al_{0.83}Cl_2Br_4$, $Li_3BaIn_{0.33}Cl_4Br_2$, $Li_3MgIn_{0.33}Br_6$, $Li_3MgIn_{0.33}Cl_4Br_2$, $Li_2Mg_{0.5}Al_{0.33}In_{0.66}Br_6$, $Li_2Mg_{0.5}Al_{0.33}In_{0.66}Cl_4Br_2$, $Li_3Al_{0.5}In_{0.5}Br_6$, $Li_2KAl_{0.6}In_{0.4}Br_6$, $Li_3Al_{0.5}In_{0.5}Cl_5Br$, $Li_2KAl_{0.9}In_{0.1}Br_6$, similar electrolyte composition versions with different relative content of the elements, their various mixtures and many others that may comprise (i) Li, (ii) two, three, four or more different non-Li metals from the list of (H, B, Na, Mg, Al, K, Ca, Sc, Zn, Ga, Sr, Y, Zr, Nb, Mo, Cd, In, Sn, Sb, Si, Ge, Cs, Ba, La, Ce, other lanthanoids, Hf, Ta and Bi) and (iii) one, two or more different halogens.

Figure 7:
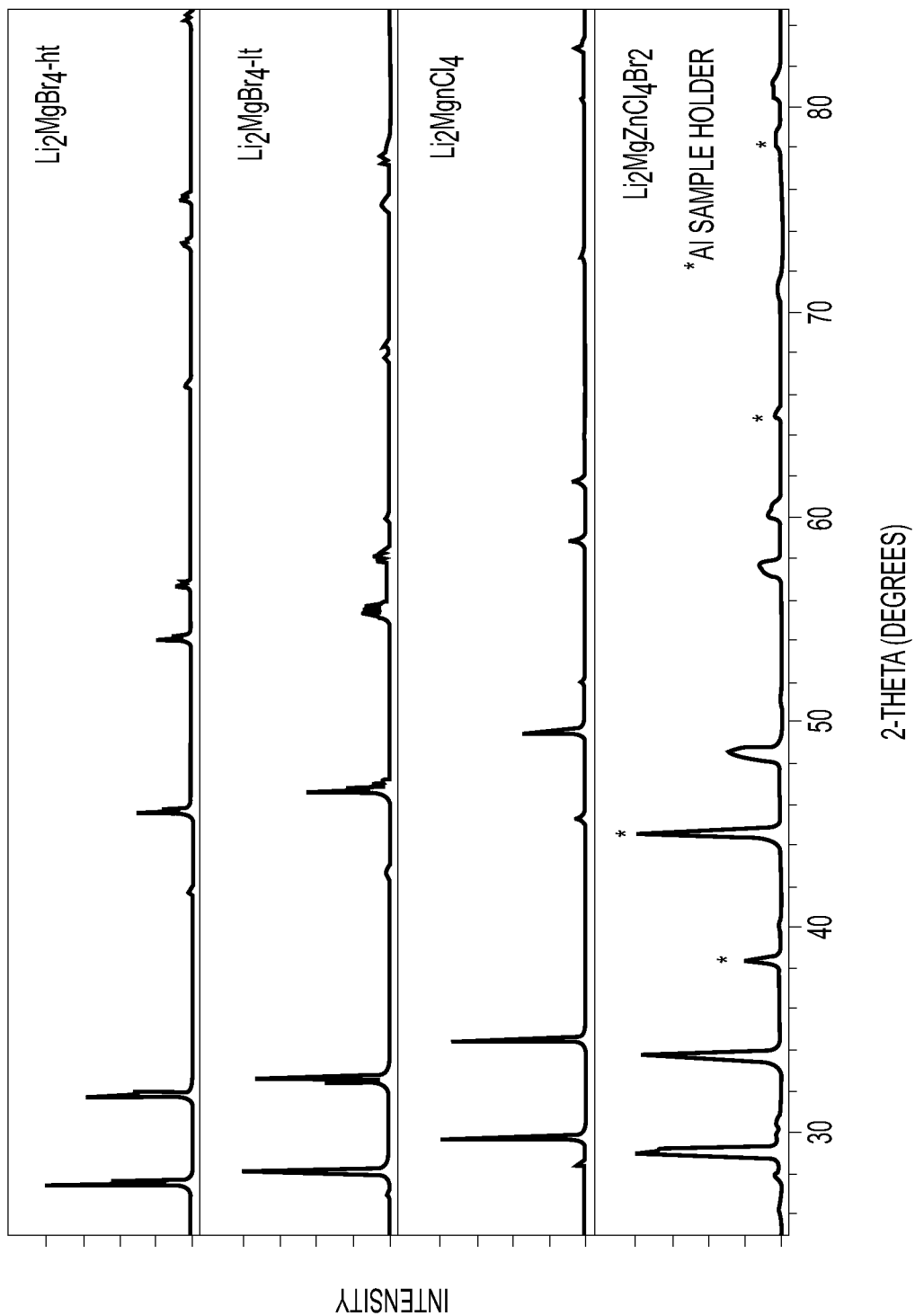
FIG. 7 illustrates an X-ray diffraction pattern of an example polycrystalline solid electrolyte with the composition of $Li_2MgZnCl_4Br_2$.

Illustrative example of one solid electrolyte composition is $Li_2MgZnCl_4Br_2$ with a melting point of around 530° C., ionic conductivity of around $0.5 \cdot 10^{-5}$ S cm$^{-1}$ at around 60° C., Li fraction of around 20 at. %, Mg fraction of around 10 at. %, Zn fraction of around 10 at. %, Cl fraction of around 40 at. %, and Br fraction of around 20 at. %. FIG. 7 shows X-ray diffraction analysis of the produced example composition of the $Li_2MgZnCl_4Br_2$ SSE. This electrolyte was produced according to the following protocol: (1) a stochiometric mixture of $LiBr$, $MgCl_2$, and $ZnCl_2$ were ground together in an inert environment; (2) heated to 450° C. for 20 hours and (3) cooled down to room temperature for further use in SSE membrane and/or melt-infiltration into thermally stable electrodes and membranes.

In some designs, Li-containing and halide-containing solid electrolytes with suitable (in accordance with one or more embodiments of the present disclosure) thermal, mechanical, microstructural, ionic conductivity and other properties may comprise a single non-Li metal. Such an approach may offer reduced flexibility in terms of attaining the most desirable combination of properties but may offer simplicity in terms of the fabrication procedure or other benefits (e.g., reduced cost, etc.).

An example of one solid electrolyte composition is $Li_3InBr_6$, which exhibits a melting point of around 270° C., an ionic conductivity of around $10^{-4}$ S cm$^{-1}$ at around 60° C., and Li fraction of around 30 at. %, In fraction of around 10 at. %, Br fraction of around 60 at. %.

Figure 8A:
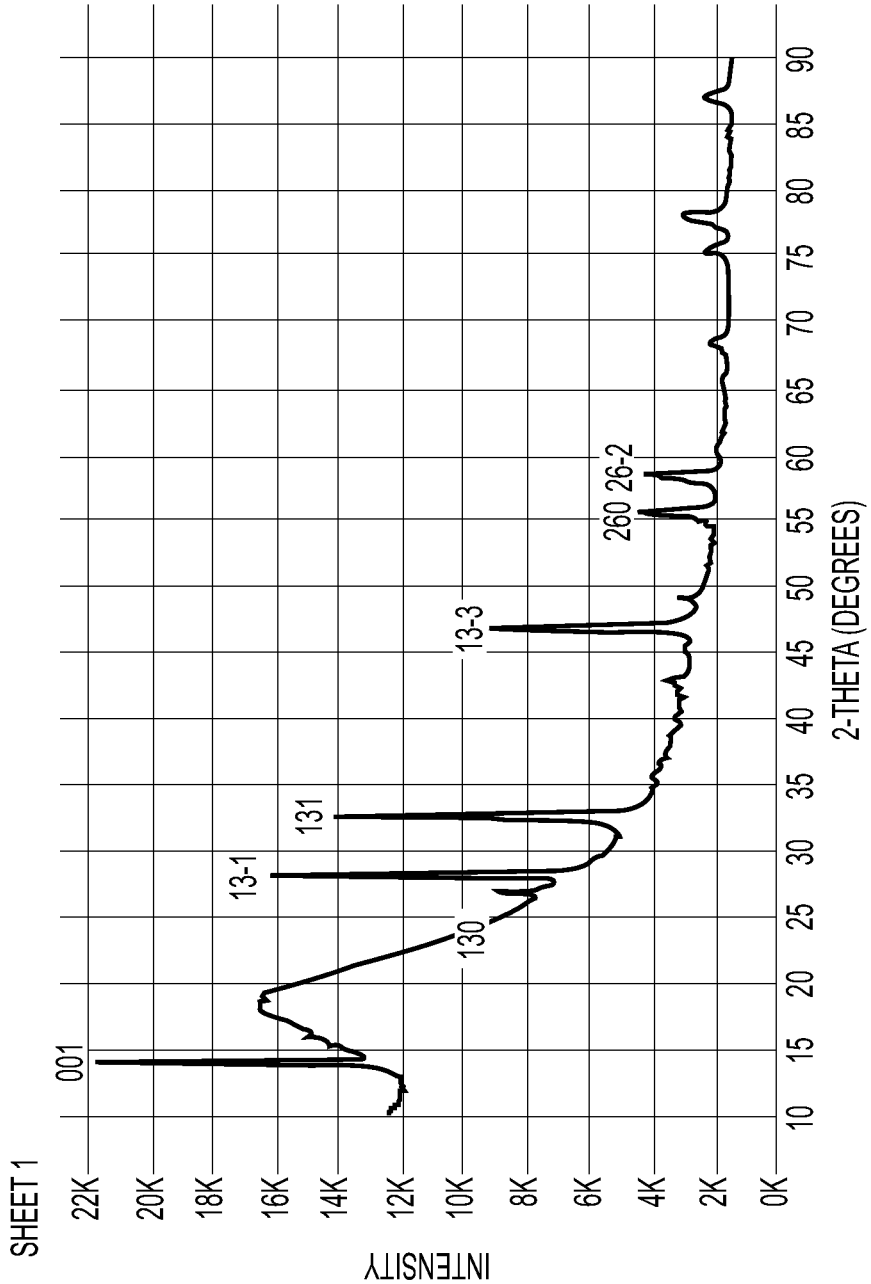
FIG. 8A-8C illustrate an X-ray diffraction pattern of example composition of $Li_3InBr_6$; differential thermal analysis of example composition of $Li_3InBr_6$ and an X-ray diffraction pattern of example composition of $Li_3InCl_6$ solid electrolytes in accordance with an embodiment of the disclosure.
Figure 8B:
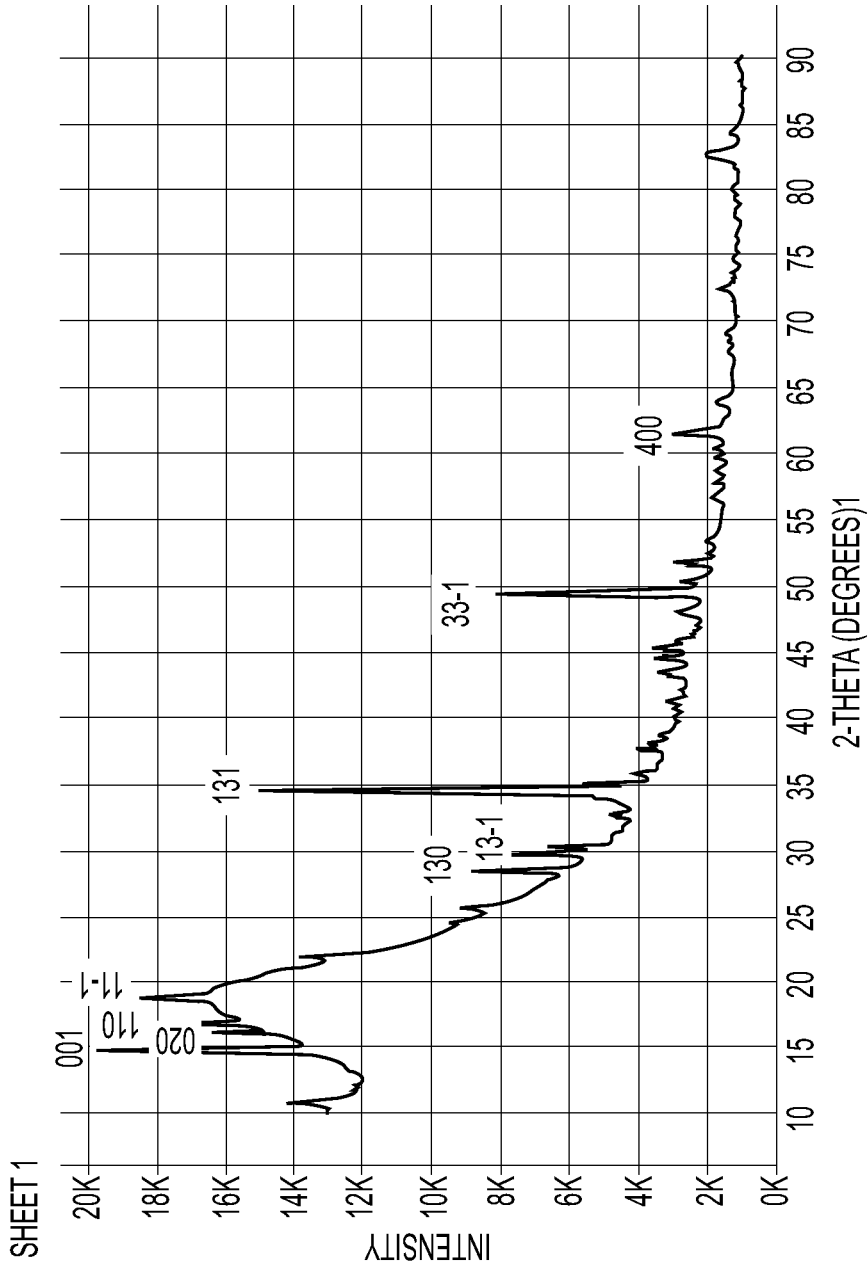
Figure 8C:
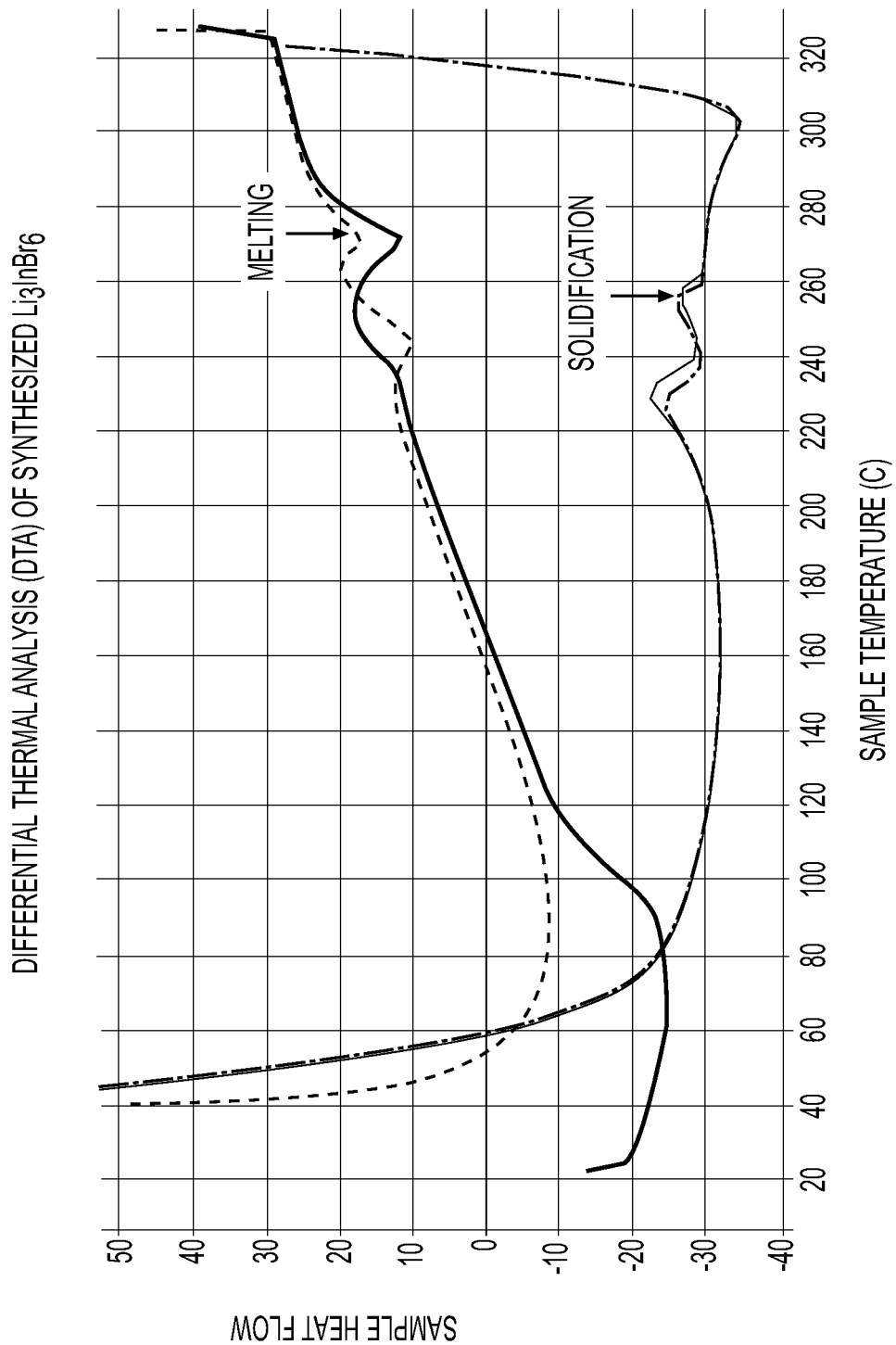

FIGS. 8A and 8C show X-ray diffraction analyses of produced example compositions of $Li_3InBr_6$ and $Li_3InCl_6$ SSEs (or SSE components) in accordance with an embodiment of the disclosure. FIG. 8B shows differential thermal analysis of $Li_3InBr_6$, the results of which indicate its low melting and solidification temperatures (at or slightly below around 270° C.) in accordance with an embodiment of the disclosure.

In some designs, in the context of one or more embodiments of the present disclosure, some illustrative examples of suitable halide-based solid electrolytes may be described as: $(LiHal1)_x(M1Hal2_{Ma1})_y(M2Hal3_{Ma2})z$, where Hal is a halogen or halogen mixture selected from Cl, Br, F and I, where M1 is a metal (with a valency of Ma1) or metal mixture selected from Y, Sc, La, Ce and other lanthanoids; and where M2 is a metal (with a valency of Ma2) or metal mixture selected from K, Na, Cs, Ca, Mg, Ba, Al, Zn, Si, Sn, Sb, Ga and In. Note that in some designs, the suitable composition of the metals in the halide-based solid electrolyte may be related to their stability against reduction on the anode surface. In the most challenging case of Li metal anodes, some of the metals may be undesirably reduced on the anode surface, thus forming electrically conductive compositions, which may trigger further solid electrolyte decomposition and gradual cell failure. For example, halides of Zn, Al, Si, Sn, Sb, In, Ga have stronger tendencies to be electrochemically reduced near Li metal potentials and so their atomic fraction in the solid electrolytes may preferably be limited in some designs (e.g., in some designs, to below around 5 at. % or below around 1 at. %). In contrast, halides of K, Na and Ca may be relatively stable in near Li metal potentials and so their atomic fraction in the solid electrolytes may preferably be relatively high in some designs (e.g., in some designs, at or above around 5-20 at. %). Similarly, in some designs, the cathode potential may be examined for the optimization of the SSE composition. Indeed, some SSE compositions may be undesirably oxidized (while reducing the cathode material) at some higher potentials. For example, chloride or bromide of Al are noticeably less stable than, for example, chlorides or bromides of Mg, Ca, Zn, Ga, In, Bi, La and Ce at higher potentials (note: Ca and Mg fluorides and chlorides may be particularly stable against oxidation in some designs). In some applications, the composition of halogen also plays a role. For example, fluoride of Al is noticeably more stable at elevated potentials than, for example, iodide or chloride or bromide of Al. In most designs, fluorides are more stable against oxidation than chlorides. However, fluorides tend to undesirably increase SSE melting point. It is noted that both thermodynamics and kinetics predicts significant dependences in the rate of electrochemical reactions (between electrodes and SSE at the same electrochemical potential) on the composition of the electrode surface in contact with the SSE. As such, SSE compositions (for halides' based and other SSEs) may be carefully optimized for particular anode and cathode chemistries, conditions (incl. temperature) of operation, etc. Furthermore, deposition of protective (against electrolyte decomposition) surface layers on the electrode surfaces may be advantageously used in some designs. Some combinations of electrode and SSE chemistries, however, may also form protective (passivating) surface layer in-situ (during battery assembling or during so-called "formation" cycling).

In some designs, Li-containing and halide-containing solid electrolytes with suitable (in accordance with one or more embodiments of the present disclosure) thermal, mechanical, microstructural, ionic conductivity and other properties may additionally comprise oxygen (O). In some designs, the presence of oxygen may also enhance stability of the solid electrolyte against reduction at low potentials (e.g., near Li metal). For example, yttrium oxide, lanthanum oxide, scandium oxide, calcium oxide, magnesium oxide, aluminum oxide and zirconium oxide exhibit substantially better stability against reduction (and the formation of their corresponding metal components) at or near Li metal potentials compared to their halide analogs (yttrium halide, lanthanum halide, scandium halide, calcium halide, magnesium halide, aluminum halide, zirconium halide, etc.). As such, solid electrolyte comprising such metal may particularly benefit from the incorporation of oxygen in their composition, particularly in applications where the solid electrolyte is arranged proximate to Li metal. However, care must be taken when optimizing the solid electrolyte composition for particular anode-comprising cells because the oxides of some other metals are less stable at or near Li metal potentials compared to their halide analogs. For example, Na and K halides (e.g., chlorides, bromides, mixed halides, etc.) are more stable at or near Li metal potentials (e.g., in contact with Li metal anode) than their corresponding oxides. Similarly, in some designs, the presence of O in the SSE may facilitate better stability at higher (cathode) potentials.

In some designs, the fraction of O may range from around 0.1 at. % to around 40.0 at. % (as % of all elements in the electrolyte composition).

In some designs, Li-containing and halide-containing solid electrolytes with suitable (in accordance with one or more embodiments of the present disclosure) thermal, mechanical, microstructural, ionic conductivity and other properties may additionally comprise sulfur (S). In some designs, the fraction of S may range from around 0.1 at. % to around 30.0 at. % (as % of all elements in the electrolyte composition).

In some designs, Li-containing and halide-containing solid electrolytes with suitable (in accordance with one or more embodiments of the present disclosure) thermal, mechanical, microstructural, ionic conductivity and other properties may additionally comprise selenium (Se). In some designs, the fraction of Se may range from around 0.1 at. % to around 30.0 at. % (as % of all elements in the electrolyte composition).

In some designs, Li-containing and halide-containing solid electrolytes with suitable (in accordance with one or more embodiments of the present disclosure) thermal, mechanical, microstructural, ionic conductivity and other properties may additionally comprise nitrogen (N). In some designs, the fraction of N may range from around 0.1 at. % to around 20.0 at. % (as % of all elements in the electrolyte composition).

In some designs, Li-containing and halide-containing solid electrolytes with suitable (in accordance with one or more embodiments of the present disclosure) thermal, mechanical, microstructural, ionic conductivity and other properties may additionally comprise phosphorous (P). In some designs, the fraction of P may range from around 0.1 at. % to around 20.0 at. % (as % of all elements in the electrolyte composition).

Oxidation and reduction stability of halide-based and most other solid state electrolytes (SSEs) in contact with anode and cathode materials at their corresponding potentials during charging need to be considered when optimizing the SSE composition for use in solid state Li and Li-ion cells. In some designs, certain mixtures of elements or components in a SSE may reduce the SSE oxidation stability or reduce the SSE reduction stability. As such, for each cell design (the chemistry of anodes and cathodes, a possible presence of protective surface coatings, the highest potential the cathodes are exposed to, the lowest potential the anodes are exposed to, electrode porosity and thickness, etc.) and cell operating conditions (temperature, rate, etc.), the SSE composition need ideally be carefully optimized (e.g., to achieve acceptable combination of conductivity, melting point, stability on the anodes, stability on the cathodes, thermodynamic stability at different (relevant to applications or use) temperatures, mechanical and other properties, etc.)

In some designs, Li-containing solid electrolytes with suitable (in accordance with one or more embodiments of the present disclosure) thermal, mechanical, microstructural, ionic conductivity and other properties may comprise or be based on hydrides, including mixed or complex hydrides. In some designs, it may be advantageous for the hydride-based solid-state electrolytes (SSEs) to comprise one or more of the following electropositive (metallic) elements in addition to Li (and H): boron (B), aluminum (Al), gallium (Ga), zinc (Zn), zirconium (Zr), calcium (Ca), magnesium (Mg), sodium (Na), potassium (K), yttrium (Y), scandium (Sc), cerium (Ce), lanthanum (La), gadolinium (Ga), samarium (Sm). In some designs, it may be advantageous for the hydride-based solid-state electrolytes (SSEs) to comprise one or more of the following electronegative elements: nitrogen (N), oxygen (O), chlorine (Cl), fluorine (F), bromine (Br), iodine (I).

In some designs, hydride solid electrolytes may comprise $LiBH_4$ in their compositions. In some designs, hydride solid electrolytes may comprise $LiNH_2$ in their compositions. In some designs, hydride solid electrolytes may comprise $LiAlH_4$ in their compositions. In some designs, hydride solid electrolytes may comprise $LiGaH_4$ in their compositions. In some designs, hydride solid electrolytes may comprise $LiYH_4$ in their compositions. In some designs, hydride solid electrolytes may comprise $LiScH_4$ in their compositions. In some designs, hydride solid electrolytes may comprise $LiCeH_4$ in their compositions. In some designs, hydride solid electrolytes may comprise $LiLaH_4$ in their compositions. In some designs, hydride solid electrolytes may comprise a mixture (alloy) of two, three, four or more of the following hydrides their compositions: $LiBH_4$, $LiNH_2$, $LiAlH_4$, $LiGaH_4$, $LiYH_4$, $LiScH_4$, $LiCeH_4$, $LiLaH_4$, $LiYH_3$, $LiLaH_3$, $LiBaH_3$, $LiCaH_3$, $LiMgH_3$, $KBH_4$, $KNH_2$, $KAH_4$, $KGaH_4$, $KYH_4$, $KScH_4$, $KCeH_4$, $KLaH_4$, $KYH_3$, $KLaH_3$, $KBaH_3$, $KCaH_3$, $KMgH_3$, $NaBH_4$, $NaNH_2$, $NaAlH_4$, $NaGaH_4$, $NaYH_4$, $NaYH_3$, $NaScH_4$, $NaCeH_4$, $NaLaH_4$, $NaYH_3$, $NaLaH_3$, $NaBaH_3$, $NaCaH_3$, $NaMgH_3$, $Ca(BH_4)_2$, $Ca(NH_2)_2$, $Ca(AlH_4)_2$, $Ca(GaH_4)_2$, $Ca(YH_4)_2$, $Ca(YH_3)_2$, $Ca(ScH_4)_2$, $Ca(CeH_4)_2$, $Ca(LaH_4)_2$, $Ca(LaH_3)_2$, $Ca(BaH_3)_2$, $Ca(MgH_3)_2$, $Mg(BH_4)_2$, $Mg(NH_2)_2$, $Mg(AlH_4)_2$, $Mg(GaH_4)_2$, $Mg(LaH_3)_2$, $Mg(BaH_3)_2$, $Mg(CaH_3)_2$, $Mg(YH_4)_2$, $Mg(YH_3)_2$, $Mg(ScH_4)_2$, $Mg(CeH_4)_2$, $Mg(LaH_4)_2$. In some applications, a particular SSE composition needs to be optimized for a cell to attain an acceptable (or optimal) combination of conductivity, melting point, stability on the anodes, stability on the cathodes, thermodynamic stability at different (relevant to fabrication or use) temperatures, cost, mechanical and/or other properties.

In some designs, hydride solid electrolytes may additionally comprise metal (e.g., Li, K, Na, etc.) halides (chlorides, bromides, iodides, fluorides and their various mixtures). In some designs, hydride solid electrolytes may exhibit any of the following compositions: $(LiF)_x(LiBH_4)_{1-x}$, $(LiCl)_x(LiBH_4)_{1-x}$, $(LiBr)_x(LiBH_4)_{1-x}$, $(LiI)_x(LiBH4)_{1-x}$, where $0<x<_1$; $(LiCl_{x1}Br_{x2}I_{x3}F_{x4})_x(LiBH_4)_{1-x}$, where $0<x<1$ and where $x1+x2+x3+x4=1$. In some designs, hydride solid electrolytes may exhibit any of the following compositions: $(LiF)_x(LiBH_4)_y(LiNH_2)_z$, where $x+y+z=1$; $(LiCl)_x(LiBH_4)_y(LiNH_2)_z$, where $x+y+z=1$; $(LiBr)_x(LiBH_4)_y(LiNH_2)_z$, where $x+y+z=1$; $(LiI)_x(LiBH_4)_y(LiNH_2)_z$, where $x+y+z=1$; $(LiCl_{x1}—Br_{x2}—I_{x3}—F_{x4})_x(LiBH_4)_y(LiNH_2)_z$, where $x+y+z=1$, and where $x1+x2+x3+x4=1$; $(LiBH_4)_x(LiNH_2)_{1-x}$, where $0<x<1$. In some designs, hydride solid electrolytes may exhibit any of the following compositions: $(LiBH_4)_x(LiAlH_4)_{1-x}$, $(LiBH_4)_x(LiGaH_4)_{1-x}$, $(LiBH_4)_x(LiScH_4)_{1-x}$, $(LiBH_4)_x(LiYH_4)_{1-x}$, $(LiBH_4)_x(LiLaH_4)_{1-x}$, $(LiBH_4)_x(LiCeH_4)_{1-x}$, where $0<x<1$; $(LiBH_4)_x(LiNH_2)_y(LiAlH_4)_z$; where $x+y+z=1$; $(LiCl_{x1}Br_{x2}I_{x3}F_{x4})_x(LiBH_4)_y(LiAlH_4)_z$, where $x+y+z=1$, and where $x1+x2+x3+x4=1$; $(LiCl_{x1}Br_{x2}I_{x3}F_{x4})_x(LiBH_4)_{y1}(LiAlH_4)_{y2}(LiNH_2)_{y3}$, where $x+y1+y2+y3=1$, and where $x1+x2+x3+x4=1$; $(LiCl_{x1}—Br_{x2}—I_{x3}—F_{x4})_x(LiBH_4)_{y1}(LiAlH_4)_{y2}(Li_3AlH_6)_{y3}(LiNH_2)_{y4}$, where $x+y1+y2+y3+y4=1$, and where $x1+x2+x3+x4=1$.

In some designs, hydride solid electrolytes may exhibit any of the following compositions: $(LiBH_4)_x(Li_3Y(Cl_{x1}Br_{x2}I_{x3}F_{x4})_6)_{1-x}$, where $x1+x2+x3+x4=1$ (for a single or a mixed halide comprising more than one type of halogen anions); $(Li_3Y(Cl_{x1}Br_{x2}I_{x3}F_{x4})_6)_x(LiBH_4)_y(LiNH_2)_z$, where $x+y+z=1$, and where $x1+x2+x3+x4=1$; $(LiBH_4)_x(Li_3La(Cl_{x1}Br_{x2}I_{x3}F_{x4})_6)_{1-x}$, where $x1+x2+x3+x4=1$ (for a single or a mixed halide comprising more than one type of halogen anions); $(Li_3La(Cl_{x1}Br_{x2}I_{x3}F_{x4})_6)_x(LiBH_4)_y(LiNH_2)_z$, where $x+y+z=1$, and where $x1+x2+x3+x4=1$ (note that lanthanoids may be used instead of La in some designs); $(LiBH_4)_x(LiSc(Cl_{x1}Br_{x2}I_{x3}F_{x4}))_{1-x}$, where $x1+x2+x3+x4=1$ (for a single or a mixed halide comprising more than one type of halogen anions); $(Li_3Sc(Cl_{x1}Br_{x2}—I_{x3}—F_{x4})_6)_x(LiBH_4)_y(LiNH_2)_z$, where $x+y+z=1$, and where $x1+x2+x3+x4=1$; $(Li_3M(Cl_{x1}Br_{x2}I_{x3}F_{x4})_6)_x(LiBH_4)_{y1}(LiAlH_4)_{y2}(LiNH_2)_{y3}$, where $x+y1+y2+y3=1$, where $x1+x2+x3+x4=1$ and where M is one or more metals selected from Y, Sc, La, Ce, various lanthanoids and their mixtures; $(Li_3M(Cl_{x1}—Br_{x2}—I_{x3}—F_{x4})_6)_x(LiBH_4)_{y1}(LiAlH_4)_{y2}(Li_3AlH_6)_{y3}(LiNH_2)_{y4}$, where $x+y1+y2+y3+y4=1$, where $x1+x2+x3+x4=1$ and where M is one or more metals selected from Y, Sc, La, Ce, various other lanthanoids and their mixtures; $(LiBH_4)_x(Y(BH_4)_{2\ or\ 3})_{1-x}$, $(LiBH_4)_x(Ba(BH_4)_2)_{1-x}$, $(LiBH_4)_x(La(BH_4)_{2\ or\ 3})_{1-x}$, $(LiBH_4)_x(Ca(BH_4)_2)_{1-x}$ (where $0<x<1$) and their various mixtures (including alloys) as well as their various mixtures with $(LiCl_{x1}Br_{x2}I_{x3}F_{x4})$, $Li_3M(Cl_{x1}Br_{x2}I_{x3}F_{x4})_6$ (where M is one or more metals selected from Y, Sc, La, Ce, other lanthanoids and their mixtures), $LiAlH_4$, $Li_3AlH_6$ and/or $LiNH_2$ and each other.

In some designs, mixed hydride-halide solid electrolytes may be utilized. In some designs, mixed hydride-halide solid electrolytes may exhibit any of the following compositions: $(LiCl_{x1}Br_{x2}I_{x3}F_{x4})_x(M(BH_4)_m)_{x-1}$, where $0<x<1$, where $x1+x2+x3+x4=1$ and where M is a metal having an average valency (oxidation state) m (which could be in some designs, for example, +1, +2, +3, +4, etc.) and selected from the list of (K, Na, Mg, Al, K, Ca, Sc, Zn, Ga, Sr, Zr, Nb, Mo, Cd, In, Sn, Sb, Si, Ge, Cs, Ba, Y, La, Ce, other lanthanoids, Hf, Ta and Bi). In some designs, a mixture of two, three, four or metal selected from the same list of (K, Na, Mg, Al, K, Ca, Sc, Zn, Ga, Sr, Zr, Nb, Mo, Cd, In, Sn, Sb, Si, Ge, Cs, Ba, Y, La, Ce, other lanthanoids, Hf, Ta and Bi) could be used instead of a single metal. In some designs, mixed hydride-halide solid electrolytes may exhibit any of the following compositions: $(LiCl_{x1}Br_{x2}I_{x3}F_{x4})_x(M(BH_4)_m)_y(LiBH_4)_z$, where $x+y+z=1$, where $x1+x2+x3+x4=1$ and where M is a metal (or a mixture of metals) having an average valency (oxidation state) m and selected from the list of (K, Na, Mg, Al, K, Ca, Sc, Zn, Ga, Sr, Zr, Nb, Mo, Cd, In, Sn, Sb, Si, Ge, Cs, Ba, Y, La, Ce, other lanthanoids, Hf, Ta and Bi). In some designs, mixed hydride-halide solid electrolytes may exhibit any of the following compositions: $(LiCl_{x1}Br_{x2}I_{x3}F_{x4})_{y1}(M(BH_4)_m)_{y2}(LiBH_4)_{y3}(LiNH_2)_{y4}$, where where $x1+x2+x3+x4=1$, where $y1+y2+y3+y4=1$ and where M is a metal (or a mixture of metals) having an average valency (oxidation state) m and selected from the list of (K, Na, Mg, Al, K, Ca, Sc, Zn, Ga, Sr, Zr, Nb, Mo, Cd, In, Sn, Sb, Si, Ge, Cs, Ba, Y, La, Ce, other lanthanoids, Hf, Ta and Bi).

In some designs, hydride solid electrolytes may comprise closo-borate-based salts of Li and their mixtures. Suitable examples of closo-borate-based Li salts may include, but are not limited to: $Li_2B_{10}H_{10}$, $Li_2B_{12}H_{12}$, $LiCB_{11}H_{12}$, and $LiCB_9H_{10}$. In some designs, hydride solid electrolytes with Li closo-borate-based salts may comprise the following compositions: $Li_2B_{10}H_{10}$, $Li_2B_{12}H_{12}$, $(Li_2B_{10}H_{10})_x$ $(Li_2B_{12}H_{12})_{1-x}$, $(LiCB_9H_{10})_x(LiCB_{11}H_{12})_{1-x}$, $(Li_2B_{12}H_{12})_x$ $(LiCB_9H_{10})_{1-x}$, $(Li_2B_{10}H_{10})_x(Li_2CB_9H_{10})_{1-x}$, $(Li_2B_{12}H_{12})_x$ $(LiCB_{11}H_{12})_{1-x}$, $(Li_2B_9H_9)_x(Li_2CB_{11}H_{12})_{1-x}$, where $0<x<1$.

In some designs, hydride solid electrolytes may comprise mixtures of one, two or more Li salt(s) and one, two or more closo-borate-based non-Li metal salt(s). In some designs, metals that (in addition to Li) may be used in the SSE composition of closo-borate-based SSEs as components of the non-Li metal salt(s) may include, but not limited to: Na, K, Cs, Be, Mg, Ca, Sr, Ba, Sc, Y, Ti, Al, Zr, La, Ce, other lanthanoids.

In some designs, one, two or more non-Li alkali metal closo-borate salts may be advantageously used in the closo-borate-based SSEs. Illustrative examples of such salts may include, but are not limited to: $Na_2B_{10}H_{10}$, $Na_2B_{12}H_{12}$, $NaCB_{11}H_{12}$, $NaCB_9H_{10}$, $K_2B_{10}H_{10}$, $K_2B_{12}H_{12}$, $KCB_{11}H_{12}$, $KCB_9H_{10}$, $Cs_2B_{10}H_{10}$, $Cs_2B_{12}H_{12}$, $CsCB_{11}H_{12}$, $CsCB_9H_{10}$, among others. In some designs, binary closo-borate-based SSEs may exhibit the following compositions: $(LiCB_9H_{10})_x(MCB_9H_{10})_{1-x}$, $(Li_2B_{10}H_{10})_x(M_2B_{10}H_{10})_{1-x}$, $(LiCB_{11}H_{12})_x(MCB_{11}H_{12})_{1-x}$, $(Li_2B_{12}H_{12})_x(M_2B_{12}H_{12})_{1-x}$, $(LiCB_9H_{10})_x(M_2B_{10}H_{10})_{1-x}$, $(Li_2B_{10}H_{10})_x(MCB_9H_{10})_{1-x}$, $(LiCB_9H_{10})_x(MCB_{11}H_{12})_{1-x}$, $(LiCB_{11}H_{12})_x(MCB_9H_{10})_{1-x}$, $(LiCB_9H_{10})_x(M_2B_{12}H_{12})_{1-x}$, $(Li_2B_{12}H_{12})_x(MCB_9H_{10})_{1-x}$, $(Li_2B_{10}H_{10})_x(MCB_{11}H_{12})_{1-x}$, $(LiCB_{11}H_{12})_x(M_2B_{10}H_{10})_{1-x}$, $(Li_2B_{10}H_{10})_x(M_2B_{12}H_{12})_{1-x}$, $(Li_2B_{12}H_{12})_x(M_2B_{10}H_{10})_{1-x}$, $(LiCB_{11}H_{12})_x(M_2B_{12}H_{12})_{1-x}$, $(Li_2B_{12}H_{12})_x(MCB_1H_{12})_{1-x}$, where $0<x<1$ and where M is a metal or metal mixture selected from: Na, K, Cs.

In some designs, one, two or more alkaline earth metal closo-borate salts may be advantageously used in the closo-borate-based SSEs (e.g., in addition to Li closo-borate salts). Illustrative examples of such salts may include, but are not limited to: $CaB_{10}H_{10}$, $CaB_{12}H_{12}$, $Ca(CB_9H_{10})_2$, $Ca(CB_{11}H_{12})_2$, $MgB_{10}H_{10}$, $MgB_{12}H_{12}$, $Mg(CB_9H_{10})_2$, $Mg(CB_{11}H_{12})_2$, $SrB_{10}H_{10}$, $SrB_{12}H_{12}$, $Sr(CB_9H_{10})_2$, $Sr(CB_{11}H_{12})_2$, $BaB_{10}H_{10}$, $BaB_{12}H_{12}$, $Ba(CB_9H_{10})_2$, $Ba(CB_{11}H_{12})_2$, $BeB_{10}H_{10}$, $BeB_{12}H_{12}$, $Be(CB_9H_{10})_2$, $Be(CB_{11}H_{12})_2$.

In some designs, closo-borate-based SSEs may be ternary and comprise, three closo-borate-based salts, each selected from one of the following: $Li_2B_{10}H_{10}$, $Li_2B_{12}H_{12}$, $LiCB_{11}H_{12}$, $LiCB_9H_{10}$, $Na_2B_{10}H_{10}$, $Na_2B_{12}H_{12}$, $NaCB_{11}H_{12}$, $NaCB_9H_{10}$, $K_2B_{10}H_{10}$, $K_2B_{12}H_{12}$, $KCB_{11}H_{12}$, $KCB_9H_{10}$, $Cs_2B_{10}H_{10}$, $Cs_2B_{12}H_{12}$, $CsCB_{11}H_{12}$, $CsCB_9H_{10}$, $CaB_{10}H_{10}$, $CaB_{12}H_{12}$, $Ca(CB_9H_{10})_2$, $Ca(CB_{11}H_{12})_2$, $MgB_{10}H_{10}$, $MgB_{12}H_{12}$, $Mg(CB_9H_{10})_2$, $Mg(CB_{11}H_{12})_2$, $SrB_{10}H_{10}$, $SrB_{12}H_{12}$, $Sr(CB_9H_{10})_2$, $Sr(CB_{11}H_{12})_2$, $BaB_{10}H_{10}$, $BaB_{12}H_{12}$, $Ba(CB_9H_{10})_2$, $Ba(CB_{11}H_{12})_2$, $BeB_{10}H_{10}$, $BeB_{12}H_{12}$, $Be(CB_9H_{10})_2$, and $Be(CB_{11}H_{12})_2$.

In some designs, it may be advantageous (to achieve desirable properties) for the hydride-based SSEs to comprise halides (e.g., Cl, F, Br, etc.). In some designs (e.g., when hydrides comprise B, Al, Ga, Zn, Zr, Ca, Mg, Na, K, Y, Sc, Ce, La, Ga, Sm or other lanthanoids), it may be advantageous for the atomic ratio of all the halogen atoms in the SSE to the sum of all the (B, Al, Ga, Zn, Zr, Ca, Mg, Na, K, Y, Sc, Ce, La, Ga, Sm in the SSE) to range from around 0.01 to around 0.45 (in some designs, from around 0.10 to around 0.30). In some designs, it may be advantageous for the hydride-based SSEs to comprise nitrogen (N) (in some designs, in the atomic fraction from around 0.01 to around 0.2 relative to all the elements in the SSE composition). In some designs, it may be advantageous for the hydride-based SSEs to comprise lanthanum (La), cerium (Ce), Pr, Nd, Sm, Eu, Gd, Tb or other lanthanoids. In some designs, it may be advantageous for the hydride-based SSEs to comprise Y, Sc, Zr or Hf. In some designs, it may be advantageous for the hydride-based SSEs to comprise Na, K, Cs, Ba, Sr, Ca or Mg (e.g., as partial Li substitution, among others). In some designs, it may be advantageous for the hydride-based SSEs or hydride-based SSE membranes to additionally comprise nanomaterials (e.g., nanoparticles (zero-dimensional (OD) objects) or nanowires or nanotubes or other 1D particles or nanoflakes (2D particles) or nanomaterials of other shapes; in some designs—nanoporous). In some designs, such nanomaterials may advantageously comprise oxygen (e.g., as in oxides or oxyfluorides, etc.). In some designs, such nanomaterials may comprise Si, Al or Mg (in some designs, Al-comprising oxides or Mg-comprising oxides may be more advantageous as they are more resistant to reduction on the anode than Si-based oxides).

In some designs, some or all of the solid electrolyte in the cell may comprise (i) one or more lithium metal halides, wherein either Cl or Br or both are present within the one or more lithium metal halides and wherein the one or more lithium metal halides comprise one, two, three, four or more of Na, K, Mg, Ca, Sc, Al, Zn, Ga, Sr, Y, Zr, Nb, Mo, Cd, In, B, Sn, Sb, Si, Ge, Cs, Ba, La, Ce, other lanthanoids, Hf, Ta and Bi, (ii) one or more lithium metal hydrides, wherein in addition to Li and H, the one or more lithium metal hydrides comprise one, two or more of B, Al, Ga, Zn, Zr, Ca, Mg, Na, K, Y, Sc, Ce, La, Ga, Sm, and wherein the one or more solid electrolytes additionally comprise one or more of N, O, Cl, F, Br, I, (iii) one or more solid polymer electrolytes, or (iv) a combination thereof.

In some applications, oxidation and reduction stability of hydride-based and most other solid state electrolytes (SSEs) in contact with anode and cathode materials at their corresponding potentials during charging need to be considered when optimizing the SSE composition for use in solid state Li and Li-ion cells. In some designs, certain mixture of elements or components in a SSE may reduce the SSE oxidation stability or reduce the SSE reduction stability. As such, for each cell design (the chemistry of anodes and cathodes, a possible presence of protective surface coatings, the highest potential the cathodes are exposed to, the lowest potential the anodes are exposed to, electrode porosity and thickness, etc.) and cell operating conditions (temperature, rate, etc.), the SSE composition need ideally be carefully optimized (e.g., to achieve acceptable (or optimal) combination of conductivity, melting point, stability on the anodes, stability on the cathodes, thermodynamic stability at different (relevant to fabrication or use) temperatures, cost, mechanical and/or other properties).

In some designs, Li-containing solid electrolytes with suitable (in accordance with one or more embodiments of the present disclosure) thermal, mechanical, microstructural, ionic conductivity and other properties may comprise or be based on sulfides, including mixed or complex sulfides. Some conventional sulfide-based SSEs exhibit relatively high melting point, unfortunately. For example, the melting points of relatively high conductivity $Li_6PS_5Br$ or $Li_6PS_5Br$ or $Li_6PS_5Br_xCl_{1-x}$ SSEs exceed around 600° C. (in contrast to some earlier reports claiming the melting point being below around 500° C.). In addition, some conventional sulfide-based SSEs may exhibit excessive activity with cathode materials during melt-infiltration and cycling. However, formation of a protective coating on the electrodes (e.g., cathodes or anodes) and current collectors as well as reducing melting point of the sulfide-based SSEs via fine-tuning of their chemistry or preparing a suspension (slurry) of nano-sized sulfide-based SSE in a molten matrix of another SSE electrolytes may be utilized in some designs to overcome these known limitations. In some designs, for example, mixing anions of various size or cations of various size or the addition of dopant elements that exhibit different valency may advantageously reduce glass transition temperature or melting point or improve compatibility with electrodes, improve conductivity and/or achieve other favorable properties. For example, in some designs, partially replacing Li in $Li_6PS_5Br_xCl_{1-x}$ or various other known solid-state sulfide-based Li ion electrolytes (e.g., including those that comprise P, Ge, Si, Sn, etc., including but not limited to various electrolytes with $Li_2S$—$P_2S_5$, $Li_2S$—$P_2S_5$—$GeS_2$, $Li_2S$—$P_2S_5$—$SiS_2$, $Li_2S$—$P_2S_5$—$SnS_2$, $Li_2S$—$P_2S_5$—$LiCl$ and other known SSE compositions) with K, Cs or Ba or other relatively large cations with the valency of +1 or +2 or their mixtures, partially replacing Li with Sc, Y, La, Ce, Sm and other lanthanoids or with selected metals (e.g., Zn, Al, Cd, In, Sn, Ta, Zr, Hf, etc.), partially replacing S with O or Se or Te or N or other anions or their mixtures, partially replacing P with As, B, Sb, Bi or by utilizing other partial substitutions and their variations one may advantageously reduce glass transition temperature or melting point or improve compatibility with electrodes, improve conductivity or achieve other favorable properties.

In some synthesis methods, it may be advantageous to utilize lithium hydrogen sulfide (LiSH) as a synthesis component of the sulfur-containing solid electrolyte. In some synthesis methods, it may be advantageous to utilize hydrogen sulfide (e.g., in a gaseous form) as a synthesis component of the sulfur-containing (including sulfur-doped) solid electrolyte.

In some designs, Li-containing solid electrolytes with suitable (in accordance with one or more embodiments of the present disclosure) thermal, mechanical, microstructural, ionic conductivity and other properties may comprise lithium hydroxy halides or lithium oxyhalides. In some designs, it may be preferable for the lithium hydroxy halides or lithium oxyhalides to comprise one, two, three, four or more of the additional (non-lithium) metal(s) (M) selected from the list of (H, B, Na, Mg, Al, K, Ca, Sc, Zn, Ga, Sr, Y, Zr, Nb, Mo, Cd, In, Sn, Sb, Si, Ge, Cs, Ba, La, Ce, other lanthanoids, Hf, Ta and Bi) so that the final composition may be called lithium metal hydroxy halides (Li-M-OH—X) or lithium metal oxyhalides (Li-M-O—X), where M represent one, two, three or more metal(s) and X represent one, two, three or more halogen(s) (e.g., Cl, Br, F, I). In some designs, it may be preferable for the lithium hydroxy halides or lithium oxyhalides or lithium metal hydroxy halides or lithium metal oxyhalides to additionally comprise sulfur (S) and/or selenium (Se) (e.g., replacing some of the halogens). In some designs, it may be advantageous for such SSEs to comprise S or Se in the atomic fraction from around 0.0001 to around 0.1 relative to all the elements in the SSE composition.

In some designs, Li-containing solid electrolytes with suitable (in accordance with one or more embodiments of the present disclosure) thermal, mechanical, microstructural, ionic conductivity and other properties may comprise small amounts (e.g., from around 0.01 wt. % to around 20.0 wt. %; in some designs from around 0.1 wt. % to around 10.0 wt. %) of inorganic or organic dopants, which may be added to reduce a melting point or improve conductivity or increase ductility or improve wetting to the electrode or form more favorable SEI/CEI or tune other solid electrolyte properties for improved cell assembling or cell operation. Examples of inorganic dopants may include, but are not limited to: $SO_2$, $SO_2Cl_2$, $POCl_3$, $N_2O_4$, $SbCl_3$, $BrF_5$, among others. Examples of organic dopants may include various ionic liquids, carbonates, ethers, esters, sulfones, nitriles and other solvents (including those previously used in Li or Li-ion battery applications).

In some designs, the selection of particular electrolyte compositions may depend on the particular electrode chemistry and the cell requirements (such as operational temperature range, voltage range, power performance, etc.), the presence of functional coating(s) on the surface of electrode particles, permissible costs, thermal stability of electrodes or cell components, and other parameters.

In some designs, solid electrolytes in accordance with embodiments of the present disclosure may be produced by multiple methodologies, including but not limited to: (i) creating a liquid form of the SSE by direct melting of the precursor components together; (ii) by milling (e.g., ball milling) the solid precursor components (optionally with liquid phases) together in either participating (e.g., reactive gas) or inert atmospheres; in some designs, temperature may exceed room temperature and in other designs, temperature may be below room temperature; in some designs, the milling may be conducted at below atmospheric pressure and in other designs above the atmospheric pressure (generally, below 10,000 atm.); (iii) by precipitation of the material from precursors in organic or inorganic solvents (in some designs, suitable inorganic solvents may include various ionic liquids, various molten salts, various ceramics, various metals, ammonia, sulfur dioxide, sulfuryl chloride, sulfuryl chloride fluoride, phosphoryl chloride, dinitrogen tetroxide, antimony trichloride, bromine pentrafluoride, sulfuric acid, among others); (iv) various other ways to synthesize the desired SSE compounds from organic and/or inorganic precursors in the solid, liquid, or gas phase(s) at the suitable temperature and pressures.

When optimizing the composition and properties of the solid-state electrolytes for melt-infiltration technology in accordance with one or more embodiments of the disclosure, one or more of the following properties may be carefully considered: (i) achieving good wetting on electrode surfaces; (ii) achieving low charge-transfer resistance at the electrolyte/active material interphase at the electrode surface; (iii) achieving chemical compatibility with the electrode materials of choice (e.g., lack of undesirable chemical reactions, instabilities in the cathode solid electrolyte interphase (CEI) and anode solid electrolyte interphase (SEI) properties, etc.) at all states of charge or discharge at both the operating temperatures and, ideally, melt-infiltrating temperatures; (iv) sufficient chemical stability of the current collector(s) (or at least their surfaces) during interactions with the electrolyte, particularly at higher temperatures during melt-infiltration or operation; (v) broad potential range of experimentally observed electrochemical stability in cells; (vi) high grain boundary conductivity of the SSEs, which may allow one to achieve high rate performance in nanostructured electrodes; (vii) high ionic conductivity; (viii) improved resistance to dendrite (e.g., Li dendrite) penetration during cycling in cells, among many others; and/or (ix) resistance of the SSE cells to cracking under abuse conditions (high fracture toughness).

Electrodes in commercial Li-ion batteries are typically easily wetted by organic electrolyte and do not chemically react with organic electrolytes during the electrolyte-infiltration procedure. However, in some applications, melt-infiltration of solid state electrolytes at elevated temperatures (e.g., in the range from around 150 to around 600° C.) may suffer from (i) poor wetting, (ii) undesirable reactions of the electrolyte with typical active electrode materials, (iii) undesirable reactions of the electrolyte with current collector foils, (iv) high interfacial (between the electrode and electrolyte) resistance and/or (iv) high interfacial stresses (e.g., originating during the cool down of the electrolyte-infiltrated electrode due to the difference in the thermal expansion coefficient of the current collector, electrode, and electrolyte). Several strategies may be employed to overcome these challenges in accordance with embodiments of the present disclosure.

In some designs, active powders or composite powder comprising active material and/or the whole electrodes comprising active material and/or current collector may be coated with a thin surface layer that either improves wetting and/or protects the active particles against undesirable chemical reaction with a molted electrolyte at elevated temperatures during the infiltration process, or reduces interfacial stresses, improves interfacial bonds, or serves several of such functions. In some designs, this surface layer may preferably have sufficiently high permeability by Li ions in order to allow cell operation at high rates. Thus, in some designs, the thickness and the composition of such a layer may depend on a particular electrode and electrolyte chemistry and particle size. In some designs, the layer thickness may not significantly affect its wetting properties, unless it is partially consumed during the reaction with the electrolyte. In some designs, a thinner layer may allow for a high rate performance but may not provide enough protection. In some designs, a thicker layer typically provides better protection but may slow down the rate capability and reduces the energy density of the cell (since this layer typically does not exhibit high Li capacity during charge). In some designs, a protective layer thickness from around 0.5 nm to around 200 nm may be suitable.

In some designs, the composition of a functional (e.g., protective or wetting-improving or resistance reducing or stability improving) surface layer (e.g., on the active material powder, on composite particles within the electrode, on porous particles within the electrode, on conductive additive particles within the electrode, on the binder within the electrode, on some or all of the electrode, etc.) may be optimized for each electrode/electrolyte composition. In some designs, a conductive carbon coating generally provides adequate protection, but may suffer from poor wetting by a molten electrolyte, unless it is further modified to contain a high concentration of defects at the surface, doped (e.g., with N or B or I or P, etc.), or coated by another (outer) ceramic (e.g., oxide or sulfide or nitride or phosphate or phosphide or another ceramic material) layer. Thus, it may be advantageous in some designs for the surface coating to comprise several sub-layers of different morphology, structure, or composition (e.g., each sub-layer serving a different function). In some designs, various oxides (e.g., silicon oxide, zirconium oxide, zinc oxide, titanium oxide, yttrium oxide, lanthanum oxide, aluminum oxide, potassium oxide, cesium oxide, magnesium oxides, and other oxides and their combinations) or various metal sulfides (e.g., iron sulfide, titanium sulfide, molybdenum sulfide, zinc sulfide, etc.) or various metal nitrides (e.g., silicon nitride, zirconium nitride, zinc nitride, titanium nitride, yttrium nitride, lanthanum nitride, aluminum nitride, potassium nitride, cesium nitride, magnesium nitride, and other nitrides and their combinations, etc.) as well as various metal oxy-nitrides may work well as the protective or wetting-improvement or interface/interphase resistance reducing layers. In some designs, various metal carbides (e.g., titanium carbides or iron carbide or aluminum carbide or other metal carbides) may also work as functional layers (e.g., protective or wetting-improving or resistance reducing or stability improving layers). In some designs, functional layers may also comprise polymers (e.g., Li-ion conducting polymers (including single ion conducting polymers) that exhibit sufficient thermal stability to prevent undesirable decomposition during the electrolyte melt-infiltration). In some designs, such polymers may be infiltrated with metal oxides or metal nitrides (e.g., by ALD or CVD or other techniques) in order to enhance their thermal properties or wettability or other useful properties. However, a particular selection of the composition of the functional layer may also factor in the type of the electrolyte and electrode used. For example, some of the oxides (e.g., silicon oxide or titanium oxide) and most of the metal sulfides may react with Li if used for a low potential anode, inducing undesirable volume changes, which may lead to the degradation of the active material/electrolyte interface. Thus, for example, if silicon oxide is used as a coating for the low-potential anode material, its thickness may be kept to a minimal level (e.g., preferably to below around 10 nm) if such reactions with Li need to be minimized. In some designs, a functional (e.g., protective or wetting-improving or resistance reducing or stability improving) surface layer may comprise one or more metals or metal alloys (e.g., in the form of the particles of various shapes, coatings, etc.). Illustrative examples of the elements that may be present as metals or metal alloys may include, but are not limited to, the following elements: Mg, Al, K, Ca, Sc, Zn, Ga, Sr, Y, Zr, Nb, Co, Ni, Mn, Cu, Fe, Mo, Ti, Cd, In, Sn, Sb, Si, Ge, Cs, Ba, La, Ce, other lanthanoids, Hf, Ta, Bi, among others. In some designs, such metals and metal alloys may react with a molten electrolyte to induce formation of a favorable interlayer between the electrode and the electrolyte. In some designs, such an interlayer may exhibit mixed conductivity (e.g., be both ionically and electronically conductive, that is, being permeable by both Li ions and electrons or holes).

In some designs (e.g., when a single material may not form good interphase/interface layer with both the electrode (or active particles or current collector) and electrolyte), it may be advantageous for the for the protective (or, more generally, functional) surface layer to comprise two or more distinct sub-layers or a gradient in its composition.

In some designs (e.g., when interfacial stresses are an issue), it may be advantageous for the protective surface layer coating to be porous (or, at least, partially porous). The pores in such a layer may be open or closed. In some designs, a suitable pore size in this coating may range from around 0.3 nm to around 100 nm, depending on the size of active particles and the particular chemistry. For example, a porous coating may reduce interfacial resistance and may improve the mechanical integrity of the electrodes (e.g., by reducing or minimizing interfacial stresses during the cooling down of the electrolyte-infiltrated electrodes or by providing improved adhesion to the electrolyte). In some designs, the pores (e.g., when partially wetted by the electrolyte) may mitigate some of the stresses at the electrode/electrolyte interface. In addition, such a porous layer may improve wetting (e.g., if further coated with a thin layer of another material that exhibits better wetting) and reduce or minimize charge-transfer resistance. In some designs, at least some of the pores in such a porous layer may be pre-filled with Li salts (e.g., $Li_2S$, LiF, LiI, LiCl, LiBr, $Li_3N$, etc.), other metal salts, metal (nano)particles or solid electrolyte material. In some designs, such a procedure may also improve wetting and/or reduce or minimize charge-transfer resistance. In some designs, such a porous layer may exhibit high electron conductivity (e.g., greater than around 0.01 S $cm^{-1}$). In some designs, such a porous layer may comprise conductive carbon. In some designs, the mass fraction of carbon in the porous layer may range from around 50% to around 100%.

Several methodologies may be used for the formation of a functional (e.g., protective or wetting-improving) surface layer coating on the active materials (powders), composites comprising active material, the electrodes or current collectors. Examples of suitable coatings may include, but are not limited to sputtering or other physical vapor deposition (PVD) methods, chemical vapor deposition (CVD), atomic layer deposition (ALD), solution processing (including a spray drying), electrophoretic deposition, electroless deposition, electrodeposition, sol-gel, polymer (more generally—organic) shell formation followed by its carbonization/conversion during heat treatment at elevated temperatures and their various combinations, to name a few.

In terms of attaining experimentally observed electrochemical stability in cells, it may be advantageous in some designs for electrolyte composition(s) to either (i) exhibit thermodynamic stability at the maximum cell cathode potential (typically above around 2.0-2.5 V vs. Li/Li+ for some promising cathodes) or (ii) induce formation of a stabilizing surface layer on the cathode (referred to herein as "CEI"), which prevents substantial (e.g., greater than around 1% after around 10,000 hours at around 30° C.) and continuous electrolyte decomposition upon exposure of this electrolyte at average cell cathode potentials (for some cathodes, in the range from around 2.0 to around 4 V vs. Li/Li+; in some high voltage cathodes, to around 5 V vs. Li/Li+). For some applications, it is also important to consider how the volume changes in the cathode materials affect the CEI stability. In particular, in some designs, it may be advantageous to reduce or minimize stresses and strain at the CEI (e.g., via formation of composite cathodes or compliant shells/coatings on the cathode surface or other means) to maintain CEI stability during cycling. Similarly, in some designs, it may be important to attain SSE composition that induces formation of the stabilizing surface layer on the anode (often called SEI), which prevents substantial (e.g., greater than around 1% after around 10,000 hours at around 30° C.) and continuous electrolyte decomposition (e.g., reduction) upon exposure of this electrolyte at average cell anode potentials (for most anodes, in the range from around 0.0 to around 1 V vs. Li/Li+). In some designs, it is similarly important to consider how the volume changes in the anode materials affect the SEI stability. In particular, in some designs, it may be advantageous to reduce or minimize stresses and strain at the SEI (e.g., via formation of composite anodes or compliant shells/coatings on the anode surface or other means) to maintain SEI stability during cycling.

In some designs (e.g., when cells with solid electrolytes may need to operate at sufficiently low temperatures or exhibit sufficiently fast charging or comprise lithium metal (or lithium metal alloy) anode), it may be highly advantageous to utilize electrolyte and cell design that prevent or at least reduces the probability of lithium dendrite formation and penetration through the solid electrolyte layer in order to reduce or minimize the probability of forming internal shorts. For example, it may be advantageous to optimize solid electrolyte composition so that the solid electrolyte composition exhibits relatively high elastic modulus at room temperature or at near operation temperature that exceeds elastic modulus of lithium (e.g., typically above around 10 GPa). In some designs, it may similarly be advantageous to optimize solid electrolyte composition so that lithium metal exhibits relatively poor reactivity with its surface. In some designs, if electrochemically reducing the solid electrolyte in a direct contact with lithium metal is thermodynamically favorable, there may preferably be a significant kinetic barrier that would prevent reduction from happening to a significant degree during cycling. Similarly, if reducing the solid electrolyte in contact with lithium metal is thermodynamically favorable, it may further be preferable for the reduced layer to be "passivating" (e.g., is electrically insulative, continuous and relatively thin—e.g., within around 2-8 nm) and mostly stop growing after its formation (e.g., do not grow to over around 20 nm till the cell capacity drops below around 80% of the initial capacity). In some designs, it may be advantageous for the passivating layer to exhibit relatively high interfacial energy in contact with Li metal and exhibit relatively poor wetting by Li metal (e.g., exhibiting a contact angle in the range from around 110.0 to around 170.0 degrees at around 190° C.). In some designs, it may be advantageous for lithium metal wetting on the surface of the exemplary solid electrolyte (including the inner surface of its cracks or grain boundaries) to be poor (e.g., exhibiting a contact angle in the range from around 120.0 to around 180.0 degrees at around 190° C.). In this case, forming lithium dendrites through the solid electrolyte and within the solid electrolyte would induce substantial increase in Gibbs free energy of the system, making lithium dendrite penetration through the solid electrolyte less likely to occur.

In some designs (e.g., when the cells comprise lithium metal (or lithium metal alloy) anode), high interfacial energy between lithium metal and the solid electrolyte may induce high interface/interphase resistance and thus undesirably reduce power/rate capability of the cells. To overcome such a challenge, it may be advantageous in some designs to have a synthetic interlayer (e.g., from around 2.00 nm to around 2,000.00 nm) between the Li metal anode and a solid electrolyte so that the Li metal does not have a direct contact with the solid electrolyte. In this case, it may be advantageous to optimize the interlayer composition to ensure that (i) the lithium anode/interlayer interface (or interphase) is stable and exhibits a low areal resistance (e.g., in some designs, in the range from around 0.01 Ohm·cm$^2$ to 10$^3$ Ohm·cm$^2$) and (ii) the interlayer/solid electrolyte interface (or interphase) is also stable and exhibits a low areal resistance (e.g., in some designs, in the range from around 0.01 Ohm·cm$^2$ to 10$^3$ Ohm·cm$^2$). The composition of such an interlayer in some designs should be carefully tuned to provide good wetting and low interfacial resistance (at both Li and SSE sides) and good long-term stability.

In some designs, it may be advantageous for this interlayer to be a composite. In some designs, such an interlayer may comprise carbon. In some designs, this carbon may be in the form of carbon nanotubes, carbon fibers, carbon (nano)fibers, graphite, graphite ribbons, carbon black, graphene, graphene oxide, nitrogen doped graphene or more generally nitrogen doped carbon (in some designs, boron doped or phosphorous doped or halogen-doped) with the atomic fraction of the dopant atoms ranging from around 0.01 at. % to around 20 at. %, exfoliated graphite, porous carbon (including activated carbon or templated carbon or hollow carbon, which, in turn, may also be doped), among other forms of conductive carbon (doped or undoped). In some designs, such an interlayer may comprise transition metal(s). In some designs, metal(s) in the interlayer may be in the form of (nano)fibers, (nano)wires, (nano)flakes, (nano)particles, or (nano)porous metal (e.g., a foam or a mesh). In some designs, metals that exhibit very low solubility in Li at room temperature (e.g., less than around 1%) may be advantageously utilized (e.g., Cu, Ti, Ni, and others).

In some designs, such an interlayer may comprise various oxides, various sulfides, various phosphides, various halides (including mixed halides, as described above for the composition of suitable SSEs), various oxyhalides, lithium sulfide, lithium nitride, lithium phosphide, other lithium-comprising salts and their various mixtures and solid solutions as well as lithium conducting polymers.

In some designs, an average elastic modulus of the interlayer may exceed around 10 GPa in order to reduce the probability of its penetration by lithium dendrites. In some designs, it may be advantageous for the interlayer to be nanocrystalline or amorphous with grain size below around 100 nm (in some designs, below around 10 nm) to reduce the probability of its penetration by lithium dendrites and to ensure more uniform and smooth lithium plating/dissolution during cycling.

In some designs, the interlayer may comprise one or more sub-layers. In some designs, such sub-layers may exhibit different surface chemistry or composition. In some designs, at least one of the sub-layers may be deposited on a Li anode or an anode current collector (that is before lithium plating) prior to electrolyte infiltration. In some designs (if the cell is assembled in a fully discharged state with no Li in the anode), the interlayer may be deposited on the current collector or on the lithium-free anode.

In some designs, the interlayer may comprise a porous layer.

In some designs, at least a portion of the interlayer may be deposited by sputtering or other physical vapor deposition (PVD) techniques, chemical vapor deposition (CVD), atomic layer deposition (ALD), solution processing (including a spray drying), electrophoretic deposition, layer-by-layer deposition, electroless deposition, electrodeposition and other suitable techniques.

In some designs where the cells comprise a lithium metal anode (or Li metal comprising anode), it may be advantageous to utilize ultra-pure lithium metal (e.g., impurity content in the lithium below around 1000 ppm; in some designs below around 10 ppm; in some designs—below around 0.1 ppm) to achieve a high degree of uniformity during lithium plating and dissolution. In some designs, it may be advantageous for the cell to be assembled in a fully discharged state so that the anode comprises no lithium and all the lithium for lithium plating (during charging) is taken from the lithium-comprising cathode. In this case, the in-situ formation of the lithium metal anode may be achieved with virtually no impurities and no surface contaminants. In addition, a very smooth and uniform layer of lithium on the surface of the plating anode substrates (which may be porous, in some designs) may be deposited in such a design. In some designs, a current collector (e.g., Cu or Ni or Ti or steel or carbon, etc.) or, more generally, an outer surface of the anode substrate for Li plating (by an "outer surface" we imply the surface that may be in contact with a solid electrolyte), may be advantageously coated with a thin (e.g., from around 2.0 nm to around 2,000.0 nm; in some designs, from around 10.0 nm to around 500.0 nm), smooth (e.g., surface roughness features of less than around 100 nm; in some designs—less than around 10 nm), uniform (e.g., less than around 50% variation in thickness; in some designs—less than around 20% variation in thickness) and conformal layer of Li-ion permeable (li-ion conductive) material so that Li plating either (i) takes place between the metal current collector (or, more generally, substrate for Li plating) and this layer or (ii) in case of some of the porous substrates, takes place within an inner surface area of the porous substrates (e.g., within the pores) that may not have a direct contact with either a solid electrolyte or a deposited layer. In some designs, it may be advantageous for this layer to be electrically insulative (exhibit high resistance for electron or hole transport; e.g., electron/hole resistivity above around $10^{12}$ Ω-cm, when measured with blocking terminals/electrodes) in order to reduce the probability of lithium plating on the top surface of such a layer. It is generally known that lithium plating proceeds at a slightly different rate for different lithium isotopes. It is also known that lithium isotope fractionation may be changed by varying lithium plating current density. In some designs, it may be advantageous to utilize mostly the same lithium isotopes (e.g., in some designs—mostly (e.g., around 99.00% or more of, in some designs around 99.99% or more of)$^7$Li; in some designs—mostly (e.g., around 99.00% or more of, in some designs around 99.99% or more of)$^6$Li) in the composition of the lithium metal anodes, lithium-comprising cathodes and (in some designs) lithium containing solid electrolyte in order to achieve more lithium uniform plating/dissolution and reduce lithium dendrite formation. Substantial surface roughness on the surface of metal current collector (e.g., Cu or Ni or Ti or steel or carbon, etc.), large grain size as well as non-uniform formation of a native oxide or other electrically insulative substances (oil, dust, other contaminants, etc.) or other nonuniformities may induce non-uniform nucleation and growth of lithium metal film during lithium deposition (plating). In some designs (e.g., when Li is plated on the current collector foils (rather than on inner or outer surface of porous substrates deposited or attached to the current collector or on the surface of porous current collectors—foams, meshes, foils with grown nanowires, nanotubes, flake-shaped deposits, dendritic deposits, etc.)), it may be advantageous to utilize smooth (e.g., RMS roughness of less than 20 nm when measured by atomic force microscopy (AFM) techniques for the 10×10 micron area) current collector foils with a purified surface and/or small grains (e.g., average values of the smallest grain dimensions (in case of elongated grains) below around 500 nm; in some designs—below around 200 nm) and/or current collector foils coated with an insulative surface layer to achieve more lithium uniform plating/dissolution and minimize lithium dendrite formation.

In some designs where the cells comprise a lithium metal or lithium alloy in the anode in a fully (or in a partially) charged state, lithiation of the anode (e.g., by lithium alloying in the anode or lithium deposition/plating on the anode) may undesirably induce significant stresses and volume changes in the anode. In addition, in some designs where the cells comprise a lithium metal or lithium alloy in the anode in a fully (or in a partially) charged state, relatively stable lithiation of the anode (e.g., by lithium alloying in the anode or lithium deposition/plating on the anode) may be limited to a relative low areal current density (e.g., from around 0.01 to around 3 mA/cm$^2$ when normalized by the geometrical surface area of the anode). To overcome one or more of such limitations, in some designs it may be advantageous to produce porous anodes, where a substantial portion (e.g., from around 10 to around 100%) of the lithium metal deposition (or lithium metal alloying) takes place within the electrode pores (e.g., pores filled with an inert gas or vacuum or easily compressible material). In some designs, such porous anodes may comprise porous, electrically interconnected particles. In some designs, a space between such porous particles in the anode may be at least partially filled with the (e.g., melt-infiltrated) electrolyte. In some designs, such particles may comprise one, two or more pores. In some designs, at least some of such pores may be closed. In some designs, such porous particles may also comprise so-called "channel pores" that bore into the particles from the surface of the particles. In some designs, such "channel" pores may be at least partially filled with the electrolyte. in some designs, such "channel" pores may serve various useful functions—e.g., increase Li ion diffusion rate from the outside into the bulk of the particles, improve mechanical stability, increase the contact area between with the particles and electrolyte and reduce (e.g., charge transfer) resistance, and/or provide other benefits (e.g., expand operational temperature range, increase rate performance, improve safety, etc.). In some designs, the walls of such porous particles may preferably be permeable to Li ions. In some designs, the walls of such porous particles may preferably be electrically conductive to supply electrons for electrochemical reactions. In some designs, at least a portion of such a porous anode (or porous particles within the anode) may be coated with a functional (e.g., protective or wetting-improving or resistance reducing or stability improving) surface layer.

In some designs, it may be advantageous for such porous particles within the solid electrolyte-filled anode not to increase in overall particle diameter or overall particle volume by more than around 20 vol. % (in some designs, by no more than around 10 vol. %; in some designs—by no more than around 5 vol. %; in some designs—by no more than around 2 vol. %) during cell operation (e.g., during anode lithiation). In some designs, it may be advantageous for the total pore volume of the porous particles (e.g., prior to electrolyte infiltration into the anode) to range from around 5.0 vol. % to around 99.9 vol. % (e.g., in some designs, from around 5 vol. % to around 10 vol. %; in some designs, from around 10 vol. % to around 20 vol. %; in some designs, from around 20 vol. % to around 30 vol. %; in some designs, from around 30 vol. % to around 40 vol. %; in some designs, from around 40 vol. % to around 50 vol. %; in some designs, from around 50 vol. % to around 60 vol. %; in some designs, from around 60 vol. % to around 70 vol. %; in some designs, from around 70 vol. % to around 80 vol. % in some designs; in some designs, from around 80 vol. % to around 90 vol. %; in some designs, from around 90.0 vol. % to around 99.9 vol. %). In some designs, it may be advantageous for the electrolyte not to fill more than 50 vol. % of the total pore volume within the porous particles. In some designs, it may be advantageous for the volume of the pores in the porous particles that are not filled by the electrolyte (e.g., after electrolyte infiltration into the anode) to range from around 5.0 vol. % to around 99.9 vol. % (as a total vol. % of the particles) (e.g., in some designs, from around 5 vol. % to around 10 vol. %; in some designs, from around 10 vol. % to around 20 vol. %; in some designs, from around 20 vol. % to around 30 vol. %; in some designs, from around 30 vol. % to around 40 vol. %; in some designs, from around 40 vol. % to around 50 vol. %; in some designs, from around 50 vol. % to around 60 vol. %; in some designs, from around 60 vol. % to around 70 vol. %; in some designs, from around 70 vol. % to around 80 vol. % in some designs; in some designs, from around 80 vol. % to around 90 vol. %; in some designs, from around 90.0 vol. % to around 99.9 vol. %). In some designs, a larger pore volume may provide more space for Li deposition (or more space for alloy expansion during increasing of Li content within the alloy, if a Li alloy is used in the anode) and thus higher anode gravimetric and volumetric capacity. In some designs, a smaller pore volume may provide better mechanical robustness to the anode. Also, a smaller pore volume may make the particles more robust and easier to be casted onto the anode current collector and, in some designs, calendared to form a more uniform and denser layer. As such, the pore volume may be optimized for particular cell designs, cell operation conditions, anode thickness, solid electrolyte properties, mechanical properties of the walls and/or the shells of the porous particles, among other factors.

In some designs, the volume-average size of the porous particles in the anode (e.g., average diameter in case or near-spherical or ellipsoidal particles or average characteristic dimensions in case of particles of other shapes—such as fiber-shaped, flake-shaped, irregular-shaped, etc.) may preferably range from around 10 nm to around 500 microns (e.g., in some designs, from around 10 nm to around 200 nm; in some designs, from around 200 nm to around 400 nm; in some designs, from around 400 nm to around 600 nm; in some designs, from around 600 nm to around 800 nm; in some designs, from around 800 nm to around 1 micron; in some designs, from around 1 micron to around 2 microns; in some designs, from around 1 micron to around 2 microns; in some designs, from around 2 microns to around 4 microns; in some designs, from around 4 microns to around 8 microns; in some designs, from around 8 microns to around 12 microns; in some designs, from around 12 microns to around 16 microns; in some designs, from around 16 microns to around 20 microns; in some designs, from around 20 microns to around 40 microns; in some designs, from around 40 microns to around 60 microns; in some designs, from around 60 microns to around 80 microns; in some designs, from around 80 microns to around 100 microns; in some designs, from around 80 microns to around 100 microns; in some designs, from around 100 microns to around 200 microns; in some designs, from around 200 microns to around 300 microns; in some designs, from around 300 microns to around 400 microns; in some designs, from around 400 microns to around 500 microns). In some designs, the volume-average size of the particles (e.g., porous active material particles) in the anode may preferably range from around 0.2 micron to around 40 microns. In some designs, a larger particle size may generally reduce Li diffusion time. However, formation of channel pores in such larger particles or operation at higher temperatures may at least partially compensate for such an effect. In some designs, the particles (e.g., porous active material particles) in the anode may exhibit gravimetric capacity in a discharged (typically lithium-free) state in the range from about 500 mAh/g to around 3600 mAh/g. In some designs, the anode which includes such particles (e.g., porous active material particles) may comprise Si, Si alloy, Sn, Sn alloy, Li metal, Li alloy, or a combination thereof. Additionally, in the anode larger particles may be easier and cheaper to produce, and it may additionally be easier to attain larger pore volume in larger particles. In some designs, a smaller particle size may generally facilitate faster Li insertion (and, e.g., plating within the pores). However, in some applications, too small particles may make it more difficult to infiltrate the anode with the electrolyte (particularly for thicker electrodes). The optimal particle size (or particle size distribution) may thereby vary based on cell design, cell operation conditions, electrode dimensions, electrolyte composition and properties and/or other factors.

In some designs, instead of individual particles, a porous substrate for Li plating (or Li alloying) may be produced in the form of a porous film where at least a portion of the pores remain empty after electrolyte filling into the cell and provide space for Li plating (or Li alloying). Such a porous film may be sandwiched between a current collector (e.g., Cu or Ti or steel or Ni or carbon, etc.) and the solid electrolyte. The interface between the solid electrolyte and a porous film may comprise a functional interlayer (e.g., produced as a coating on the outer surface of the porous film prior to electrolyte filling) in order to reduce interfacial resistance, improve stability, improve wetting or attain other performance benefits. The pores in such a substrate may enhance flexibility of such a film. The advantages of having such a film may be somewhat similar to that of having porous particle coating on the current collector foils—significantly reduce volume changes during Li plating (alloying), reduced tendency for Li dendrite growth (since it becomes energetically more favorable to plate Li within the pores as no solid electrolyte or Li metal need to be displaced), among others. An advantage over porous particle coating may include higher volumetric capacity attainable. The disadvantages may include more complicated cell fabrication procedure that is less compatible with state of the art manufacturing equipment as well as higher resistance (due to smaller contact area between the substrates and a solid electrolyte) and thus lower rate performance (or smaller areal loading for the same rate). In some designs, the film may be perforated and comprise so-called channel pores (e.g., spaced 100 micron—2 mm apart from each other and having pore width/diameter in the range from around 1 micron to around 500 micron) in order to enhance rate performance or increase electrode areal capacity loading. Overall, the choice between having a porous film vs. a porous coating comprising of porous particles where the space between the particles is filled with the solid electrolyte may be determined by the cell design, cell operation conditions and other cell-level requirements for a given application, properties of the porous substrates, properties of the solid electrolyte and other factors. The thickness of the porous film may generally range from around 1 micron to around 1000 microns, depending on the areal loading requirements and Li mobility/conductivity (e.g., during Li insertion/plating or Li extraction/dissolution)—(e.g., in some designs, from around 1 micron to around 2 microns; in some designs, from around 1 micron to around 2 microns; in some designs, from around 2 microns to around 4 microns; in some designs, from around 4 microns to around 8 microns; in some designs, from around 8 microns to around 12 microns; in some designs, from around 12 microns to around 16 microns; in some designs, from around 16 microns to around 20 microns; in some designs, from around 20 microns to around 40 microns; in some designs, from around 40 microns to around 60 microns; in some designs, from around 60 microns to around 80 microns; in some designs, from around 80 microns to around 100 microns; in some designs, from around 80 microns to around 100 microns; in some designs, from around 100 microns to around 200 microns; in some designs, from around 200 microns to around 300 microns; in some designs, from around 300 microns to around 400 microns; in some designs, from around 400 microns to around 500 microns; in some designs, from around 500 micron to around 1000 micron).

In some designs, the average size (e.g., diameter in case of near spherical pores or width in case of slit-shaped pores) of the pores within the porous particles (or porous film) in the anode may typically range from around 0.3 nm to around 40 microns (e.g., in some designs, from around 0.3 nm to around 1 nm; in some designs, from around 1 nm to around 2 nm; in some designs, from around 2 nm to around 3 nm; in some designs, from around 3 nm to around 4 nm; in some designs, from around 4 nm to around 5 nm; in some designs, from around 5 nm to around 10 nm; in some designs, from around 10 nm to around 20 nm; in some designs, from around 20 nm to around 30 nm; in some designs, from around 30 nm to around 40 nm; in some designs, from around 40 nm to around 50 nm; in some designs, from around 50 nm to around 60 nm; in some designs, from around 60 nm to around 80 nm; in some designs, from around 80 nm to around 100 nm; in some designs, from around 100 nm to around 200 nm; in some designs, from around 200 nm to around 300 nm; in some designs, from around 300 nm to around 400 nm; in some designs, from around 400 nm to around 500 nm; in some designs, from around 500 nm to around 600 nm; in some designs, from around 600 nm to around 700 nm; in some designs, from around 700 nm to around 800 nm; in some designs, from around 800 nm to around 900 nm; in some designs, from around 900 nm to around 1 micron; in some designs, from around 1 micron to around 2 microns; in some designs, from around 2 microns to around 3 microns; in some designs, from around 3 microns to around 4 microns; in some designs, from around 4 microns to around 5 microns; in some designs, from around 5 microns to around 10 microns; in some designs, from around 10 microns to around 20 microns; in some designs, from around 20 microns to around 30 microns; in some designs, from around 30 microns to around 40 microns). In some designs, the average size of the pores within the porous particles (or porous film) in the anode may range from around 0.3 nm to around 20 microns (in some designs, from around 1 nm to around 10 microns). In general, too small pores may limit the pore volume. Too large pores may reduce mechanical properties of the anode to an undesired level (which may affect cell stability). The optimal average pore size (or, more generally, pore size distribution) may vary based on cell design, cell operation conditions, electrode dimensions, porous particle dimensions, electrolyte composition and properties and/or other factors. In some designs, it may be advantageous for the porous particles to comprise a hierarchical pore structure, where smaller pores are present between larger pores in order to attain larger porosity and better mechanical properties (for the given pore volume). In some designs, the porous particles themselves may exhibit a hierarchical structure (in some designs, so-called fractal architecture), where larger porous particles comprise smaller porous particles to attain a combination of sufficiently good mechanical properties, sufficiently fast Li-ion conductance and/or a sufficiently large pore volume.

In some designs, porous particles (or porous film) in the anode may comprise an intercalation-type material in their pore walls. In some designs, porous particles in the anode may comprise a core-shell structure, where a shell encases (encloses) at least a portion of the surface pores. In some designs, porous particles (or porous film) in the anode may comprise an intercalation-type material in their shell. In some designs, such porous particles (or porous film) may be a composite, comprising two or more distinct material compositions. In some designs, porous particles (or porous film) in the anode may comprise Li alloying elements. In some designs, porous particles (or porous film) in the anode may comprise conversion-type active material. In some designs, Li may be incorporated in various forms within such porous anode particles (or porous film) (e.g., as intercalated Li, as part of the Li alloy, as plated/deposited Li metal. etc.) at a fully charged battery cell state.

In some designs, at least some pores in the porous particles (or porous film) may be produced by using sacrificial templates. In some designs, pores in the porous particles (or porous film) may be produced or enhanced by gas evolution. In some designs, pores in the porous particles (or porous film) may be produced by partial material etching. In some designs, pores in the porous particles (or porous film) may be produced by partial material decomposition. In some designs, pores in the porous particles (or porous film) may be produced by partial material evaporation.

In some designs, porous particles in the anode may comprise carbon. In some designs, the carbon within the porous particles (or porous film) may comprise a significant fraction (e.g., around 10-100%) of $sp^2$-bonded carbon. In some designs, such porous particles (or porous film) may comprise porous carbon (e.g., hollow carbon). In some designs, porous particles (or porous film) may comprise activated carbon (e.g., physically activated, chemically activated, etc.). In some designs, porous particles (or porous film) may comprise soft-templated or hard-templated carbon or self-templated carbon. In some designs, porous particles (or porous film) may comprise hydrothermally (or solvothermally) produced carbon. In some designs, porous particles (or porous film) may comprise carbon foam material. In some designs, porous particles (or porous film) may comprise carbon produced from various inorganic precursors (e.g., various carbide-derived carbon, among others). In some designs, porous particles (or porous film) may comprise carbon produced from various organic precursors (e.g., various sugars, various synthetic or natural polymers, various hydrocarbons, coal, pitch, etc.). In some designs, porous carbon in the porous particles (or porous film) may be doped (e.g., with nitrogen or boron or various metals, etc.). In some designs, porous particles (or porous film) in the anode may comprise carbon fibers (e.g., porous carbon fibers), carbon nanotubes, carbon black (e.g., porous carbon black), graphene (incl. porous graphene), hard carbon and/or various other forms of electrically conductive porous carbon (e.g., activated carbon, templated carbon, etc.).

In some designs, at least at some synthesis stage, the porous particles (e.g., porous carbon particles) (or porous film) may be advantageously heat-treated at high temperatures after synthesis prior to using in the anode (e.g., in order to reduce first cycle losses or to increase purity or to improve conductivity or to improve mechanical robustness or to close at least some of the open pores or to achieve other desired outcomes). In some designs, such a heat-treatment may be conducted in an inert environment or under vacuum. In some designs, the highest temperature for the heat-treatment may range from around 400° C. to around 2800° C., depending on the initial and target composition of the particles, the initial and target porosity of the particles, the synthesis history and/or other factors—(e.g., in some designs, from around 400° C. to around 500° C.; in some designs, from around 500° C. to around 600° C.; in some designs, from around 600° C. to around 700° C.; in some designs, from around 700° C. to around 800° C.; in some designs, from around 800° C. to around 900° C.; in some designs, from around 900° C. to around 1000° C.; in some designs, from around 1000° C. to around 1100° C.; in some designs, from around 1100° C. to around 1200° C.; in some designs, from around 1200° C. to around 1300° C.; in some designs, from around 1300° C. to around 1400° C.; in some designs, from around 1400° C. to around 1500° C.; in some designs, from around 1500° C. to around 1600° C.; in some designs, from around 1600° C. to around 1700° C.; in some designs, from around 1700° C. to around 1800° C.; in some designs, from around 1800° C. to around 1900° C.; in some designs, from around 1900° C. to around 2000° C.; in some designs, from around 2000° C. to around 2100° C.; in some designs, from around 2100° C. to around 2200° C.; in some designs, from around 2200° C. to around 2300° C.; in some designs, from around 2300° C. to around 2400° C.; in some designs, from around 2400° C. to around 2500° C.; in some designs, from around 2500° C. to around 2600° C.; in some designs, from around 2600° C. to around 2800° C.). Too high temperature may undesirably reduce the pore volume available for Li plating or make it more difficult for the porous particles to be coated with uniform functional layer or make it more difficult to be casted onto a current collector or to induce undesirable decomposition or chemical transformation of the porous particles or induce other undesirable outcomes. As such, the optimal heat-treatment conditions may vary based on particular particle (or porous film) composition, particular cell or electrode design, cell operation conditions, electrode dimensions, electrolyte composition and properties and/or other factors.

In some designs, where porous particles in the anode comprise carbon, it may be advantageous for such carbon to exhibit a low median wt. % of hydrogen (H). In some designs, it may be advantageous for the median fraction of H to be below around 0.5 wt. % (in some designs, it may be more advantageous for the fraction of H to be below around 0.1 wt. %; in some designs, it may be more advantageous for the fraction of H to be below around 0.05 wt. %; in some designs, it may be more advantageous for the fraction of H to be below around 0.01 wt. %; in some designs, it may be more advantageous for the fraction of H to be below around 0.001 wt. %).

In some designs, at least a portion of the porous particle (or porous film) material may be deposited in a vapor phase (e.g., by CVD, ALD, PVD, and/or other mechanism). In some designs, at least a portion of the porous particle material may be electro-deposited.

In some designs, at least a portion of the porous particle (or porous film) material in the anode may decompose during or after the melt-infiltration (e.g., upon heat-treatment or upon reaction with the molten electrolyte, etc.). In some designs, such a decomposition process may induce formation of (e.g., additional) pores in the anode (such pores, e.g., may provide space for Li plating).

Solid electrolyte cell cycling (lithium movement from the anode to the cathode and back) may induce substantial stresses within the cell. Additionally, thermal stresses (e.g., if a cell is heated or cooled) or external stresses (e.g., if the cell-comprising device/machine is dropped or collided with another object or was subjected to rapid acceleration or deacceleration etc.) may be applied to a cell during operation. In some designs and applications, it may be important to reduce or prevent formation and propagation of cracks in the solid electrolyte-comprising cell during cell operation in spite of the stresses that may take place by, for example, (i) reducing the value of such stresses and reducing or minimizing the stress concentrations, and/or (ii) increasing the energy required for the crack propagation. In other words, it may be advantageous for such a cell to exhibit high fracture toughness (or high modulus of toughness) and high resistance to crack propagation in some applications. The minimum acceptable value(s) of the fracture toughness for (i) the electrode(s) with the solid electrolyte and (ii) the solid electrolyte membrane may depend on multiple factors (e.g., expected stresses during operation, etc.). However, in some designs these values may preferably range from around 0.01 $MPa \cdot m^{0.5}$ to around 50.00 $MPa \cdot m^{0.5}$.

In some cells, the use of vacuum (e.g., from around 400 Torr to around 0.0001 Torr pressure) may be advantageously used to assist the SSE melt-infiltration process by overcoming some of the wetting issues (e.g., insufficiently good wetting or insufficiently low viscosity at the temperatures suitable for the melt infiltration and the formation of low resistance interfaces or interphases with the electrode or the current collector). In addition, in some designs, it may be advantageous to utilize hydrostatic pressure (e.g., from around 0.1 to around 10 atm. above the atmospheric pressure) to assist the SSE melt-infiltration (e.g., insufficiently good wetting or insufficiently low viscosity at the temperatures suitable for melt infiltration, etc.).

In some designs, the melt-infiltration process may utilize a controlled atmosphere to reduce or prevent undesirable chemical reactions and/or to promote desired reactions and physical processes at different stages of the melt-infiltration process. Illustrative examples of such controlled atmospheres may include, but not limited to: (i) effectively water-free environment (e.g., where the water concentration is in the range from around 0.001 ppm to around 100.000 ppm) to reduce or prevent undesirable oxidation reactions and water absorptions; (ii) effectively oxygen free environment (e.g., where the oxygen concentration is in the range from around 0.01 ppm to around 1000.00 ppm) to reduce or prevent undesirable reactions with oxygen; (iii) effectively nitrogen-free environment (e.g., where the nitrogen concentration is in the range from around 0.01 ppm to around 1000.00 ppm) to reduce or prevent undesirable nitridations reactions; (iv) vacuum (e.g., from around 0.0000001 Torr to around 100 Torr) to reduce or prevent undesirable reactions and also to remove undesirable chemicals such as water and other solvents (and/or, as previously described, to accelerate the infiltration process); (v) hydrogen-containing atmosphere (e.g., with hydrogen content in the range from around 0.000001% to around 100%) to chemically reduce unwanted oxides formed due to unwanted reactions with oxygen, to replace compounds absorbed on material surfaces or to serve other useful functions (e.g., to decrease the contact angle of the melt with the surface and thereby decrease the infiltration time, etc.).

Figure 9A:
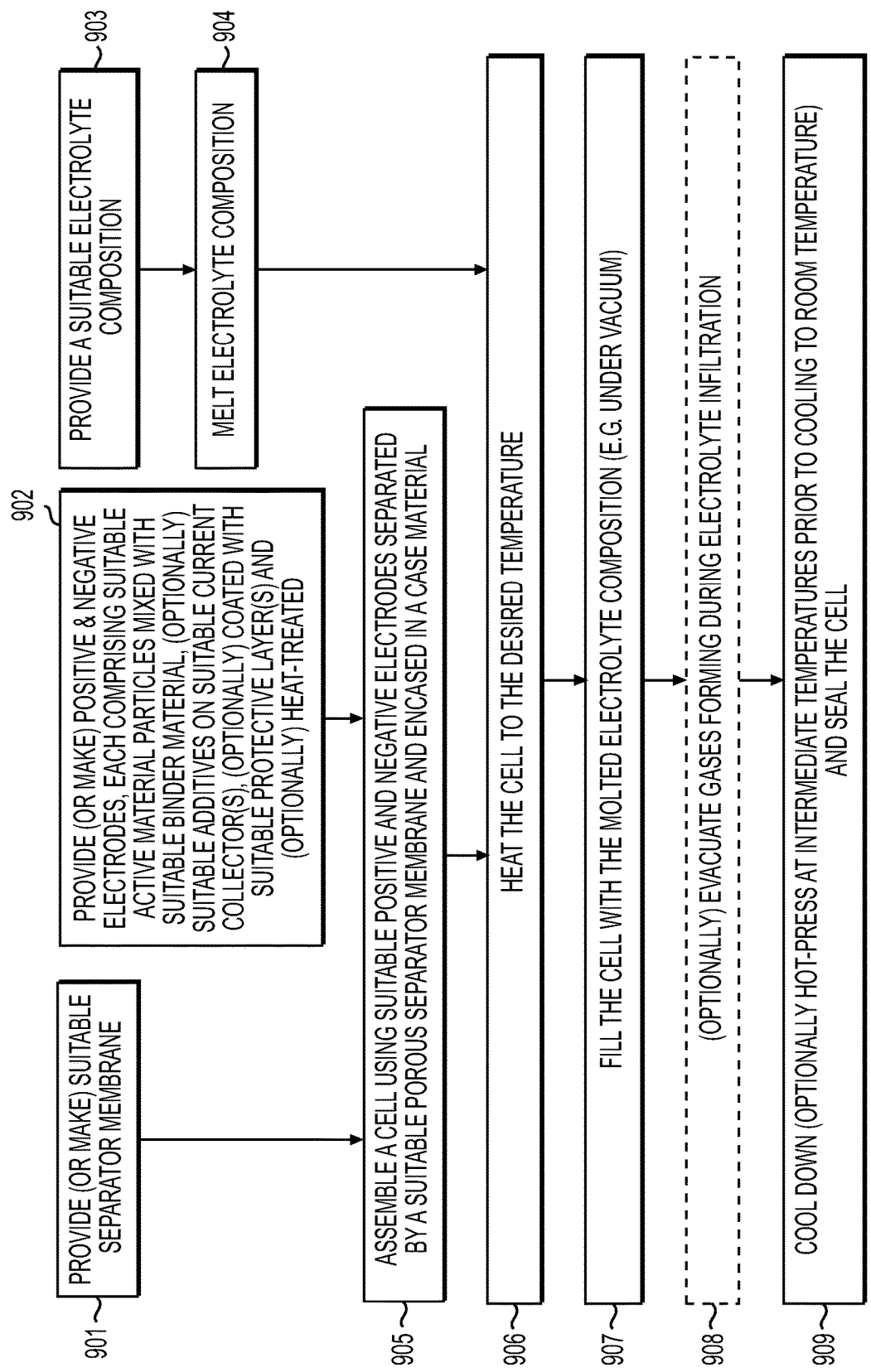
FIG. 9A-9C illustrate example processes for manufacturing solid electrolyte cells in accordance with an embodiment of the disclosure.
Figure 9B:
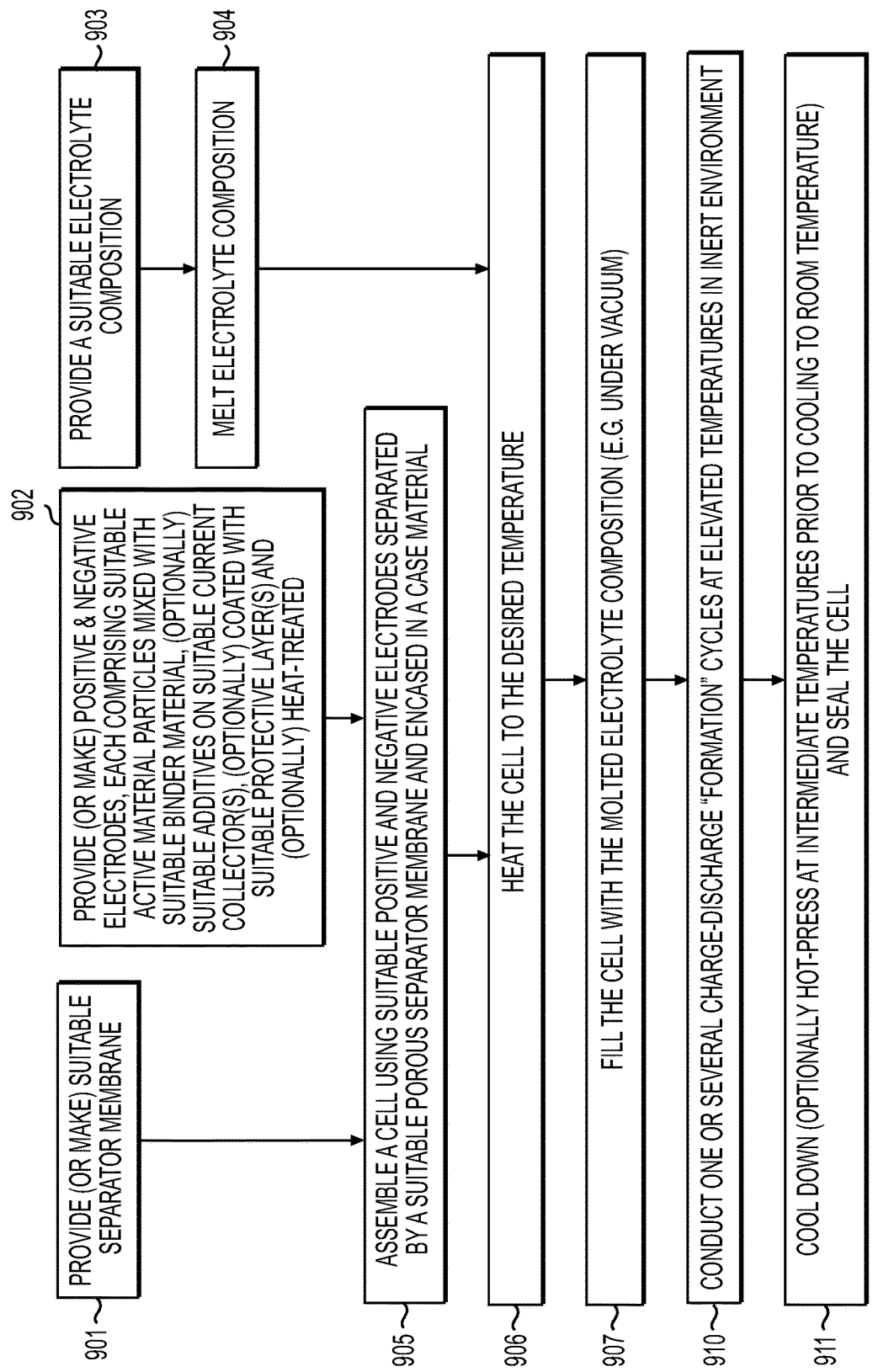

FIGS. 9A-9B show example processes for manufacturing solid electrolyte cells in accordance with an embodiment of the disclosure. The example process of FIG. 9A may involve: providing (e.g., procuring, making, modifying, etc.) a suitable separator membrane (block 901); providing (e.g., procuring, making, modifying, etc.) suitable anodes and cathodes (each comprising suitable active material (in case of an anode that comprises Li metal in a fully charged state, porous particles (or porous films) may be used instead of or in addition to active material with pores available for Li metal deposition), suitable binder material, suitable additives, suitable current collector, and optionally suitable functional (e.g., protective or wetting improving) coatings either on individual particles or on the electrode as whole, as an example, with additional or modified components as desired) (block 902); providing (e.g., procuring, making, modifying, etc.) a suitable solid electrolyte composition (block 903); melting (preferably to 100% in some designs) the solid electrolyte (block 904); assembling a cell using suitable positive and negative electrodes separated by a suitable porous separator membrane and encased in a case material (block 905); heating the cell to the desired temperature (suitable for melt-infiltrating of the electrolyte) (block 906); filling the cell with the molten electrolyte (e.g., under vacuum) (block 907); (optionally) evacuating the gases formed during the electrolyte infiltration (optional block 908); and cooling down and sealing the cell (block 909). In some designs, the separator membrane may comprise several layers. In some designs, the separator membrane layer(s) may be deposited onto at least one (or both) of the electrodes. The separator membrane layer(s) may comprise ceramic particles (such as oxide particles—e.g., MgO, $Al_2O_3$, ZrO, etc.). In some designs, inorganic material(s) may comprise around 75-100% of the suitable separator membrane. In some designs, the separator membrane layer(s) may advantageously comprise elongated particles (such as nanowires, whiskers, nanofibers, fibers, nanotubes, flakes, etc., with aspect ratios above around 3 (preferably above around 10 and even more preferably above around 30) and an average smallest dimension (e.g., diameter or thickness) below around 500 nm). In some designs, in such high aspect ratio, elongated (in two or preferably in one dimension) particles may be used to achieve high porosity of the membrane and thus increase its ionic conductivity when fully filled with the electrolyte. In some designs, one of the electrodes (e.g., an anode or a cathode) or a separator membrane may be pre-filled with one solid electrolyte composition (SSE-1) before the assembling into a cell stack and melt-infiltrating with another solid electrolyte composition (SSE-2). In some designs, it may be advantageous for the SSE-1 to exhibit a higher melting point than that of the SSE-2. In some designs, it may be preferable for the melting point of the SSE-1 to be at least around 25° C. higher (in some designs, by at least around 50° C. higher; in some designs by at least around 100° C. higher). In other designs, a single electrolyte composition may be used in the cell.

The example process of FIG. 9B is similar to that described above with reference to FIG. 9A, except that the so-called "formation" charge-discharge cycles (block 910) are conducted at elevated temperatures (e.g., above the typical cell operation temperature) in order to accommodate some of the volume changes in the electrodes and assist in evacuation of gases that may form during initial cycles, before the cell is sealed (block 911) and is ready for end (e.g., customer) use. Here similarly, in some designs, one of the electrodes (e.g., an anode or a cathode) or a separator membrane may be pre-filled with one solid electrolyte composition (SSE-1) before the assembling into a cell stack and melt-infiltrating with another solid electrolyte composition (SSE-2).

Figure 9C:
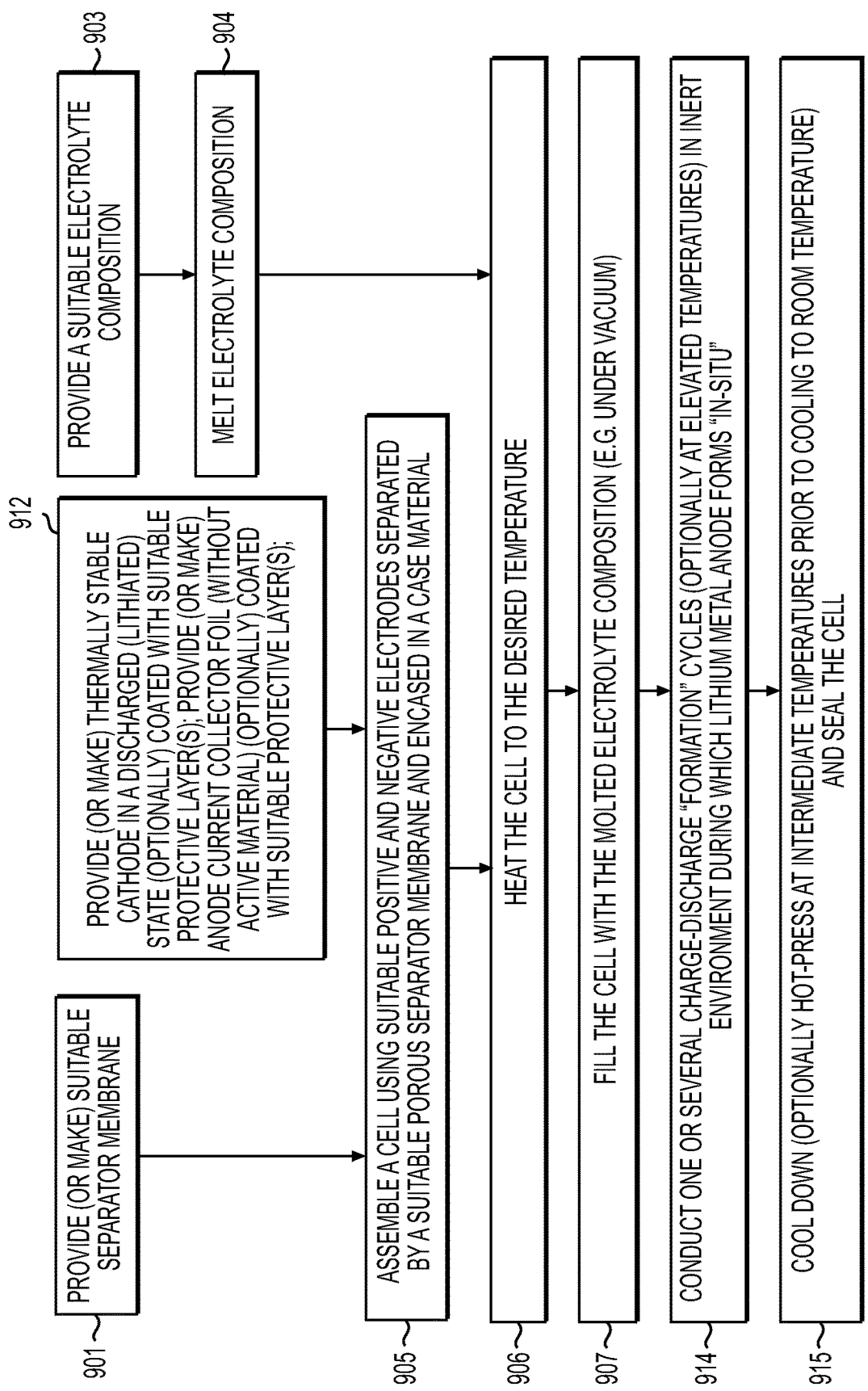

The example process of FIG. 9C is similar to that described above with reference to FIG. 9A, except that the providing or making an anode does not involve using active material (block 914) (although in some designs, porous particles may still be used in the anode to provide pore volume for Li formation during charging) and lithium metal anode is produced "in-situ" during the formation cycle(s) before the cell is sealed (block 915) and is ready for end (e.g., customer) use. In some designs this lithium anode formation may be conducted also at elevated temperatures (e.g., above the typical cell operation temperature).

In some designs, electrodes melt-infiltrated with solid electrolytes may be individually constructed. In some designs, different electrolytes may be used for the anodes and cathodes (e.g., a first electrolyte for the anode and a second, distinct electrolyte for the cathode). In some designs, only one of the electrodes (e.g., either an anode or a cathode) may comprise (or be infiltrated with or be coated with) a solid electrolyte.

In some designs, heating the electrodes or pre-assembled cell components before, during or after the melt-infiltration may be performed by (i) electromagnetic radiation (e.g., infrared, microwave and/or by using other wavelengths), (ii) passive or active convection, (iii) by heat conduction via a direct contact with a hot body, (iv) by conduction of the electrical current through the electrically conductive components (e.g., current collector foils, etc.) and/or other suitable means.

FIGS. 10A-10B show example processes for manufacturing electrodes infiltrated with solid electrolyte of the type disclosed herein. The process of FIG. 10A may involve: providing (e.g., procuring, making, modifying, etc.) a suitable electrode (block 1001); (optionally) depositing or attaching a suitable separator membrane onto the electrode surface (optional block 402); depositing a layer of the solid electrolyte on the top surface of the electrode (e.g., in the form of a powder or a paste) (block 1003); heating the assembly (to melt electrolyte) and melt-infiltrating the electrode (with optional separator layer) with the molten electrolyte (block 1004); and cooling down to room temperature for use in the desired cell construction (block 1005). The process of FIG. 10B may involve: providing (e.g., procuring, making, modifying, etc.) a suitable electrode (block 1011); (optionally) depositing or attaching a suitable separator membrane onto the electrode surface (optional block 1012); dipping the assembly into the molten electrolyte and melt-infiltrating the electrolyte into the pores (block 1013); (optionally) removing excess of electrolyte (optional block 1014); and cooling down to room temperature for use in the desired cell construction (block 1015).

In some designs (e.g., when the battery is made by stacking the electrodes/separators) it may be advantageous to apply a pressure onto the stack while the stack is being heated to substantially above (by 25° C. or more) the operating temperatures after (in some designs during) the electrolyte infiltration. In some designs, the hot-press temperature may be at least around 25 C lower (in some designs, at least around 50° C. lower) than the electrolyte infiltration temperature.

In some designs, it is advantageous to prevent a relatively hot electrolyte melt from inducing significant undesirable damage to the separator membrane, to the binder, to the conductive additives, to the active material, to the electrical and mechanical integrity of the electrodes, to the current collectors and to other important components of the individual electrodes (if individual electrodes are infiltrated with a suitable molten electrolyte) or to the electrode/separator stack (or roll) (if a stack or roll is infiltrated with a suitable molten electrolyte) or to the pre-assembled cell (if the stack or roll is pre-assembled/pre-packaged into the case before the melt-infiltration with a suitable electrolyte). Some of the aspects of the present disclosure describe route enhancements to overcome such potential negative effects. It has also been found that many hot electrolyte melts exhibit poor wetting on some conductive carbon additives and some polymer binders. Some of the aspects of the present disclosure describe route enhancements to overcome such potential negative effects.

In some designs, to reduce gas generation and also to enhance mechanical strength of the electrodes at elevated temperatures (including the cell heating and cooling during the electrolyte infiltration), thermally-stable (at near the melt-infiltration temperatures) elongated particles (such as nanowires, whiskers (including various type of ceramic whiskers), nanotubes (including various type of carbon nanotubes), flakes, etc.) with aspect ratios above around 3 (preferably above around 10 and even more preferably above around 30) and the smallest dimensions (e.g., diameter or thickness) below around 400 nm (preferably below around 100 nm and even more preferably below around 30 nm) may be added into the electrode (or electrode/binder) mix. In some designs, elongated (in two or preferably in one dimension) nanoparticles may be used to connect/join the active material particles and may enhance the mechanical and electrical stability of the electrodes during the melt infiltration. In some designs, such particles may additionally enhance the electrical conductivity (e.g., if the particles are electrically conductive) and reduce gas generation (e.g., if the particles adsorb at least some of the gases generated, if the particles modify the structure and properties of the binders, if the particles assist in forming interconnected pathways for gases to escape from the electrode, etc.) during the electrolyte melt-infiltration process. In some designs, a suitable weight fraction of such elongated particles may range from around 0.01 wt. % to around 25 wt. % and from around 0.01 vol. % to around 25 vol. % of the total electrode mass and volume, respectively. It may be useful to select two or more kinds of elongated particles/additives in order to achieve an optimal electrode performance in cells (e.g., combine ceramic (e.g., oxide, nitride, sulfide, fluoride, etc.) particles that may offer enhanced electrolyte wetting or may adsorb some of the gases or bond particularly well with a binder with conductive (e.g., carbon) particles that may offer enhanced electrical conductivity to the electrode). If two types of particles are used, their relative weight fractions may range from around 1:1000 to around 1000:1.

In some designs, it may be advantageous to select a polymer (e.g., in a binder or in a polymer separator) that exhibits thermal stability sufficient to withstand heat-treatment during the electrolyte melt-infiltration process (e.g., a polymer that exhibits no more than around 20 wt. % weight loss during exposure at the melt-infiltration conditions for around 1-to-5 minutes). In some designs, instead of an organic polymer binder or an organic polymer separator, one may use an inorganic polymer binder (or separator) or a hybrid organic-inorganic material to achieve the desired thermal stability and wetting. In some designs, thermal stability of the binder may be significantly enhanced if a ceramic material (e.g., an oxide or nitride or carbide or fluoride or sulfide or another suitable ceramic material(s); in some designs comprising Li, Na, K, Mg, Ca, Al, Cr, Zr, Zn, Si, Ni, La, Y, among other suitable metals and semimetals) is infiltrated into the polymer binder structure (e.g., by means of ALD or other vapor deposition or vapor infiltration or other methods) and/or deposited on its surface (e.g., by means of ALD or other vapor deposition or vapor infiltration or other methods) before the melt-infiltration with the electrolyte (after the electrode fabrication in case of the binder and after the membrane fabrication or deposition in case of a separator). In some designs, it may be advantageous if the binder forms a fibrous structure so that a portion of the electrode particles are not coated with the binder. In some designs, it may be advantageous to use a combination of two or more distinct binder materials with substantially different thermal stability (e.g., by around 25° C. or more), substantially different affinity to the electrode particles (e.g., so that one binder preferentially coat the particles), substantially different permeability by the vapors during ALD (e.g., so that one of the binder incorporates substantially larger quantity (e.g., by around 25% or more larger) of the ceramic material) and/or substantially different shape (e.g., one forming conformal films and another one forming fiber-shaped net).

In some designs, a polymer in the binder or separator membrane may be halogenated (e.g., fluorinated, chlorinated, etc.) in order to enhance its thermal properties or chemical stability or wetting by the molten solid electrolyte. In some designs, a weakly bonded hydrogen (H) (e.g., in the form of alcohol or carboxy groups, etc.) in a polymer in the binder or separator membrane may be replaced with another metal (K, Li, Na, Cs, etc.) in order to reduce or prevent $H_2$ evolution during heating or melt infiltration by the SSE.

In some designs, a polymer in the binder or separator membrane may be cured via treatments (i) at high temperatures (e.g., from around 100° C. to around 500° C.) and/or (ii) high pressures (E.G., from around 2 atm to around 1000 atm) and/or (iii) chemically reductive (or, the opposite—(iv) chemically oxidative) environment in order to enhance its thermal properties or chemical stability or wetting by the molten solid electrolyte.

In some designs, it may also be preferred for the binder material not to undergo substantial (e.g., above around 15 vol. %) shrinkage during the heat treatment and thus the binder composition may be selected accordingly. In some designs, the binder material may be selected to become ceramic after the electrode heat-treatment process (e.g., if the binder material is selected from a broad range of the precursors for polymer-derived ceramics). In some designs, the binding material (or a portion of the binder materials) may be vapor-deposited (e.g., by using vapor infiltration, chemical vapor deposition (CVD), atomic layer deposition (ALD), or other suitable processes) on the porous electrode surface (e.g., as a conformal or at least partially conformal coating), connecting individual electrode particles together. In this case, such a coating acts as a binder (and in some cases, as a protective layer). In some designs, such a coating may comprise an oxide layer. In some designs, such a coating may be electrically conductive. In some designs, such a coating may comprise two or more layers. In some designs, such a coating may comprise a metal (preferably selected to exhibit a melting point at least around 100° C. above the melt-infiltration temperature and relatively slow reactivity with the molten electrolyte) or a carbon. In some designs (e.g., when the ionic conductivity of such a coating is low), it may be preferable that the coating covers no more than around 90% (more preferably no more than around 80% or even more preferably no more than around 60%) of the surface area of the individual active particles in the electrode.

The most conventionally used separator membranes for commercial Li-ion battery electrodes typically comprise polymers, such as polypropylene or polyethylene, or both. In some cases, a porous ceramic layer is deposited on the surface of the separator membranes (typically at the cathode side) to reduce shrinkage at elevated temperatures and increase cycle life and safety. In some cases, a separator membrane is coated with a layer of a surfactant to increase wetting in some electrolytes. However, conventional membrane design may not be ideal for melt-infiltration with a solid electrolyte material. First, depending on the chemistry and the temperature of the electrolyte melt, poor wetting may be a serious issue that prevents infiltration of the melt. Typically used surfactants are not thermally stable and may evaporate or decompose during the melt-infiltration process. Second, mechanical properties of the separator material may be compromised (particularly at higher temperatures). Third, a separator membrane may start melting at elevated temperatures, inducing pore closure and shrinkage. For example, both polyethylene and polypropylene typically melt at temperatures as low as around 115-135° C. Fourth, typical polymer separator membranes may decompose and induce formation of undesirable gaseous products at melt-infiltration temperatures.

In some designs, porous ceramic membranes (e.g., porous oxide-based or porous nitride-based membranes, among others) may be more suitable for melt-infiltration with a solid electrolyte material than conventional polymeric membranes. In some designs, the use of a fibrous porous ceramic may be advantageous. Porous ceramic membranes compris- ing zirconium (Zr) or aluminum (Al) or some of the rare earth elements (e.g., lanthanum, yttrium, various lanthanoids, etc.) may be particularly advantageous as they may offer a combination of good electrochemical and thermal stabilities, which can be advantageous in accordance with one or more embodiments of the present disclosure. In some cases, low-cost porous ceramics comprising Si (e.g., as in silicon oxide or other ceramics), Mg (e.g., as in magnesium oxide or other ceramics), Ti (e.g., as in titanium oxide or other ceramics), Zn (e.g., as in zinc oxide or other ceramics), Cu (e.g., as in copper oxide or other ceramics), Cd (e.g., as in cadmium oxide or other ceramics), Mn (e.g., as in manganese oxide or other ceramics), Fe (e.g., as in iron oxide or other ceramics), or their mixtures may be electrochemically unstable at a low potential (e.g., below around 1 V vs. Li/Li+) when used as a part of the separator membrane for solid state batteries. In cases where such membrane material compositions (e.g., comprising sufficiently high content of Si, Mg, Ti, Cu, Zn, Cd, Mn, or Fe, or other elements that may induce electrochemical instability of the membrane on one of the electrodes) are desired to be used (e.g., for economical or other practical reasons, such as compatibility with the electrolyte melt, better wetting, better ionic conductivity, better safety, etc.), it may be advantageous to form a porous coating (from around 10 nm to around 20 microns in thickness) of an electrochemically stable material (e.g., aluminum oxide, zirconia oxide, solid electrolyte particles, or other suitable ceramic materials) at least on one side of such a porous ceramic membrane (e.g., in contact with an electrode that experiences a separator-degrading electrochemical potential, such as a low potential anode). In some design, this surface layer may be in the form of bonded (or sintered) particles. In some design, spray coating or slurry-based deposition are examples of suitable low-cost techniques that may be utilized for the formation of such a surface coating layer. In some design, the suitable thickness of such a porous layer may range from around 10 nm to around 50 microns. In some design, the porous layer may also be advantageous for reasons other than the above rationale to improve electrochemical compatibility of the membrane material with both electrodes (e.g., for improved safety or thermal stability or mechanical stability, etc.).

In some designs, the separator membrane layer(s) may advantageously comprise elongated particles (such as nanowires, whiskers, nanofibers, nanotubes, flakes, etc. with aspect ratios above around 3 (preferably above around 10 and even more preferably above around 30) and the average smallest dimensions (e.g., diameter or thickness) below around 500 nm). In some designs, elongated (in two or preferably in one dimension) particles may be used to achieve high porosity of the membrane and thus increase its ionic conductivity when fully filled with the electrolyte.

In some designs, alternatively to (or in combination with) the formation of a porous layer on one side of the membrane, a thin (e.g., from around 0.5 nm to around 500 nm) conformal surface layer may be deposited on the internal (in addition to the external) surface area of the membrane. In some designs, such a conformal deposition may be conducted in a gaseous phase (e.g., by CVD or ALD, or other vapor deposition process), in a liquid phase (e.g., via a sol-gel, electrodeposition, electroless deposition, layer-by-layer deposition or another suitable wet chemical process), via a spray deposition, or other methodologies (including those that include a combination of wet and dry stages and may involve thermal treatment(s) in controlled environment(s)). In some designs, formation of this thin conformal coating may improve the interface (or interphase)

with the solid electrolyte (e.g., in either a solid or a molten form) or provide other benefits (e.g., improved mechanical properties, reduced self-discharge or leakage, improved ionic conductivity and rate performance of a solid cell, etc.).

In some designs (e.g., in order to improve wetting by a solid electrolyte or a solid electrolyte melt, or to improve thermal, mechanical, or electrochemical stability) porous polymer membranes may comprise ceramic particles, thus forming polymer-ceramic composite membranes. In some designs, the suitable dimensions of such ceramic particles may generally range from around 2 nm to around 5 microns, depending on the cell design. In some designs, the weight fraction of such ceramic particles in the polymer-ceramic composites may range from around 0.02 wt. % to around 99 wt. %.

In some designs, it may be advantageous to form a porous coating (from around 50 nm to around 20 microns in thickness) of an electrochemically stable and thermally stable material (e.g., ceramic or solid electrolyte with a sufficiently high melting point) at least on one side of such a porous polymer or polymer-ceramic membranes in the context of the present disclosure. This surface layer may be in the form of bonded (or sintered) particles. Similar to the above formation of a porous coating on the surface of ceramic membranes, spray deposition (dry or wet) or slurry-based deposition may be used for the formation of such a coating. Alternatively, a thin (e.g., from around 0.5 nm to around 500 nm) conformal surface layer may be deposited on the internal surface area of the polymer or polymer-ceramic composite membrane. Such a conformal deposition may be conducted in a gaseous phase (e.g., by CVD or ALD, or other vapor deposition process), in a liquid phase (e.g. via a sol-gel, electrodeposition, electroless deposition, or another suitable wet chemical process), via a spray deposition, or other methods (including those that include a combination of wet and dry stages and may involve thermal treatment(s) in controlled atmosphere(s)).

Commercial Li-ion batteries and conventional solid state Li batteries typically use Al foil as a current collector for the cathode and Cu foil as a current collector for the anode. One or both of such current collectors may react with the molten electrolytes during the melt infiltration process, inducing formation of undesired phases (which may be electrically isolative or induce mechanical separation of the electrode from the foils). In addition, cooling the electrolyte-infiltrated electrode down to room temperature may induce stresses at the electrode/current collector interface, which may lead to at least partial delamination of the electrode from the current collector.

In some designs, the use of conductive carbon (e.g., carbon nanofibers, carbon whiskers, carbon nanotubes (such as single-walled, double-walled, and multi-walled carbon nanotubes), graphene, multilayered graphene, exfoliated graphite, graphite flakes, amorphous carbon, and their mixtures and composites, etc., and other forms of conductive carbon), nickel (or nickel alloy), steel, zirconium (or zirconium alloy), or titanium (or titanium alloy) based (or comprising) current collectors may be advantageous in some designs due to their improved compatibility with some of the electrolytes. Alternatively, Cu and Al foil current collectors may comprise a layer of a protective surface coating (preferably from around 1 nm to around 1 micron in average thickness). In some designs, such a protective layer may comprise: nickel, titanium, carbon, or carbon composite (e.g., carbon-ceramic or carbon-polymer composite, where a polymer is preferably sufficiently thermally stable to withstand melt infiltration with electrolyte (note that selected examples of suitable polymers are provided above in relation to the discussion of the polymer binder materials and polymer separator membranes); the polymer weight fraction may be in the range from around 0.1 wt. % to around 99.9 wt. %) or metal(s) or metal oxide(s). In some designs, the carbon in the protective layer may comprise amorphous or disordered (turbostratic) carbon, graphitic carbon or carbon particles and nanoparticles of various shapes, size, and aspect ratios (e.g., carbon onions, carbon blacks, branched carbons, carbon nanofibers, carbon whiskers, carbon nanotubes (such as single-walled, double-walled and multi-walled carbon nanotubes), graphene, multilayered graphene, exfoliated graphite, graphite flakes, or porous carbons, etc.). Depending on the composition of the protective layer and current collector, this protective layer in some designs may be formed by using a spray-coating process, by a slurry-based deposition process, by an electrochemical or electrodeposition process, by electrophoretic deposition, by a vapor-phase deposition (e.g., by CVD, ALD, etc.), by layer-by-layer deposition, by a sol-gel deposition, by a precipitation, or by using other suitable processes and their combinations. In some designs, this protective surface coating layer on a current collector (which may be in the form of a solid or porous foil, a foam or a mesh, etc.) may be deposited either before or after the electrode fabrication on the current collector surface.

Another suitable function of the coating on the current collector in some designs is to reduce the thermal stresses at the current collector/electrode interface. For example, metals typically exhibit higher thermal expansion than ceramic materials. As such, metal foil current collectors will typically compress more during cooling from the melt-infiltration temperatures. In some designs, the use of a surface coating may reduce the stress concentration and improve stability of these solid electrolyte cells. Coatings comprising thermally stable polymers or carbon may be advantageous for this purpose in some designs. Furthermore, the presence of pores in such a coating may further assist in stress accommodation in some designs. In some designs, a suitable porosity of the coating may range from around 0.1 vol. % to around 30 vol. %.

In some designs, it may be advantageous to induce holes into the electrodes (in some designs, propagating all the way from the electrode surface to the current collector or even though the current collector) prior to melt infiltration. In some designs, such holes may greatly enhance the rate of the electrolyte infiltration into the electrode(s) (which may be particularly important with relatively viscous (e.g., >1000 cP) molten electrolytes) and additionally mechanically enhance the electrode(s). In some designs, a suitable size (e.g., average diameter in case of cylindrical or pyramid-shaped holes) may range from around 5 micron to around 500 microns (in some designs, from around 10 micron to around 100 micron) and an average spacing between the holes may range from around 100 micron to around 5,000 micron. In some designs, it may be preferable (e.g., in order to mitigate volumetric capacity reduction) for the total volume of the holes to remain below around 10.00 vol. % (in some designs, from around 0.01 vol. % to around 2.00 vol. %) of the total electrode volume. In some designs, such holes may be produced by mechanical means, by laser micro-machining or by other suitable technique.

Conventional cells infiltrated with a liquid electrolyte contain no remaining porosity between the active electrode particles. However, in some configurations, solid state cells produced by infiltration of the electrolyte melt may benefit from some of the remaining (inter-particle) porosity because it may assist in accommodating some of the stresses occurring during cell fabrication (e.g., thermal stresses) or during cell use (e.g., cell bending). The useful volume fraction of the remaining pores may depend on the cell configuration, electrode thickness, composition and microstructure of the electrode, electrolyte, and separator layers, and in some designs may range from around 0.05 vol. % to around 5 vol. % (as a fraction of the total volume of the electrode). A larger volume fraction may also be used in some designs, although this will reduce energy density and power density of the solid electrolyte cells.

The use of solid electrolytes with high energy so-called "conversion reaction" based cathodes and anodes has been conventionally hindered by the inability of ceramics to accommodate the volume changes that take place during charge and discharge cycling. This applies to rechargeable metal and metal-ion batteries (such as Li and Li-ion batteries) comprising conversion-type electrodes. During insertion of Li into the interstitial positions of so-called "intercalation" compounds, no changes in the chemical bonding and very little change in volume takes place (e.g., commonly below around 1-5 vol. %; although in some cases—often for higher capacity electrodes—higher). In contrast, during insertion of Li into conversion-type electrode materials, these materials convert from one state to another state, which is accompanied by significant changes in chemical bonding, crystal structure and volume (in some designs, in the range from around 8 vol. % to around 400 vol. %). Such volume changes may induce formation of cracks and defects in the solid electrolyte. At the same time, such high-volume changing electrode materials (e.g., some high capacity intercalation-type active materials and conversion-type active materials) allow fabrication of cells with higher gravimetric or volumetric energy densities, which may be highly advantageous in some applications. One or more embodiments of the present disclosure are directed to advanced solid-state batteries that may utilize "volume changing" and "high capacity" (often "conversion-type") active materials in anodes or cathodes, or both.

In one or more embodiments of the present disclosure (and for applications of rechargeable Li and Li-ion batteries comprising exemplary solid electrolytes), the "volume changing" cathode active materials may include, but are not limited to, the following: (i) conversion-type or mixed intercalation/conversion-type metal fluorides (such as lithium fluorides (e.g., LiF), iron fluorides ($FeF_3$ or $FeF_2$), manganese fluoride $MnF_3$, cobalt fluoride ($CoF_3$ or $CoF_2$), cupper fluoride $CuF_2$, nickel fluoride (e.g., $NiF_2$), lead fluoride (e.g., $PbF_2$), bismuth fluorides ($BiF_3$ or $BiF_5$), tin fluoride ($SnF_2$ or $SnF_4$), antimony fluorides ($SbF_3$ or $SbF_5$), cadmium fluoride $CdF_2$, zinc fluoride $ZnF_2$, and other metal fluorides and their mixtures), (ii) various conversion-type or mixed intercalation/conversion-type metal oxyfluorides, (iii) various conversion-type or mixed intercalation/conversion-type metal chalocogenides (such as lithium sulfide $Li_2S$, lithium selenide $Li_2Se$, lithium telluride $Li_2Te$, and others); (iv) various conversion-type metal chlorides or oxychlorides (such as lithium chlorides (e.g., LiCl), iron chlorides ($FeCl_3$ or $FeCl_2$), manganese chloride $MnCl_3$, cobalt chloride ($CoCl_3$ or $CoCl_2$), copper chloride $CuCl_2$, nickel chloride $NiCl_2$, lead chloride $PbCl_2$, bismuth chlorides ($BiCl_3$ or $BiCl_5$), tin chlorides ($SnCl_2$ or $SnCl_4$), antimony chlorides ($SbCl_3$ or $SbCl_5$), cadmium chlorides $CdCl_2$, zinc chlorides $ZnCl_2$, and other metal chlorides and their mixtures); (v) conversion-type metal bromides and oxybromides (such as lithium bromide LiBr); (vi) conversion-type metal iodides (such as lithium iodide LiI); (vii) various conversion-type mixed metal fluorides, mixed metal chlorides, mixed metal bromides, mixed metal iodides, mixed metal halides (a mixture of two or more metal halides, such as $CuF_2$ and $FeCl_2$ or $CuF_2$ and $FeF_3$, etc.); (viii) various other conversion-type electrodes, their combination and mixture (e.g., sulfides, oxides, nitrides, halides, phosphides, hydrides, etc.); (ix) mixtures and combinations of intercalation-type Li-ion battery active materials and conversion-type active materials; (x) various high capacity (e.g., above around 200 mAh/g) intercalation-type materials with high melting points and (x) other types and compositions of active cathode materials that exhibit volume changes in the range from around 6 vol. % to around 400 vol % during charging and discharging. It will be appreciated that these (e.g., conversion-type) volume changing active cathode (and anode) materials may be utilized in both Li-free or partially lithiated or fully lithiated state(s). In some cases, the use of partially or fully lithiated state(s) of active materials may be particularly advantageous for a selected synthesis process (e.g., if only the lithiated state is sufficiently stable for a particular processing/synthesis route). It will be appreciated that partially or fully lithiated conversion-type active materials may be composites. In some examples such composites may comprise metals. For example, if metal halides (e.g., $CuF_2$ or $FeF_3$ or others) are fully lithiated they become a mixture (composite) of a lithium halide (e.g., LiF in the case of metal fluorides) and metal clusters (or nanoparticles) of the corresponding metal fluoride (e.g., Cu, Fe, or a Cu—Fe mixture in the case of $CuF_2$, $FeF_3$, or a $CuFe_2$—$FeF_3$ mixture).

In one or more embodiments of the present disclosure (and for applications of rechargeable Li and Li-ion batteries comprising exemplary solid electrolytes), the "volume changing" anode active materials may include, but are not limited to, the following: (i) various alloying-type (where Li electrochemically alloys with an anode during Li insertion) anode materials (which may be considered a version of the conversion type electrode materials), such as silicon (Si), germanium (Ge), tin (Sn), aluminum (Al), lead (Pb), antimony (Sb), magnesium (Mg), zinc (Zn), phosphorous (P) and others; various binary and ternary Si (or Sn, Sb, Ge, Al, Mg, P, Zn, etc.) alloys (or mixtures) with other metals; other metals and metal alloys that form alloys with Li; (ii) various oxides, various nitrides and oxynitrides and (iii) various hydrides of such metals and metal alloys (these may be pure "conversion reactions" or "mixed conversion-alloying" materials); (iv) lithium metal (e.g., which effectively may have the most dramatic volume changes if it nearly completely dissolves during discharge); (v) various high capacity (e.g., from around 300 mAh/g) intercalation-type anode materials and other types and compositions of active anode materials (e.g., including various combinations of intercalation-type and various conversion-type, including so-called alloying-type, Li metal-type, displacement-type and true conversion-type anode materials) that exhibit average volume changes in the range from around 6 vol. % to around 10,000 vol. % during near-full or full charging (e.g., to around 90-100% state of charge) and near-complete or complete discharging (e.g., to around 0-10% state of charge).

It will be appreciated that the metals and metal alloys described above in the examples of suitable "volume changing" active anode materials may be doped or heavily or "ultra-heavily" doped; in the case of Si, for example, heavily and ultra-heavily doped silicon include silicon doped with a high content of Group III elements, such as boron B, aluminum Al, gallium Ga, indium In, or thallium Tl, or a high content of Group V elements, such as nitrogen N, phosphorus P, arsenic As, antimony Sb, or bismuth Bi; by "heavily doped" and "ultra-heavily doped," it will be understood that the content of doping atoms may be in the range of around 3,000 parts per million (ppm) to around 700,000 ppm, or approximately 0.3% to 70% of the total composition. It will be understood that Group IV elements used to form higher capacity anode materials may include Ge, Sn, Pb, and their mixtures (e.g., various alloys or mechanical mixtures), or composites, with the general formula of $Si_a$—$Ge_b$—$Sn_c$—$Pb_d$—$C_e$-$D_f$, where a, b, c, d, e, and f may be zero or non-zero, and where D is a dopant selected from Group III or Group V of the periodic table. For binary silicon alloys (or mixtures) with metals, the silicon content may be in the range of approximately 20% to 99.7%. Examples of such alloys (or mixtures) include, but are not limited to: Mg—Si, Al—Si, Ca—Si, Sc—Si, Ti—Si, V—Si, Cr—Si, Mn—Si, Fe—Si, Co—Si, Ni—Si, Cu—Si, Zn—Si, Sr—Si, Y—Si, Zr, —Si, Nb—Si, Mo—Si, Tc—Si, Ru—Si, Rh—Si, Pd—Si, Ag—Si, Cd—Si, Ba—Si, Hf—Si, Ta—Si, and W—Si. Such binary alloys may be additionally doped (or heavily doped) with Group III and Group V elements. Alternatively, other Group IV elements may be used instead of silicon to form similar alloys or mixtures with metals in some designs. In some designs, a combination of various Group IV elements may also be used to form such alloys or mixtures with metals. For ternary silicon alloys (or mixtures) with metals, the silicon content may also be in the range of approximately 20% to 99.7%. In some designs, such ternary alloys may be doped (or heavily doped) with Group III and Group V elements. In some designs, other Group IV elements may also be used instead of silicon to form such alloys or mixtures with metals. In some designs, a combination of various Group IV elements may also be used to form such alloys or mixtures with metals. Examples of other metals and metal alloys that form alloys with lithium include, but are not limited to, Mg, Al, Ga, In, Ag, Zn, Cd, etc., as well as various combinations formed from these metals, their oxides, etc.

One or more embodiments of the present disclosure are directed to favorable compositions and favorable architectures of the electrodes comprising conversion-type (including alloying-type) active materials in the form of composites (or nanocomposites) for use with solid electrolytes in solid state rechargeable metal and metal-ion batteries.

To allow for the conversion-type active (anode or cathode) materials to be used with solid electrolyte, it may be advantageous in some designs to configure the conversion-type active (anode or cathode) materials in the form of composite particles additionally comprising another material, which may be referred to herein as a "scaffolding," "skeleton," or "framing" matrix material, that experiences small (preferably around 5 vol. % or below) volume changes during insertion of active (e.g., Li) ions into the composite. It may be also advantageous in some designs for the scaffolding material to possess both sufficient ionic and sufficient electrical conductivities to permit reasonably fast (for a given application) charging and discharging. In some configurations, it may be favorable for the scaffolding material to additionally store charge (ions) and be "active," while exhibiting small volume changes (preferably less than approximately 5 vol. %) during charging and discharging.

For cases where the active material undergoes significant expansion during cell operation from the state of the material during particle synthesis, it may be advantageous in some designs to provide sufficient pore volume within the "scaffolding material/active material" composite to accommodate from around 50 vol. % to around 100 vol. % (typically the higher the better) of such a volume expansion without causing composite particle fractures. In some designs, the composite particles may be configured to experience minimal volume changes at the particle level (e.g., below around 8 vol. %, typically the smaller the better) when cycled with a solid electrolyte. It thus may be advantageous in some designs for the scaffolding material to possess a sufficient elastic modulus, mechanical strength, and toughness in order to avoid fractures and failures during the battery cycling-induced volume changes in the high capacity active material and to reduce or minimize the volume changes at the composite particle level. Note that in some designs, initial cycling may be conducted in a temperature range where the exemplary solid electrolyte is in a soft or liquid state in order to accommodate initial volume changes (e.g., because the $1^{st}$ cycle volume changes may be significantly smaller the subsequent volume changes).

In some designs, it may be advantageous for the scaffolding (framing) matrix material (or at least a portion of the scaffolding matrix material) to form a unibody or a single solid or 'monolithic' particle (for example, where the scaffolding matrix material atoms are linked via chemical bonds) within a single scaffolding matrix material/active material composite particle (as opposed to a weak agglomeration of individual scaffolding matrix material particles within a single composite particle). In this case, the composite may exhibit significantly higher robustness during handling and battery operation (particularly because of the volume changes in the volume-changing active material). Note, however, that some unibody particles may be physically linked or bonded to other particles (e.g., during processing).

As described above, the scaffolding matrix material can be selected as a porous material in some designs. In some designs, the pores in this matrix can be either completely filled with the high capacity active material (e.g., when no additional space is needed for volume expansion) or partially filled with the high capacity active material (e.g., when additional pore space is needed to accommodate the volume expansion during charge-discharge cycling).

The pores in the scaffolding matrix may either be closed or open (interconnected). In some designs, when direct contact between the electrolyte and active material is not desired (for example, when it leads to degradation of the active material or formation of undesirable interphase material during the cell fabrication or a cell operation), the following configurations may be advantageous: (i) most of the pores in the scaffolding matrix material are closed; (ii) several or more interconnected/open pores in the scaffolding matrix material are closed together (in some configurations, all the interconnected pores within a single particle may be enclosed in an electrolyte-impermeable but active ion permeable shell, discussed in more detail below); or (iii) the pores may be plugged with another material, which may be used to isolate (at least a majority of) the active material (infiltrated into the scaffolding matrix material) from direct contact with the electrolyte.

In some designs, the scaffolding material may be sufficiently permeable to electrolyte ions participating in the charge storage (such as Li ions in the case of a Li-ion battery). In this case, even when either (i) no open (no interconnected) pores exist in the scaffolding matrix material, (ii) the pores are interconnected but not accessible to the electrolyte (e.g., when an additional ion-permeable shell prevents the electrolyte from penetrating into the scaffold or when the pores are plugged with another material), or (iii)

the diffusion coefficient of the active material for the active ions participating in the charge storage is low (e.g., less than around $10^{-11}$ cm$^2$/S), it may be important for the ions from the electrolyte to reach all the matrix-encapsulated, high-capacity active material in an amount of time sufficient to maintain reasonable (for a given application) charge and discharge rates. In some designs, this will determine the minimum sufficient ionic mobility (diffusion coefficient) and ionic conductivity for the scaffolding matrix of the above-described composites. In some designs, the value of the minimum ionic conductivity of the scaffolding matrix depends on the size of the composite particles, thickness of the scaffolding matrix walls, ionic resistance of the active material/scaffolding matrix interface and other parameters of the system. In some designs, it is desirable for the scaffolding matrix to be sufficiently conductive to maintain at least around 50% of the maximum discharge capacity of the composite at a discharge rate of "1C" (which corresponds to the current density capable of discharging the electrode material within around 1 hour, if the electrode material provides its full capacity).

In some designs, conversion-type active (anode or cathode) materials in the form of composite particles (with the above-discussed "scaffolding," "skeleton," or "framing" matrix material) may experience substantial volume changes during the first cycle (sometimes as large as around 140 vol. %) and much smaller volume changes (e.g., around 3-30 vol. %) during the subsequent cycles. In order to accommodate these large volume changes during the first (or the first few) cycle(s) in cells comprising solid electrolytes, it may be advantageous in some designs to conduct these cycle(s) at an elevated temperature where the solid electrolyte is either soft or molten. In this case, a sufficiently high ionic conductivity of the solid electrolyte in a molten state may be particularly advantageous.

One or more embodiments of the present disclosure are further directed to providing an improved architecture of such composites, where each active particle comprises a shell at least partially encasing the active material, the shell being substantially permeable to the Li ions stored and released by the conversion-type active material(s). In some designs, such a shell may serve one or more important functions, such as (i) prevention of electrolyte filling into the porous structure of the composites, (ii) protection of the active materials during undesirable reaction with the electrolyte during cell assembling or operation, (iii) reduction in the charge transfer resistance, (iv) enhancement in the wettability of the electrodes by the electrolyte, (v) accommodation of the stresses at the electrode particles/electrolyte interface during cycling, and/or (vi) physical constrain to reduce volume changes in active composite particles during the volume changes in active material, to name a few.

In some designs, the shell may comprise a protective layer formed from a material that is substantially impermeable to the electrolyte, but permeable to active electrolyte ions (e.g., Li ions for rechargeable Li or Li-ion solid electrolyte cells). In some designs, the thickness of the shell may range from around 1 nm to around 10 microns. In some applications where maximum energy density is desired, the shell thickness may preferably comprise from around 0.05% to around 20% of the radius of the total composite particles (including the shell).

In some designs, the shell may comprise carbon. In some designs, the shell may also be solely made of mostly graphitic (sp$^2$-bonded) carbon or have an outer layer composed of graphitic (electrically conductive) carbon. In some designs, the shell may comprise an active (Li storing) material layer, where the active material layer is formed from a different active material than in the core of the particles. In some designs, the shell may comprise an intercalation-type active material, where accessible Li capacity of the intercalation material in the potential range of the electrode operation in a cell may range from around 0.1 mAh/g to around 300 mAh/g (e.g., where the low capacity may originate from Li intercalation in a different potential than that of the electrode operation).

In some designs, the shell may comprise a porous layer having a smaller average pore size than the skeleton matrix material. In some designs, pores in the porous layer of the shell may be at least partially infiltrated with a metal fluoride, including a lithium fluoride. In another example, the pores in the porous layer of the shell may be at least partially filled with intercalation-type active material. In another example, the pores in the porous layer of the shell may be at least partially filled with a material that does not undergo conversion reaction within the potential range of the cathode operation. As another example, the shell may be a composite material comprising an inner layer and an outer layer. The inner layer may be a porous layer, for example, having a smaller average pore size than the skeleton matrix material, and the outer layer may be, for example, (i) a protective layer formed from a material that is substantially impermeable to electrolyte solvent molecules or (ii) an active material layer formed from an active material that is different from the active material (such as lithium fluoride material intermixed with specific metal clusters or metal nanoparticles) in the bulk of the composite particles. As another example, the shell may be a composite material comprising two or more materials arranged in an interpenetrating configuration such that each of the materials of the composite material contacts the lithium fluoride or the skeleton matrix material (if present). As another example, at least the top layer of the shell may comprise conductive carbon. In yet another example, the shell may have gradually changing composition from the surface towards the center of the composite particles. In some configurations (e.g., when stress accommodation is desired) the shell may comprise pores.

In some designs, each composite particle may further comprise external channel pores extending from an outer surface of the skeleton matrix material towards the center of the skeleton matrix material, providing channels for solid electrolyte melt-infiltration and thus fast diffusion pathways for the ions into the active material disposed within the skeleton matrix material. In some designs, at least some portion of the external channel pores may be filled with (i) a porous material having a different microstructure than the skeleton matrix material, (ii) an active material that does not undergo conversion reaction in the potential range of the composite cathode operation, and/or (iii) a solid electrolyte material. In some designs, the surface of the external channel pores may be coated with a thin (e.g., from around 0.3 to around 50 nanometer) layer of (i) electrically conductive material, (ii) an active material that does not undergo conversion reaction in the potential range of the composite cathode operation, and/or (iii) a solid electrolyte material.

In some designs, the protective coating(s) or coating(s) may be deposited from a vapor phase via vapor deposition techniques. Examples of such techniques include, but are not limited to, chemical vapor deposition (CVD) including plasma-enhanced CVD, atomic layer deposition (ALD) including plasma-enhanced ALD, vapor infiltration, and others. For some designs, the protective material may be deposited from a solution. Examples of suitable techniques include sol-gel, layer-by-layer deposition, polymer adsorption, surface-initiated polymerization, nanoparticles adsorption, spray drying, layer-by-layer deposition, electroless deposition, electrodeposition, electrophoretic deposition and others. In some designs, the shell formation may involve multiple stages, where initially the shell precursor is first deposited conformably in a solution and then is transformed (at least, in part) into the shell material via thermal decomposition and/or chemical reaction. In some designs, multiple approaches may be combined in order to produce conformal, essentially defect-free shells around individual particles. In some designs, shells may be deposited electrochemically.

Liquid electrolyte-comprising Li-ion battery cells conventionally do not utilize high voltage cathodes and conventionally are not charged above around 4.45 V because of the undesirable oxidation of the suitable liquid electrolytes at such high cathode potentials. Those liquid electrolytes that are stable at higher potentials are typically not compatible with low potential Li-ion anode materials (such as graphite, silicon, tin, or lithium, to provide a few examples). This low voltage limits the attainable energy density of the rechargeable Li or Li-ion cells with liquid electrolyte. Conventional solid state Li-ion batteries typically utilize a Li metal anode instead of the graphite anode due to poor graphite/solid electrolyte contact and poor compatibility of the typical solid electrolytes with many low potential Li-ion anode materials (such as graphite or silicon). However, the use of Li metal foil anodes may limit the power performance of such cells (particularly of the cathodes exhibit high areal loading in the range from around 3.5 mAh/cm$^2$ to around 70 mAh/cm$^2$; in some designs from around 4.0 mAh/cm$^2$ to around 10 mAh/cm$^2$) because of the slow kinetics of the plating process and, additionally, induces undesirable thickness changes in the cells during operation. In some designs, the use of a melt-infiltration process for the formation of solid state Li-ion batteries as described above with respect to various embodiments may provide a unique opportunity to utilize both low potential anode active materials (such as graphite, silicon, tin, or lithium, to provide a few examples) in combination with high voltage active cathode materials that may be charged to above 4.5 V vs. Li/Li$^+$. In this case, both the rate performance and the energy density may be increased relative to conventional Li-ion battery cells. Examples of suitable (in accordance with one or more embodiments of the present disclosure) high voltage cathode materials include, but are not limited to a range of materials with an average Li extraction potential above around 3.9 V vs. Li/Li$^+$, such as lithium cobalt phosphate (LCP), lithium nickel phosphate (LNP), various tavorite structure materials (such as various polyannion compounds, for example, those with the formulas $Li_xM1_yM2_{1-y}(XO_4)F$; $Li_xM1_yM2_{1-y}(XO_4)OH$ or $Li_xM1_yM2_{1-y}(YO_3)(XO_4)$, where x=from 1 to 3, y=from 0 to 1, $M_1$ and $M_2$ are redox active transition metals (such as Ni, Co, and others such as Mn, Fe, V, Mo, etc.), X=P, Si, or As; Y=C or B; as well as many others) and various other intercalation-type active materials (such as other polyanions of triplite or other structures, etc.), high voltage spinels (including, but not limited to those with the formulas $LiMn_xNi_yM_zO_4$, where x is from 0.1 to 1.9, y is from 0.1 to 1.9, z is from 0 to 1, M is another transition metal or semimetal), to name a few common examples. In some designs, more conventional cathodes (e.g., lithium cobalt oxide, lithium nickel oxide, lithium nickel manganese oxide, lithium nickel cobalt manganese oxide, lithium-rich nickel manganese cobalt oxide and other layered materials) may also be effectively utilized in the exemplary solid state cells.

Figure 11:
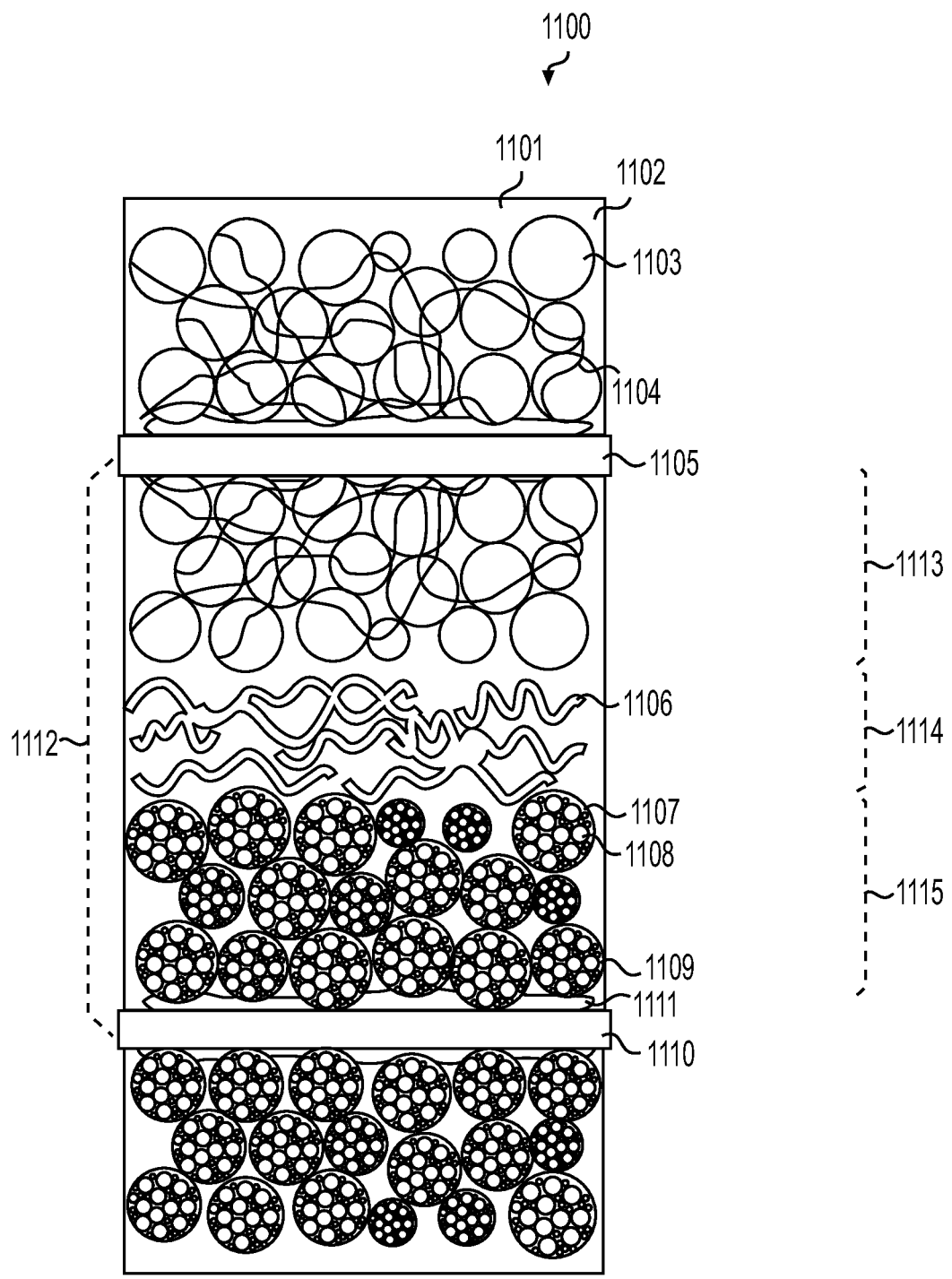
FIG. 11 illustrate example structure of a cathode/separator/anode stack filled with a solid electrolyte in accordance with an embodiment of the disclosure.

FIG. 11 illustrates an example cathode-separator-anode stack 1100 filled (e.g., by melt infiltration) with a solid electrolyte 1101 in accordance with an embodiment of the disclosure. Active (e.g., Li-containing) cathode particles 1103 in this example are electrically connected with conductive additives 1104 and attached to a cathode current collector 1105. The cathode (and cathode particles) may be conformally (at least partially) coated with a functional (e.g., protective or wetting-enhancing, etc.) layer 1102. A porous separator 506 (which may comprise nanofibers in some designs) is also filled with a solid electrolyte (the same solid electrolyte as the solid electrolyte 1101 used in the cathode, in some designs). The anode (in some designs, also filled with the same electrolyte as the solid electrolyte 1101 used in the cathode) in this example comprises porous particles 1107 of suitable composition comprising internal pores 1108. In some designs, such pores may provide volume for Li plating during (e.g., the first) charge. In some designs, a Li metal anode may be formed in-situ, after the cell assembling. In some designs, since unfilled pores do not restrict Li growth, the Li dendrite growth on the top surface of the electrode into the solid electrolyte may be greatly reduced or avoided at reasonable areal current densities. In some designs, a high surface area between the electrolyte and porous anode particles may help to reduce the interfacial resistance and enhance the rate performance thus facilitating faster charging. In some designs, the anode (and porous anode particles) may be conformally (at least partially) coated with a functional (e.g., protective or wetting-enhancing, etc.) layer 1109. In some designs, both the anode and the cathode may comprise a thermally stable binder. Porous anode particles 1107 may be electrically connected with conductive additives and attached to an anode current collector 1110. In order to reduce or prevent undesirable interactions between the electrolyte and current collector(s), a protective layer 1111 may be deposited on surfaces of the current collectors 1105 and 1110 to prevent a direct contact between the electrolyte and the respective current collector. In some designs, instead of (or in addition to) the protection, such or similar layer may be utilized to improve adhesion to the current collector or reduce stresses (e.g., during heating/cooling or during cycling) at the electrode/current collector interphase. A unit cell or a building block 1112 of a battery cell comprises half of the cathode current collector 1105, one side of an electrolyte-filled cathode 1113, an electrolyte-filled separator 1114, one side of an electrolyte-filled anode 1115 and half of the anode current collector 1110. Here, the particles within both electrodes are shown to be spherical for illustrative purposes only. The shape of the particles may be irregular, flake-like, fiber-like, among others and their various combinations.

Figure 12A:
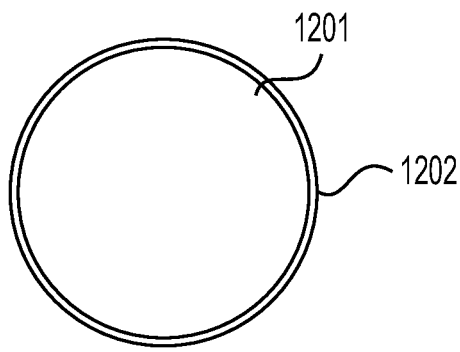
Figure 12B:
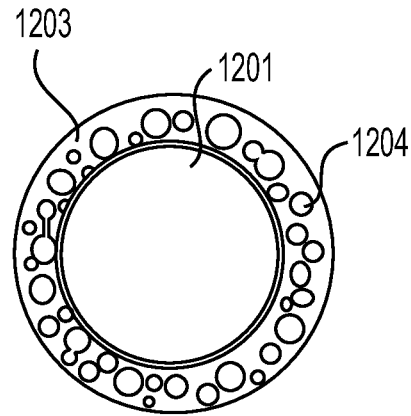
Figure 12C:
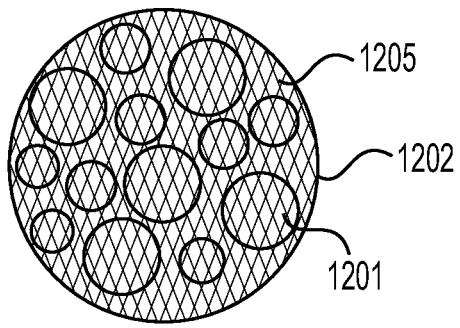
Figure 12D:
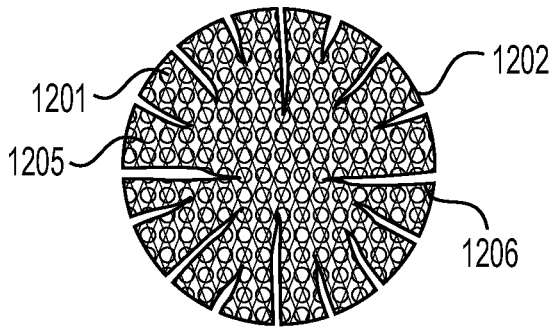
Figure 12E:
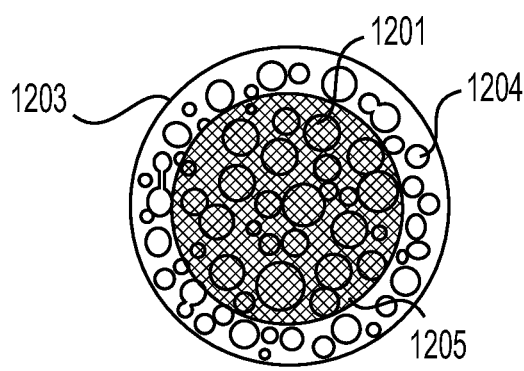
Figure 12F:
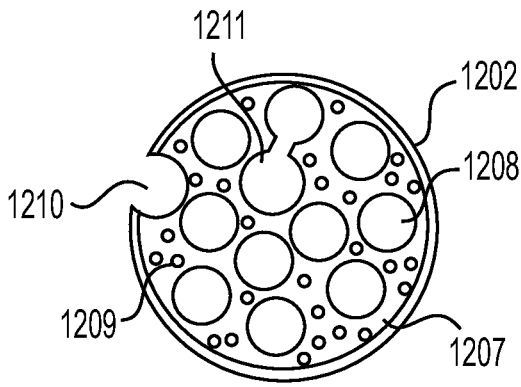

FIGS. 12A-12F show illustrative examples of a few selected microstructures of the electrode particles that may be used in accordance with one or more embodiments of the disclosure. FIG. 12A shows an example of a particle comprising an active material 1201 coated with a functional shell layer 1202. FIG. 12B shows an example of a particle comprising an active material 601 coated with a porous shell 1203 comprising pores 1204 (e.g., introduced in order to reduce stresses at the active material/electrolyte interface/interphase during cycling). Some or all of such pores may be closed. Some or all of such pores may be interconnected. In an example, the porous shell 1203 may be a composite. In a further example, the porous shell 1203 may comprise more than one distinct layer. FIG. 12C shows an example of a particle comprising an active material 1201 (e.g., high capacity intercalation type or conversion type or alloying type) dispersed within a matrix material 1205 (e.g., porous to accommodate stresses during cycling). This composite particle may comprise a functional shell layer 1202 that encases at least a portion of the active material 1201. FIG. 12D shows an example of a similar particle, which additionally comprises channel pores 1206. FIG. 12E shows an example of a particle comprising porous shell 1203 with pores 1204, porous core with active material 1201 dispersed within a porous matrix material 1205. FIG. 12F shows an example of an anode particle that comprises larger pores 1208, smaller pores 1209, interconnected pores 1211, pores 1210 connected to the surface of the particle, pore walls 1207 and a functional shell layer 1202. In some designs, during charging, at least some of the pore volume may be used as space for Li metal deposition or expansion of the Li alloy (or conversion) particles or both. In some designs, the pore walls 1207 may also host some Li via intercalation (in some designs—conversion or alloying or mixed) mechanism. In some designs, some of the pores 1210 connected to the surface of the particles may remain unfilled with electrolyte (e.g., due to poor wetting or due to being filled with a sacrificial material). In a specific example, some or all of the active material 1201 (e.g., which may be configured as electrically conductive, Li permeable material deployed as part of an anode electrode in some designs) may comprise internal pores which, in a fully discharged or Li-free state, remain at least partially unfilled with solid electrolyte and are provided to at least partially accommodate volume increase during lithiation upon charging.

Figure 13:
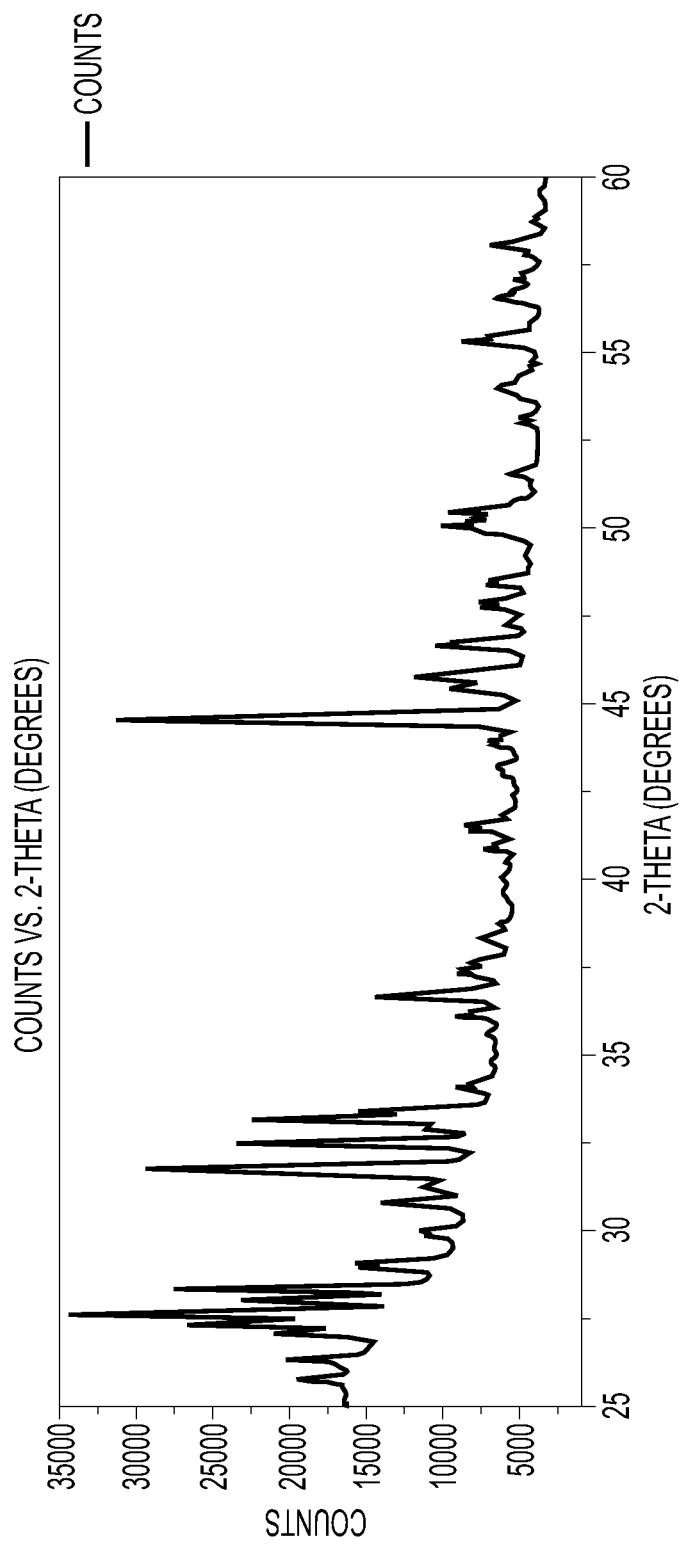
FIG. 13 illustrates an X-ray diffraction pattern of an example polycrystalline solid electrolyte mixture with the approximate composition of $Li_2KYBr_6$. This pattern includes also signal from the Al sample holder.

In an embodiment, one specific example of a solid electrolyte composition is $Li_2KYBr_6$ with a melting point of around 360° C., ionic conductivity of around $10^{-5}$ S cm$^{-1}$ at around 20° C., Li fraction of around 20 at. %, K fraction of around 10 at. %. Y fraction of around 10 at. %. Br fraction of around 60 at. %. FIG. 13 illustrates an X-ray diffraction analysis of the produced example composition of the $Li_2KYBr_6$ SSE. This pattern also contains peaks from Al and LiBr impurities. This electrolyte was produced according to the following protocol: (1) a stoichiometric mixture of LiBr, KBr, and $YBr_3$ were ground together in an inert environment; (2) heated to around 550° C. for around 20 hours in a sealed glassy carbon coated crucible and purified Ar environment and (3) cooled down to room temperature for further use in SSE membrane and/or melt-infiltration into thermally stable electrodes and membranes.

As used herein, "melt-infiltration" or "melt-infiltrated" may refer either to the process (e.g., at least partially melting SSE to produce molten electrolyte, adding the molten electrolyte to a cell component, and then cooling the molten electrolyte to produce SSE in a desired arrangement relative to the cell component) by which SSE is infiltrated into a respective cell component (e.g., anode, cathode, separator, anode particle, cathode particle, the space between particles in a respective electrode, etc.), or alternatively to unique and detectable structural or physical characteristics of cell components that incorporate SSE via melt-infiltration as opposed to other infiltration techniques (e.g., mixing SSE with a solvent and then adding the wet-mixed SSE into the cell component and then drying, adding dry-mixed electrolyte into the cell component after which the dry-mixed electrolyte is sintered and then cooled into SSE, etc.). Examples of unique and detectable structural or physical characteristics of cell components that infiltrate SSE via melt-infiltration as opposed to other SSE infiltration techniques are as follows:

Dry-mixing of SSE with a cell component material (e.g., separator or electrode material) and then heating (i.e., 'sintering') under applied high pressure may result in cells with excessive conductive additives and/or with overly thick dimensions in order to attain acceptable performance characteristics. The detection of such excessive conductive additives and/or overly thick dimensions may provide an indication that melt-infiltration was not used to incorporate the SSE into the respective cell component.

Infiltration of a melted material into a structure will generally add less thermal and mechanical energy into the structure than mixing that material within the structure in solid form and then heating up the whole structure under high pressure to form a dense SSE-active material composite. Detection of heat-related or stress-related defects in a cell component in which SSE is infiltrated may provide an indication that melt-infiltration was not used to incorporate the SSE into the respective cell component.

Infiltration of a melted material into a structure that may already comprise some broken or cracked particles will generally not induce a significant amount of SSE into small space within such cracks. In contrast, mixing that material within the structure in solid form and then heating up the whole structure under high pressure to form a SSE-active material composite may generally induce a substantial amount of the SSE within such cracks. Detection of the SSE in between in the cracks pieces of the particles may provide an indication that melt-infiltration was not used to incorporate the SSE into the respective cell component.

Wet-mixing of SSE with a solution or suspension, followed by infiltration into a cell component and then drying the wet-mixed SSE, will not typically result in chemically bonding of the SSE to the cell components, resulting in a weaker structure. A lack of chemical bonding between SSE and an associated cell component where the SSE is infiltrated may provide an indication that melt-infiltration was not used to incorporate the SSE into the respective cell component.

Further, as used herein, "melt-infiltration" or "melt-infiltrated" constitute one example of SSE being infiltrated into a cell in a liquid state, and thereafter solidified. In the case of melt-infiltration, the solidification of the liquid-infiltrated electrolyte occurs by cooling the liquid-infiltrated electrolyte to facilitate a transition from a liquid state to a solid state. Another example of SSE being infiltrated into a cell or cell component in the form of the liquid precursor and thereafter converted into the final SSE composition (e.g., during reaction induced by heating to higher temperatures or exposure to light or other means). In some cases, precursor infiltration may take place at elevated temperatures. In some cases, conversion to the final SSE composition may take at elevated temperatures. Yet another example of SSE being infiltrated into a cell in the form in a liquid state and thereafter solidified is solution-infiltration of the SSE. In the case of solution-infiltration, the solidification of the liquid-infiltrated electrolyte occurs via evaporation of the solvent part of the liquid-infiltrated electrolyte to facilitate a transition from a liquid state to a solid state. As used herein, melt-infiltration, precursor infiltration and solution-infiltration of SSE may each broadly fall under the class of "liquid-infiltration".

As noted above with respect to melt-infiltrated SSE, the broader class of liquid-infiltrated SSE into a respective cell component (e.g., anode, cathode, separator, anode particle, cathode particle, the space between particles in a respective electrode, etc.) may also result in unique and detectable structural or physical characteristics of cell components that incorporate SSE via liquid-infiltration as opposed to other infiltration techniques. Examples of unique and detectable structural or physical characteristics of cell components that infiltrate SSE via liquid-infiltration as opposed to other SSE infiltration techniques are as follows: (i) the absence or significantly reduced (e.g., by around 2-10,000 times) content of defects (dislocations, cracks, broken particles, etc.) in the active materials (anodes or cathode particles) and active material/SSE interfaces (e.g., this is because conventionally used milling and sintering procedures typically induce such damages); (2) reduced (e.g., by around 1.5-100 times) value of the strain within the electrodes or interphase/interfaces between the active material and SSEs; (3) reduced (e.g., around 1.5 times or more) fraction of interface voids; (4) in some materials that undergo phase transformation under stress—reduced (e.g., by around 1.5 times or more) fraction of stress-induced phase inclusions; (5) higher (e.g., by at least around 2%) volume fraction of active materials within electrodes (e.g., around 70-90 vol. % for liquid infiltration vs. typically around 50-80 vol. % for "conventionally produced" solid electrolyte-comprising electrodes; (6) the presence of a polymer binder (e.g., within around 0.1-10 vol. %) which is typically never used in "conventionally" produced solid electrolyte-comprising electrodes or separator membranes; (7) reduced (e.g., by around 10-99%, relative to "conventional") fraction of conductive additives; (8) detection of practically undamaged conductive additives with clearly distinguished shape (e.g., carbon nanoparticles or carbon nanotubes or graphene or metal or ceramic flakes or carbon or metal or ceramic nanofibers, etc.); (9) significantly (e.g., by around 1.5 times or more) reduced damages in the surface coatings (if present around active materials or additives); (10) the presence of hybrid ceramic-polymer composite materials (e.g., polymer with ALD-infiltrated ceramic) within electrodes or binders; (11) the presence of hollow or highly porous (e.g., around 10-99 vol. % porosity) particles within electrodes; (12) the use of copper-based current collector (e.g., thin, around 5-25 micron thick Cu foils) in the anodes; (13) the presence of ceramic solid electrolytes with low melting points; (14) the presence of monomers in solid polymer electrolytes; (15) a detectable gradient in the volume fraction of solid electrolytes from the top to the bottom of the electrode thickness (for top-to-bottom liquid infiltration) or from one end to another end (for side-to-side liquid infiltration in a rolled or stacked cell) (e.g., difference by around 1-20%); (16) a detectable gradient in the fraction of the unfilled pores (e.g., the presence of small amounts of unfilled pores near the bottom of the electrode); (17) the presence of porous surface coatings around active materials (porous interlayer between active materials and solid electrolyte); (18) cylindrical or rolled design of cells with solid electrolyte; (19) other indications that solid electrolyte was incorporated into the cell after the anode/separator/cathode stack or jelly-roll assembling; (19) the use of unusual (e.g., more thermally stable) materials in the cell case or seal or packaging, etc. (which may be required for melt-infiltration of the solid electrolyte into the pre-assembled cell); (20) a reduced amount of free space in an assembled cell (which would be filled if it is filled by an electrolyte in a liquid state); (21) a smooth electrolyte surface edge (visible in the areas that exposes electrolyte in a cell), indicating minimization of the surface energy upon electrolyte solidification from the liquid state; (22) other physical indications that the electrolyte was in a liquid state during at least one stage of the cell assembling; among others.

In some designs, one or more of the solid-state Li or Li-ion battery cells described above may exhibit gravimetric energy density in excess of around 250 Wh/kg and volumetric energy density in excess of around 600 Wh/L. In some designs, one or more of the solid-state Li or Li-ion battery cells described above may exhibit total energy in excess of around 1 Wh and total capacity in excess of around 0.4 Ah per cell.

The description is provided to enable any person skilled in the art to make or use embodiments of the present disclosure. It will be appreciated, however, that the present disclosure is not limited to the particular formulations, process steps, and materials disclosed herein, as various modifications to these embodiments will be readily apparent to those skilled in the art. That is, the generic principles defined herein may be applied to other embodiments without departing from the spirit or scope of the disclosure.

The invention claimed is:

1. A solid-state electrolyte-comprising Li or Li-ion battery cell, comprising:
   an anode electrode;
   a cathode electrode with an areal capacity loading that exceeds 3.5 mAh/cm$^2$;
   an ionically conductive separator layer that electrically separates the anode electrode and the cathode electrode; and
   one or more solid electrolytes ionically coupling the anode electrode and the cathode electrode,
   wherein at least one of the one or more solid electrolytes or at least one solid electrolyte precursor of the one or more solid electrolytes is infiltrated into the solid-state Li or Li-ion battery cell as a liquid.

2. The solid-state Li or Li-ion battery cell of claim 1, wherein the at least one solid electrolyte or the at least one solid electrolyte precursor is melt-infiltrated into the solid-state Li or Li-ion battery cell.

3. The solid-state Li or Li-ion battery cell of claim 1, wherein each of the one or more solid electrolytes is solid at room temperature.

4. The solid-state Li or Li-ion battery cell of claim 1, wherein a temperature of liquid phase infiltration of the at least one solid electrolyte or the at least one solid electrolyte precursor into the solid-state Li or Li-ion battery cell ranges from 50.0° C. to 700.0° C.

5. The solid-state Li or Li-ion battery cell of claim 4, wherein the temperature of liquid phase infiltration ranges from 60.0° C. to 400.0° C.

6. The solid-state Li or Li-ion battery cell of claim 1, wherein the at least one solid electrolyte or the at least one solid electrolyte precursor exhibits a melting point in a range from 70.0° C. to 350.0° C.

7. The solid-state Li or Li-ion battery cell of claim 1,
   wherein the anode electrode is infiltrated with a first solid electrolyte with a first composition,
   wherein the cathode electrode is infiltrated with a second solid electrolyte with a second composition that is different than the first composition.

8. The solid-state Li or Li-ion battery cell of claim 1, wherein the one or more solid electrolytes comprise a single solid electrolyte.

9. The solid-state Li or Li-ion battery cell of claim 1, wherein at least one of the anode electrode and the cathode electrode comprises conversion-type active material.

10. The solid-state Li or Li-ion battery cell of claim 1, wherein the anode electrode comprises particles with an average size in a range from 0.2 micron to 40 microns.

11. The solid-state Li or Li-ion battery cell of claim 10, wherein the particles comprise active material particles with gravimetric capacity in a discharged state in a range from 500 mAh/g to 3600 mAh/g.

12. The solid-state Li or Li-ion battery cell of claim 10, wherein the anode electrode comprises Si, Si alloy, Sn, Sn alloy, Li metal, Li alloy, or a combination thereof.

13. The solid-state Li or Li-ion battery cell of claim 10, wherein the cathode electrode comprises active material particles with gravimetric capacity in a fully lithiated state in a range from 260 mAh/g to 1200 mAh/g.

14. The solid-state Li or Li-ion battery cell of claim 1, wherein the solid-state Li or Li-ion battery cell exhibits gravimetric energy density in excess of 250 Wh/kg and volumetric energy density in excess of 600 Wh/L.

15. The solid-state Li or Li-ion battery cell of claim 1, wherein the anode electrode in a fully discharged state comprises electrically conductive, Li permeable material with internal pores that remain at least partially unfilled with solid electrolyte and are provided to at least partially accommodate volume increase during lithiation upon charging.

16. The solid-state Li or Li-ion battery cell of claim 15, wherein the average size of the internal pores ranges from 0.3 nm to 20 microns.

17. The solid-state Li or Li-ion battery cell of claim 1, wherein some or all of the one or more solid electrolytes exhibit conductivity at 60° C. in a range from $5 \cdot 10^{-4}$ S/cm to around $5 \cdot 10^{-2}$ S/cm.

18. The solid-state Li or Li-ion battery cell of claim 1, wherein some or all of the one or more solid electrolytes exhibit a grain size in a range from 0.0 nm to 200.0 nm.

19. The solid-state Li or Li-ion battery cell of claim 1, wherein some or all of the one or more solid electrolytes exhibit average hardness from 0.1 GPa to 3.0 GPa.

20. The solid-state Li or Li-ion battery cell of claim 1, wherein the one or more solid electrolytes comprise:

(i) one or more lithium metal halides, wherein either Cl or Br or both are present within the one or more lithium metal halides and wherein the one or more lithium metal halides comprise one, two, three, four or more of Na, K, Mg, Ca, Sc, Al, Zn, Ga, Sr, Y, Zr, Nb, Mo, Cd, In, B, Sn, Sb, Si, Ge, Cs, Ba, La, Ce, other lanthanoids, Hf, Ta or Bi, (ii) one or more lithium metal hydrides, wherein in addition to Li and H, the one or more lithium metal hydrides comprise one, two or more of B, Al, Ga, Zn, Zr, Ca, Mg, Na, K, Y, Sc, Ce, La, Ga, Sm, and wherein the one or more solid electrolytes additionally comprise one or more of N, O, Cl, F, Br, I, (iii) one or more solid polymer electrolytes, or (iv) a combination thereof.

* * * * *

UNITED STATES PATENT AND TRADEMARK OFFICE
CERTIFICATE OF CORRECTION

PATENT NO. : 11,581,569 B2
APPLICATION NO. : 16/856299
DATED : February 14, 2023
INVENTOR(S) : Gleb Yushin et al.

Page 1 of 1

It is certified that error appears in the above-identified patent and that said Letters Patent is hereby corrected as shown below:

In the Specification

At Column 2, Line 50: "FIGS. 12A-11F" should be changed to -- FIGS. 12A-12F --

Signed and Sealed this
Twenty-sixth Day of November, 2024

Katherine Kelly Vidal
*Director of the United States Patent and Trademark Office*